(12) United States Patent
Dingeldein et al.

(10) Patent No.: US 12,156,775 B2
(45) Date of Patent: *Dec. 3, 2024

(54) DENTAL RESTORATION MOLDS

(71) Applicant: Solventum Intellectual Properties Company, Maplewood, MA (US)

(72) Inventors: Joseph C. Dingeldein, Blaine, MN (US); James D. Hansen, White Bear Lake, MN (US); Katelyn M. Languell, Eagan, MN (US); Christopher M. Brown, Cottage Grove, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,562

(22) Filed: Jan. 3, 2023

(65) Prior Publication Data

US 2023/0149125 A1 May 18, 2023

Related U.S. Application Data

(63) Continuation of application No. 16/318,245, filed as application No. PCT/US2017/043721 on Jul. 25, 2017, now Pat. No. 11,547,530.

(Continued)

(51) Int. Cl.
*A61C 5/20* (2017.01)
*A61C 5/00* (2017.01)
(Continued)

(52) U.S. Cl.
CPC .................. *A61C 5/20* (2017.02); *A61C 5/00* (2013.01); *A61C 5/80* (2017.02); *A61C 5/85* (2017.02);
(Continued)

(58) Field of Classification Search
CPC ............ A61C 5/80; A61C 5/20; A61C 13/081
See application file for complete search history.

(56) References Cited

U.S. PATENT DOCUMENTS

| 613,947 A | 11/1898 | Strout |
| 2,090,904 A | 8/1937 | Singer et al. |

(Continued)

FOREIGN PATENT DOCUMENTS

| DE | 102009039880 A1 | 3/2011 |
| DE | 102012108217 A1 | 12/2013 |

(Continued)

OTHER PUBLICATIONS

"Bite-Perf: The Art of Occlusal Duplication", [retrieved form the internet on Aug. 8, 2017], URL <www.biteperf.es>, 2 pages.

(Continued)

*Primary Examiner* — Ralph A Lewis

(57) ABSTRACT

A tool for forming a dental restoration includes a mold body configured to provide a customized fit with at least one tooth of a patient. In some examples, the mold body defines an aperture configured to align with a portion of a surface of a tooth. The aperture is sufficiently large to allow placement and flow of restorative material over the desired portion of the surface of the tooth to be restored. The mold body is configured to combine with the at least one tooth of the patient to define a mold cavity encompassing at least a portion of desired tooth structure of the tooth to be restored.

20 Claims, 19 Drawing Sheets

Related U.S. Application Data

(60) Provisional application No. 62/366,939, filed on Jul. 26, 2016.

(51) Int. Cl.
*A61C 5/80* (2017.01)
*A61C 5/85* (2017.01)
*A61C 13/08* (2006.01)
*A61C 13/107* (2006.01)
*A61C 9/00* (2006.01)

(52) U.S. Cl.
CPC ........ *A61C 13/0001* (2013.01); *A61C 13/081* (2013.01); *A61C 9/00* (2013.01); *A61C 9/002* (2013.01)

(56) References Cited

U.S. PATENT DOCUMENTS

| | | |
|---|---|---|
| 2,674,801 A | 4/1954 | Trangmar |
| 3,224,050 A | 12/1965 | Redtenbacher |
| 3,482,314 A | 12/1969 | Tofflemire |
| 4,368,040 A | 1/1983 | Weissman |
| 4,433,959 A | 2/1984 | Faunce et al. |
| 4,695,254 A | 9/1987 | Herrell et al. |
| 4,704,087 A | 11/1987 | Dragan |
| 4,713,005 A | 12/1987 | Marshall et al. |
| 4,775,320 A | 10/1988 | Marshall et al. |
| 4,775,430 A | 10/1988 | Tanaka et al. |
| 4,778,386 A | 10/1988 | Spiry |
| 4,881,898 A | 11/1989 | Harvey et al. |
| 5,114,341 A | 5/1992 | Kassel |
| 5,192,207 A | 3/1993 | Rosellini |
| 5,195,889 A | 3/1993 | von Weissenfluh |
| 5,332,390 A | 7/1994 | Rosellini |
| 5,382,160 A | 1/1995 | Shemet |
| 5,487,663 A | 1/1996 | Wilson et al. |
| 5,803,734 A | 9/1998 | Knutson |
| 5,890,896 A | 4/1999 | Padial |
| 6,482,314 B1 | 11/2002 | Khare |
| 6,659,772 B2 | 12/2003 | Margeas et al. |
| 6,776,614 B2 | 8/2004 | Wiechmann et al. |
| 6,821,462 B2 | 11/2004 | Schulman et al. |
| 6,845,175 B2 | 1/2005 | Kopelman et al. |
| 7,027,642 B2 | 4/2006 | Rubbert et al. |
| 7,056,115 B2 | 6/2006 | Phan et al. |
| 7,092,780 B2 | 8/2006 | Ganley et al. |
| 7,162,321 B2 | 1/2007 | Luthardt et al. |
| 7,217,131 B2 | 5/2007 | Vuillemot |
| 7,234,937 B2 | 6/2007 | Sachdeva et al. |
| 7,236,842 B2 | 6/2007 | Kopelman et al. |
| 7,442,040 B2 | 10/2008 | Kuo |
| 7,605,817 B2 | 10/2009 | Zhang et al. |
| 7,689,310 B2 | 3/2010 | Kopelman et al. |
| 7,731,495 B2 | 6/2010 | Eisenberg et al. |
| 7,801,632 B2 | 9/2010 | Orth et al. |
| 7,956,862 B2 | 6/2011 | Zhang et al. |
| 8,194,067 B2 | 6/2012 | Raby et al. |
| 8,255,071 B2 | 8/2012 | Kaigler et al. |
| 8,308,478 B2 | 11/2012 | Primus et al. |
| 8,359,114 B2 | 1/2013 | Steingart et al. |
| 8,366,445 B2 | 2/2013 | Vullemot |
| 8,393,897 B2 | 3/2013 | Clark |
| 8,491,306 B2 | 7/2013 | Raby et al. |
| 8,527,079 B2 | 9/2013 | Kim |
| 8,696,356 B2 | 4/2014 | Hegyi et al. |
| 8,753,114 B2 | 6/2014 | Vuillemot |
| 8,794,965 B2 | 8/2014 | Latiolais et al. |
| 8,882,497 B2 | 11/2014 | Frantz et al. |
| 8,909,363 B2 | 12/2014 | Kopelman et al. |
| 9,308,058 B2 | 4/2016 | Clark |
| 9,375,290 B2 | 6/2016 | Csapo et al. |
| 9,414,895 B2 | 8/2016 | Clark |
| 10,327,873 B2 | 6/2019 | Fisker |
| 10,722,331 B2 * | 7/2020 | Hansen .............. A61C 13/0004 |
| 11,123,165 B2 | 9/2021 | Hansen et al. |
| 11,185,392 B2 | 11/2021 | Hansen et al. |
| 11,547,530 B2 * | 1/2023 | Dingeldein .......... A61C 13/081 |
| 2003/0170593 A1 | 9/2003 | Dorfman |
| 2004/0029068 A1 | 2/2004 | Sachdeva et al. |
| 2005/0042577 A1 | 2/2005 | Kvitrud et al. |
| 2005/0089813 A1 | 4/2005 | Slone et al. |
| 2005/0089814 A1 | 4/2005 | Slone |
| 2006/0008777 A1 | 1/2006 | Peterson et al. |
| 2006/0122719 A1 | 6/2006 | Kopelman et al. |
| 2008/0153069 A1 | 6/2008 | Holzner et al. |
| 2009/0104581 A1 | 4/2009 | Simon |
| 2010/0159412 A1 | 6/2010 | Moss et al. |
| 2011/0212420 A1 | 9/2011 | Vuillemot |
| 2012/0029018 A1 | 2/2012 | Lee et al. |
| 2013/0130202 A1 | 5/2013 | Vuillemot |
| 2013/0325431 A1 | 12/2013 | See et al. |
| 2014/0205967 A1 | 7/2014 | Csapo et al. |
| 2015/0057782 A1 | 2/2015 | Kopelman et al. |
| 2015/0140517 A1 | 5/2015 | Vuillemot |
| 2015/0182301 A1 | 7/2015 | Hegland |
| 2015/0250568 A1 | 9/2015 | Fisker et al. |
| 2016/0015246 A1 | 1/2016 | Clausen et al. |
| 2016/0089220 A1 | 3/2016 | Ebert et al. |
| 2016/0143717 A1 | 5/2016 | Samrano |
| 2016/0262860 A1 | 9/2016 | Korten et al. |
| 2017/0119499 A1 | 5/2017 | Clark |
| 2018/0021113 A1 | 1/2018 | Hansen et al. |
| 2018/0280116 A1 | 10/2018 | Hansen et al. |
| 2018/0360577 A1 | 12/2018 | Hansen et al. |
| 2019/0083208 A1 | 3/2019 | Hansen et al. |
| 2019/0201165 A1 | 7/2019 | Mishaeloff |
| 2019/0298489 A1 | 10/2019 | Dingeldein et al. |

FOREIGN PATENT DOCUMENTS

| | | |
|---|---|---|
| EP | 2400914 B1 | 8/2018 |
| FR | 2500294 A1 | 8/1982 |
| JP | 2008119225 A | 5/2008 |
| JP | 2014171698 A | 9/2014 |
| WO | 2007084727 A1 | 7/2007 |
| WO | 2009010543 A1 | 1/2009 |
| WO | 2009042378 A1 | 4/2009 |
| WO | 2009158231 A1 | 12/2009 |
| WO | 2011041193 A1 | 4/2011 |
| WO | 2011156806 A1 | 12/2011 |
| WO | 2016046308 A1 | 3/2016 |
| WO | 2016066552 A1 | 5/2016 |
| WO | 2016094272 A1 | 6/2016 |
| WO | 2016095272 A1 | 6/2016 |
| WO | 2017106419 A1 | 6/2017 |
| WO | 2017106431 A1 | 6/2017 |
| WO | 2018022616 A1 | 2/2018 |
| WO | 2018022617 A1 | 2/2018 |
| WO | 2020005885 A1 | 1/2020 |
| WO | 2020033528 A1 | 2/2020 |
| WO | 2020033532 A1 | 2/2020 |

OTHER PUBLICATIONS

"Bite-perf: Training kit (English)", YouTube, [retrieved form the Internet on Aug. 8, 2017], URL <http://www.youtube.com/watch?v=tCw45t_ntrA>, 1page.

"Cavity," Merriam-Webster.com Dictionary, Merriam-Webster, htips://www.merriam-webster.com/dictionary/cavity. Accessed Jan. 4, 2021, 16 pages. (2021).

3M Oral Care lecture, 2015, 16 pages.

Conte, "A Clear PVS Matrix Technique for the Placement of Posterior Direct Composites", Dentistry Today, Apr. 30, 2008, 5 pages.

International Search Report for PCT International Application No. PCT/US2017/043721, dated Oct. 10, 2017, 6 pages.

\* cited by examiner

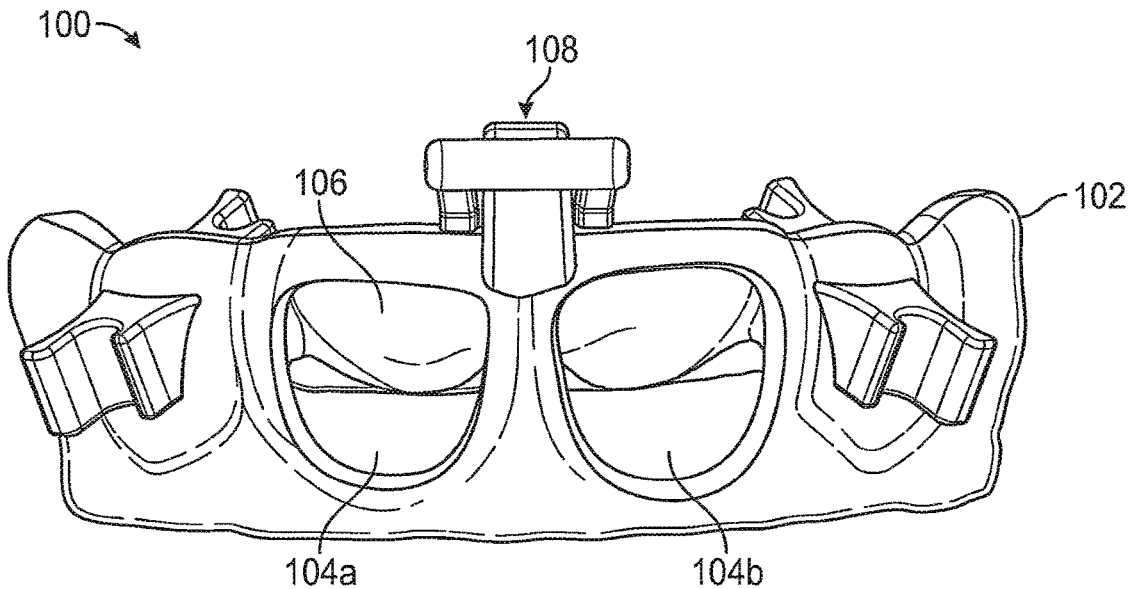
FIG. 1
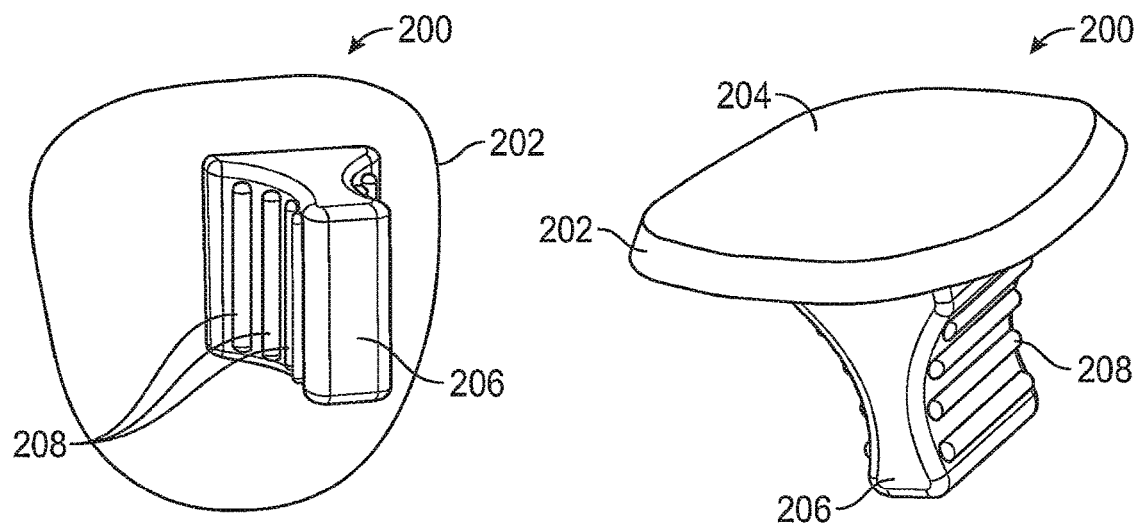
FIG. 2A
FIG. 2B

DENTAL RESTORATION MOLDS

This application is a continuation of U.S. application Ser. No. 16/318,245, filed Jan. 16, 2019, which is a 371 of PCT/US2017/043721, filed Jul. 25, 2017, which claims the benefit of U.S. Provisional Application No. 62/366,939, filed on Jul. 26, 2016, the entire contents of which are incorporated herein by reference.

TECHNICAL FIELD

This disclosure relates to dental restorations.

BACKGROUND

A dental restoration, or a dental filling, utilizes a restorative dental material to improve function, integrity, and morphology of missing or irregular tooth structure. For example, a dental restoration may be used to restore missing tooth structure due to congenital discrepancies, following external trauma, or as part of a restorative treatment for dental caries, or tooth decay.

Restorative dentistry may also be an aesthetic treatment to improve appearance of teeth by, for example, altering their shape and/or optical properties (e.g., shape and/or translucency) by, for example, applying a veneer, enlarging an undersized tooth, managing position or contour of adjacent soft tissues, lessening or removing a gap (diastema), and/or resolving the appearance of malposition.

Restorative dentistry may also be used to adjust the biting or chewing function of teeth, to affect tooth function, and/or other aspects of overall oral health such as temporomandibular joint (TMJ) disorders, periodontal involvement, gingival recession or as part of a larger plan to construct a healthy and stable oral environment.

Restorative dentistry may include removing tooth structure, such as drilling decay from an infected tooth or reshaping teeth by removing undesired tooth structure (e.g., which may be referred to as "preparing" or "recontouring" the tooth) and then using relatively simple tools and a relatively high level of craftsmanship to isolate, retract, fill and contour the finished restoration.

SUMMARY

This disclosure describes devices, systems, and techniques for molding (or shaping or contouring) restorative dental material directly on a tooth located within a mouth of a patient. In some examples, a dental restoration tool includes a mold body that, together with a tooth of a particular patient, defines a mold cavity configured to receive restorative dental material. The restorative dental material may be introduced into the mold cavity and cured to define a dental restoration. The dental restoration tool may be custom designed for a particular tooth (or set of teeth) for a particular patient. In some examples, such custom tools may be produced using three-dimensional printing techniques. Tools may also be produced by other methods of creating physical objects from digital data, such as CAD/CAM milling.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

FIG. 1 is a front view of an example tool for forming a dental restoration, the tool including at least one mold body.

FIGS. 2A and 2B are perspective views of an example door body that may be a part of a tool for forming a dental restoration.

DETAILED DESCRIPTION

Figure 3A:
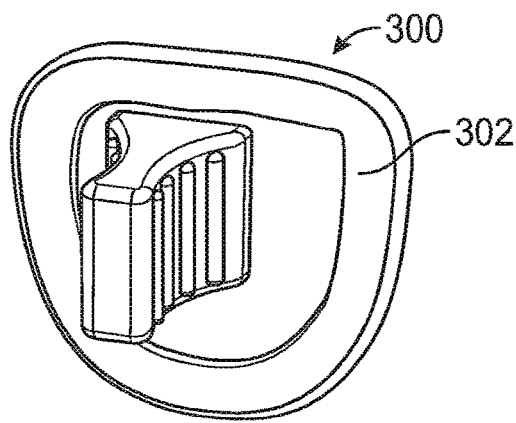
FIGS. 3A and 3B are perspective views of another example door body, which is similar to the door body shown in FIGS. 2A and 2B, but includes a flanged portion.

Restorative dentistry may be used to add tooth structure to a patient's dentition, e.g., to an existing tooth, in order to improve at least one of function, integrity, aesthetics, or morphology of missing or irregular tooth structure. For example, restorative dentistry can be an aesthetic treatment to improve appearance of teeth by, for example, altering their shape and/or optical properties (e.g., shape and/or translucency), which can be achieved using any suitable technique, such as by applying a veneer, managing position or contour of adjacent soft tissues, lessening or removing a gap (diastema), and/or resolving the appearance of malposition. As another example, restorative dentistry may be used to adjust the biting or chewing function of teeth to affect tooth function and/or other aspects of overall oral health such as temporomandibular joint (TMJ) disorders, periodontal involvement, gingival recession or as part of a larger plan to construct a healthy and stable oral environment.

In some cases, a dental restoration process includes drilling decay from an infected tooth or reshaping teeth by removing undesired tooth structure (e.g., which may be referred to as "preparing" or "recontouring" the tooth) and then using tools and craftsmanship to manually isolate, retract, fill and contour the finished restoration.

Different techniques may be used to isolate the dental restoration site. Quality isolation of the dental restoration site via a rubber dam can be cumbersome and may be skipped for less effective isolation via cotton rolls, which may increase the risk of contamination, reduce longevity of the restoration, or both. Retraction of soft and hard tissue may include manipulation of cords, wedges and matrix bands. Imperfect retraction techniques may result in contamination, difficulty in achieving proper tooth contours and symmetry, finishing and/or polishing in interproximal areas, poorly adapted contacts, or any combination thereof.

While "bulk fill" restorative materials and high intensity curing lights may facilitate relatively fast filling of deep cavities (e.g., 4-5 millimeters (mm)), many restorations may be completed in a single shade (of color) as practitioners may be uncertain of the correct layering protocol for multiple shades or types of restorative material. Additionally, with little geometrical guidance available on a prepared tooth, creation of the final filling level and occlusal surface geometry may include overfilling with restorative dental material, followed by an iterative process of grinding and checking tooth contact and biting function on an anesthetized patient. This process may be the most time consuming for dental restorations and errors here may result in tooth sensitivity and return visits for adjustment.

Custom molds may be used to facilitate restoration of tooth structure. For example, a mold body may be positioned over a patient's tooth structure and, alone or together with existing tooth structure, may define a mold cavity configured to receive restorative material. The configuration of the mold cavity may correspond to the desired configuration of the dental restoration. A dental restoration may be formed by positioning the mold body in a patient's mouth at the desired location for the dental restoration, introducing a restorative material into the mold cavity before or after positioning the mold body in the patient's mouth, and curing the restorative material while the mold is still in place in the mouth. The cured restorative material may define the dental restoration. However, some such molds may allow a practitioner little control over material placement, including shading, at least in part because the practitioner is unable to see into the mold cavity while it is positioned in the patient's mouth at the desired location.

Additionally, use of molds may result in flashing as restorative material may leak from seams of the mold cavity or the junction of the mold with the tooth and flow into unintended and often undesirable areas. Flashing may be difficult to remove after curing the restoration. In dental applications, this can potentially cause irritation, staining, food particle entrapment, and/or failure of the restoration. Some areas in which flash may occur are interproximally, e.g., due to poor access, at the gingival margin, where attempts to remove or finish can cause irritation to the gums, and incisally.

The tools described herein may include one or more features designed to reduce flash and/or to allow increased control of the placement of restorative material by practitioners using more traditional skills and techniques. The tools described herein may further include features to improve functionality of dental restoration tools, and ease of use of the tools. The tools described herein may not be simple molds that simply reflect the shape of desired tooth structure but may instead be designed to include additional features that provide one or more of the foregoing benefits.

In some examples, a tool described herein may be digitally designed. For example, a tool may be designed using a three-dimensional (3D) model of the patient's tooth structure (e.g., obtained from an intraoral scan of all or part of the patient's dentition or scanning of a conventional impression or model). The tool can be, for example, manufactured from the digital data using an additive technique, such as 3D printing, or a subtractive technique, such as computer-aided design/computer-aided manufacturing (CAD/CAM) milling.

In some examples, the tool for a dental restoration may include a mold designed based on the 3D model of the patient's tooth structure, and may include additional features to provide advantages over molds that are formed based simply on the 3D scan, a wax mold, or other molds based simply on the shape of the anatomy and/or desired tooth structure of the patient. The disclosed mold and techniques may facilitate high quality dental restorations with reduced time and/or skill requirements compared to conventional dental restoration techniques and/or may facilitate high quality dental restorations with improved quality, reduced flash, and/or reduced time and/or skill requirements compared to other molding techniques.

Example techniques for forming tools for a dental restoration are described in International Publication No. WO 2016/094272, entitled, "Dental Restoration Molding Techniques," International Publication No. WO 2017/106431 A1, entitled, "Dental Restoration Molds," and International Patent Publication No. WO 2017/106419, entitled, "One-Piece Dental Restoration Molds."

FIG. 1 is a front view of an example tool 100 for forming a dental restoration. The tool 100 includes a mold body 102, which may be configured to provide a customized fit with at least one tooth of a patient. For example, mold body 102 may be specifically designed to fit over, mate with, and/or provide restorative structure to the at least one tooth. In the example shown in FIG. 1, mold body 102 defines one or more apertures 104a, 104b (collectively referred to as "apertures 104"), which may each be configured to align with a portion of a surface (e.g., a majority of the surface or less than a majority of the surface) of a respective tooth of the patient to be restored, such as, for example, a lingual, a facial, or an incisal/occlusal surface of a respective tooth. For example, apertures 104 may be configured to align with a portion of a lingual and/or a facial surface of a respective tooth of the patient to be restored. The teeth to be restored are a part of the at least one tooth of the patient with which mold body 102 is configured to provide a customized fit. The surface of the tooth to be restored and aligned with the respective apertures 104 may, for example, be defined by existing tooth structure or by the dental restoration formed using mold body 102.

Mold body 102 is configured to combine with the at least one tooth of the patient to define a mold cavity encompassing at least a portion of desired tooth structure of the tooth or teeth to be restored. For example, in the illustrated example, mold body 102 may combine with teeth of the patient to define a mold cavity encompassing at least a portion of desired tooth structure for each of the teeth with facial portions aligning with apertures 104a and 104b. In some examples, the dental restoration may include a dental veneer restoration on the tooth or teeth to be restored, and apertures 104a and 104b may allow a practitioner to have better control over the placement of restorative material in the mold cavity than a traditional mold, in which restorative material is injected through a small hole and the practitioner has little or no visibility to the surface of the tooth. For example, apertures 104, which align with a surface of a tooth may allow a practitioner to have better control over the final appearance of that surface, including the final surface texture and/or shading, and may provide the practitioner to have better control of layering of restorative materials.

In some examples, tool 100 may include a second mold body 106, which may also be configured to provide a customized fit with the at least one tooth of the patient. Mold body 102 and mold body 106 may be configured to combine with the at least one tooth of the patient to form the mold cavity. For example, mold body 102 and mold body 106 may be configured to mate with one another and/or to be attached to the at least one tooth to form the mold cavity. In some examples, mold body 106 is separable from and engageable with the mold body 102. For example, a clamp 108 may allow mold body 102 and mold body 106 to easily engage with one another and to easily be separated from one another while maintaining the integrity of the respective mold body. In some examples, mold bodies 102, 106 include indicia or alignment features (e.g., visual indicators, mechanical mating features, key holes, notches, and the like) to help a practitioner properly align and easily engage mold body 102 and mold body 106 with one another.

Each of the apertures 104 has a suitable configuration (e.g., shape and/or size) for introducing restorative material into a mold cavity defined by an interior surface of mold body 102 to cover the portion of the surface of the tooth to be restored, the interior surface being a surface facing the tooth or teeth to be restored. In addition, each of apertures 104 has a configuration that enables a practitioner to view a meaningful part of the dental restoration being formed via the restorative material. This may allow the practitioner to have better control over the appearance of the dental restoration. Instead of blindly relying on mold body 102 to provide the final shape of the dental restoration, apertures 104 may allow the practitioner to view and manipulate the restorative material before it is cured. Manipulation of the restorative material can include, for example, removal of a portion of the restorative material, application of one or more surface features to the restorative material before it is cured, layering of the restorative material colors, and the like.

In some examples in which apertures 104 have a configuration that enables a practitioner to view a meaningful part of the dental restoration being formed, at least one of apertures 104 is configured to align with at least about 20% of the portion of the surface of the tooth to be restored, such as about 20%-80% of the portion of the tooth being restored. As an example, at one of apertures 104 may be configured to align with a portion of a tooth surface that is a majority of the surface of the tooth to be restored. Thus, in some examples, aperture 104a may be configured to align with a portion comprising a majority of a facial surface of one tooth, and aperture 104b may be configured to align with a portion comprising a majority of a facial surface of another tooth.

In other examples, apertures 104 may be configured to align with a portion less than the majority of a surface of a tooth, e.g., when smaller areas of the tooth are being restored and/or when expected flow of the restorative dental material from outside mold body 102 and through apertures 104 to the part of the mold cavity defined by mold body 102 proximate the tooth surface needing restoration is deemed to be sufficient.

In some examples, the shape of one or more of apertures 104 may be designed to substantially match the shape of the tooth and/or the portion of the tooth to be restored. For example, apertures 104 may be substantially noncircular. In other examples, however, the shape of one or more apertures 104 may be circular.

Apertures 104 may be configured to be larger than a tip of a restorative material introduction device that is used to introduce restorative dental material into the mold cavity defined by mold body 102. The tip of the restorative material introduction device may also be referred to as a capsule or a syringe tip, and may refer to the portion of the device that is introduced into the aperture. Apertures 104 may be sufficiently large to allow placement and flow of restorative material to cover the portion of the surface of the tooth being restored. Additionally, or alternatively, apertures 104 may be sufficiently large to allow movement of the tip of the dental material device within aperture 104a or 104b, and/or to allow a practitioner to view the dental restoration as it is being formed. For example, apertures 104 may have an area at least about 2 times the greatest cross-sectional area of a tip of a commercially available restorative material introduction device.

An area of an aperture 104 may be measured using any suitable technique. In some examples, the area of aperture 104 may be measured using the perimeter of the respective aperture defined by mold body 102 or may be measured digitally, such as, for example, using a software program such as CAD. For example, using software, the area of aperture 104 may be determined using a grid counting method. Using the software, a user may digitally overlay a grid including squares having known dimensions over aperture 104 and determine the number of squares that are within or make up the area of the respective aperture 104. The known dimensions of the squares may then be used to convert the number of squares determined into the area of the respective aperture.

In some examples, the cross-sectional area of a tip of a commercially available restorative material introduction device is determined using the outer diameter of the tip of the device. In one example, the cross-sectional area of a tip of a commercially available restorative material introduction device may be about 7 mm$^2$ and the area of each of apertures 104a, 104b may be about 16 mm$^2$. In some examples, a ratio of the area of aperture 104a or 104b to the cross-sectional area of a tip of a commercially available restorative material introduction device be greater than or equal to about 2:1, such as greater than or equal to about 3:1, or greater than or equal to about 4:1.

Tips of some commercially available restorative material introduction devices have an inner diameter between about 0.6 mm and about 2.3 mm and an outer diameter between about 0.90 mm and about 2.7 mm. For example, a 3M Filtek Supreme Universal capsule, may have an inner diameter of about 2.03 mm and an outer diameter of about 2.41, the 3M Filtek Supreme Flowable syringe tip may have an inner diameter of about 0.60 mm and an outer diameter of about 0.90 mm, and the 3M Filtek Bulk Fill syringe tip may have an inner diameter of about 0.70 mm and an outer diameter of about 1.10 mm. The 3M Filtek products are commercially available by 3M ESPE Dental Products in St. Paul, Minnesota. As other examples, commercially available devices used to deliver restorative dental material may have an inner diameter of about 1.85 mm and an outer diameter of about 2.30 mm, an inner diameter of about 2.20 mm and an outer diameter of about 2.70 mm, an inner diameter of about 2.10 mm and an outer diameter of about 2.60 mm, an inner diameter of about 1.10 mm and an outer diameter of about 1.60 mm, an inner diameter of about 1.90 mm and an outer diameter of about 2.50 mm, or an inner diameter of about 2.30 mm and an outer diameter of about 2.60 mm.

In some examples, apertures 104 are each defined by a single, continuous piece of mold body 102 or 106. For example, either mold body 102 or mold body 106 may define an entire aperture 104. In some examples, defining an aperture 104 within a single piece of mold body 102 or 106 may prevent the aperture from including or being formed using a seam interface between two separate mold body parts. Apertures 104 that are defined by a single piece of mold body 102 or 106 may help prevent the dental restoration formed using the mold body from including seams or artifacts from mold body 102 or 106. In contrast, a dental restoration formed using apertures that are defined by more than a single piece of mold body 102 or 106, may include seams or artifacts from the mold bodies 102, 106 due to restorative material curing within the seam between the two mold bodies.

Additionally, or alternatively, apertures 104 defined by a single piece of a mold body 102 or 106 may help prevent the part of the one or more mold bodies 102, 106 defining the aperture from becoming separated during the introduction of the restorative material into the mold cavity defined by mold bodies 102 and/or 106 and one or more teeth of the patient. The introduction of the restorative material into mold cavity may have enough force to separate parts of mold bodies from each other, thereby providing less of an engagement between mold body 102 and mold body 106 and/or less of a customized fit with one or more teeth. This separation of parts of mold bodies may result in additional flash forming, which may adversely affect the quality of the formed dental restoration and/or increase the time and effort required to form the dental restoration because the practitioner may need to remove the cured flash.

Tool 100 may allow the practitioner greater control in placing the restorative material in the mold cavity defined by the patient's tooth structure and mold bodies 102, 106. For example, tool 100 may allow a practitioner to make adjustments to and/or modifications to the placement of the restorative material in the mold cavity, and/or may allow the practitioner to check for bubbles or voids prior to curing, which may not be provided by traditional injection molding. In some examples, apertures 104 of tool 100 may allow the practitioner to apply the restorative material directly to the tooth to be restored, rather than injecting the restorative material, such as through an injection port. However, in other examples, the practitioner may apply the restorative material to the tooth to be restored or to mold body 102, 106 before applying mold bodies 102, 106 over the teeth of the patient.

Apertures 104 may allow the practitioner to visualize the restorative material on the tooth more easily than a smaller hole for injecting restorative material, e.g., an injection port. In contrast to apertures 104, an injection port may be sized to be equal to or only slightly larger than a tip of a commercially available restorative material introduction device, such as about 100% to about 125%, such as about 100% to about 110% of the cross-sectional area of the tip of the restorative material introduction device. In some examples, an injection port may be about 0.1 mm in diameter (e.g., about 100 microns) in diameter.

Further, the injection port may have a shape (e.g., circular) that matches the shape of the commercially available restorative material introduction device. In contrast, as discussed above, apertures 104 may be configured to be larger (e.g., twice as larger or greater than two times the size) than a tip of a restorative material introduction device that is used to introduce restorative dental material into the mold cavity defined by mold body 102.

Apertures 104 may allow a practitioner to utilize traditional methods and techniques for building up a restoration while still providing isolation, wedging and/or shape/contouring guidance. In some examples, the introduction of material via apertures 104a and 104b, compared to through a relatively small injection port in mold body 102 and/or 106, may minimize the pressure required to introduce restorative material into the mold cavity, which may help minimize flashing. For example, the introduction of material via apertures 104 that are larger than the size of a tip of a commercially available restorative material introduction device may reduce or even prevent back pressure on the tip of the dental material introduction device from the mold cavity. The reduced or prevented back pressure may help prevent restorative material from flowing back in the direction of the restorative material introduction device.

Additionally, layering of restorative material having different shades of color, different translucencies, and/or different mechanical properties may be easier with the open mold cavity design provided by apertures 104. Further, in some examples, mold bodies 102, 106 including apertures 104 may release easier from the dental restoration (compared to traditional molds that do not include apertures 104, but only include an injection port) due at least in part to a reduced area of surface contact between the mold and the restorative material.

FIGS. 2A and 2B are perspective views of an example door body 200 that may be a part of a tool for forming a dental restoration. In some examples, door body 200 may be used in conjunction with a tool such as the tool 100 of FIG. 1. Door body 200 may correspond to the portion of the surface of the tooth to be restored and at least a portion of door body 200 may be configured to mate with an aperture defined by tool 100 and aligned with that surface. For example, at least a portion of door body 200, such as mating portion 202, may be configured to mate with aperture 104a and/or aperture 104b to form the mold cavity. Mating portion 202 may be, for example, a bevel edge of door body 200 that helps aid the insertion of door body 200 in an aperture 104a, 104b, such as by guiding door body 200 into the respective aperture.

When door body 200 is mated with a respective aperture 104a or 104b, surface 204 of the door body 200 facing the mold cavity defined by mold body 102 and a tooth structure of a patient may help shape the restorative material that is in the mold cavity, e.g., in order to define the surface of the tooth to be restored.

In some examples, door body 200 includes at least one protrusion 206, which is a structure that aids the use of door 200. For example, protrusion 206 may be configured to provide a handle or a gripping mechanism for a practitioner, e.g., the hand of the practitioner or a tool manipulated by the practitioner, and/or ease the mating of door body 200 with aperture 104a, 104b. In this way, mating door body 200 with aperture 104a, 104b may be facilitated by gripping protrusion 206. Protrusion 206 may include gripping features in some examples, such as ribs 208. Ribs 208 may ease the handling of door body 200 by the practitioner, e.g., may prevent the hand of the practitioner or a tool manipulated by the practitioner from slipping from protrusion 206.

Integrated grips provided by protrusion 206 may increase the ease of use of any of the door bodies described herein. For example, protrusion 206 may allow a practitioner to easily identify the points on the door body to use for placing and removing the door body, making use of the door bodies more intuitive. Protrusion 206 may also provide securement of the components (e.g., to reduce the possibility that the door body to which the protrusion is attached is not dropped), and may also provide leverage for removing after the restorative material has been cured.

In some examples, door body 200 may be physically separate from (unconnected to) mold body 102. In these examples, a practitioner may freely move door body 200 relative to apertures 104a, 104b and place door body 200 in the respective aperture 104 by bringing door body 104 into alignment with aperture 104 from any suitable angle. In other examples, however, door body 200 and mold body 102 are mechanically connected to each other, such as by using a hinge. For example, door body 200 and mold body 102 may be connected via a snap hinge, a living hinge, a barrel hinge, a pin joint hinge, or any other suitable type of hinge. An example of a hinge connection between a door body and a mold body is described with reference to FIGS. 4A and 4B.

In some examples, to reduce the likelihood of trapping air during stamping of the restorative material within the mold cavity with door body 200, a release film (e.g., polytetrafluoroethylene (PTFE), plastic wrap (e.g., Saran Wrap made available by SC Johnson of Racine, Wisconsin), which can be formed from polyvinylidene chloride or another releasable material) may be placed on surface 204 of door body 200, which may be gently pressed into the respective aperture 104a or 104b to distribute the restorative material in the mold cavity, resulting in a near-net shaping of the material. Door body 200 may then be released, the liner removed, and door body 200 reapplied to create a final shape.

Figure 3B:
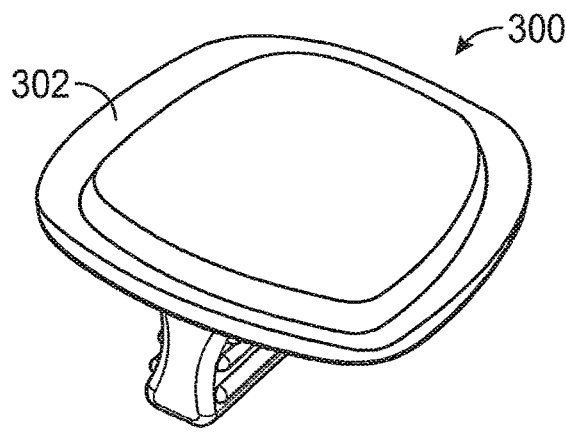

FIGS. 3A and 3B are perspective views of another example door body 300, which is similar to the door body 200 shown in FIGS. 2A and 2B, but includes a flanged portion 302. Flanged portion 302 may be configured to overlay at least a portion of mold body 102 adjacent aperture 104a or 104b and outside the aperture to provide a seal between door body 300 and mold body 102 and to act as a stop to prevent door body 300 from being inserted too far into the respective aperture. In some cases, inserting door body 300 too far into the respective aperture may negatively impact the contour of the restoration.

Figure 4A:
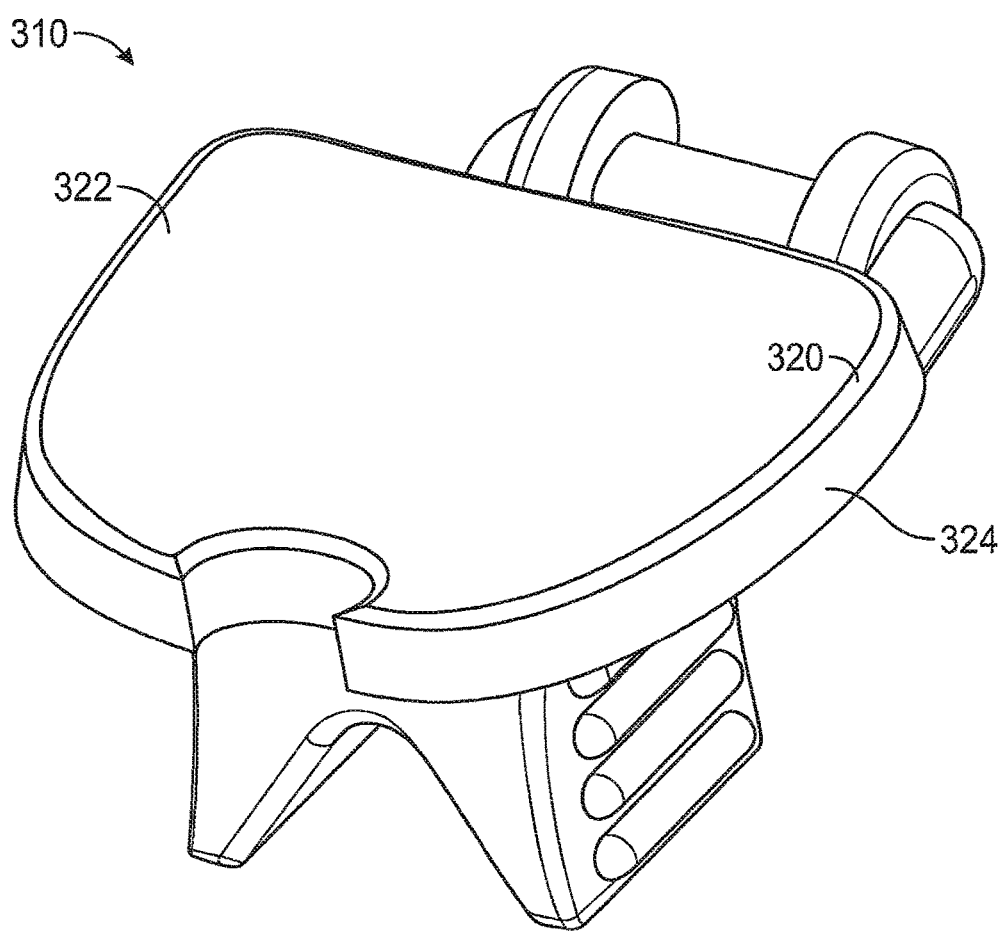
FIG. 4A is a perspective view of another example door body that may be a part of a tool for forming a dental restoration, where the door body is configured to be mechanically connected to a mold body via a hinge.
Figure 4B:
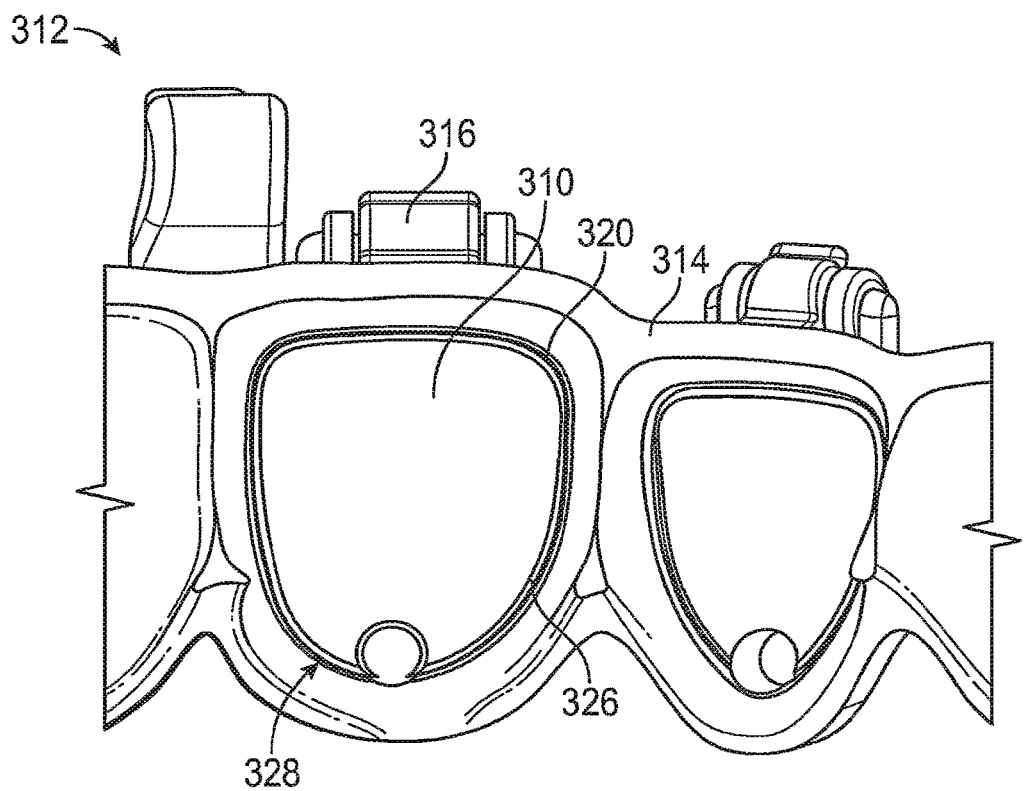
FIG. 4B is a back view of a part of another example tool for forming a dental restoration, where the tool includes the mold body of FIG. 1 and the door body of FIG. 4A connected together via a hinge.

FIG. 4A is a perspective view of another example door body 310 and FIG. 4B is a back view of example tool 312 for forming a dental restoration. Tool 312 includes door body 310 and a mold body 314. In FIG. 4B, door body 310 is inserted in aperture 328 defined by mold body 314. Mold body 314 and aperture 328 may be similar to mold body 102 and aperture 104a or 104b of FIG. 1. However, in the example shown in FIG. 4B, mold body 314 and door body 310 are mechanically connected to each other via door hinge 316.

Door body 310 is similar to door body 200 shown in FIGS. 2A and 2B, but includes a chamfered edge 320, which, when inserted in aperture 328, is configured to define a predictable location for cured flash to fracture from the dental restoration. Chamfered edge 320 may help prevent chipping or other damage to a surface of the dental restoration formed using door body 310 and mold body 314, such as by defining a location for the flash to cure. Chamfered edge 320 may result in cured flash fracturing superficially, e.g., away from the cured restorative material.

Chamfered edge 320 is a surface of door body 310 positioned between surface 322 and mating portion 324 of door body 310. In some examples, chamfered edge 320 is a surface of door body 310 that is oriented at a non-perpendicular angle to a major surface of surface 322 and mating portion 324 of door body 310. For example, chamfered edge 320 may be oriented at an angle to a major surface of surface 322 and/or mating portion 324 of door body 310 of between about 1 degree and about 89 degrees, such as between about 30 degrees and about 60 degrees. Surface 322 is configured to contact the restorative material within the mold cavity defined by mold body 314 when door body 310 is introduced into aperture 328 and mating portion 324 is at least partially engaged with the part of mold body 314 defining aperture 328. In other examples, chamfered edge 320 may be part of surface 322 and/or mating portion 324 of the door body 310.

As shown in FIG. 4B, when door body 310 is mated with and inserted inside of aperture 328 (e.g., fully inserted in aperture 328, to the extent allowed by the geometry of door body 310 and mold body 314), chamfered edge 320 and mold body 314 define a channel 326 between the side of mold body 314 forming aperture 328 and surface 322 of door body 310. In some examples, cured flash may form in channel 326. Due to the configuration of channel 326, such as the relatively shallow depth of channel 326, the cured flash formed in channel 326 fracture from the formed dental restoration superficially, e.g., away from the cured restorative material. In some examples, door body 310 defining chamfered edge 320 may allow the cured flash to form in a predictable location, e.g., within channel 326, which in turn may provide a predictable fracture location of the cured flash. Additionally, or alternatively, the formation of cured flash within channel 326 may prevent chipping or damage to the restorative dental material, such as, for example, in comparison to some door bodies that do not define a channel with a mold body when mated with the mold body.

Door hinge 316 mechanically connects door body 310 and mold body 314, as well as helps maintain alignment door body 310 and mold body 314 during use of tool 312. Door hinge 316 may have any suitable configuration, such as, but not limited to, a snap hinge, a living hinge, a barrel hinge, or a pin joint hinge. Door hinge 316 may help ensure that the correct door body 310 is used with the corresponding aperture 328. For example, a manufacturer may preconnect door body 310 to mold body 314 via door hinge 316, such that a practitioner may not need to attach door body 310 to mold body 314. In other examples, however, the practitioner may attach door body 310 to mold body 314 via door hinge 316. In some examples in which door hinge 316 is formed by a hinge part connected to door body 310 and another hinge part connected to mold body 314, door body 310 and mold body 314 may include one or more indicia or alignment features to help match-up and align a door body 310 to the corresponding aperture 328 to connect the corresponding hinge parts to form door hinge 316. The indicia or alignment features may be, for example, those described above with respect to mold bodies 102, 106 of FIG. 1 and those described with respect to mold bodies 502, 506, and door bodies 508a, 508b of FIGS. 6A-6C.

Door hinge 316 may be formed separate from door body 310 and/or mold body 314, or door hinge 316 may be formed as an integral part of door body 310 and/or mold body 314. In some examples, door hinge 316 may increase the ease of use of tool 312 (e.g., reducing the training required to use tool 312). For example, rather than a practitioner applying door body 310 to mold body 314 in an idiosynractic manner, door hinge 316 may provide for door body 310 to be placed in a specific location or orientation relative to mold body 314. In some examples, door hinge 316 may also allow for mold body 314 and door body 310 to be moved and/or placed together, e.g., without door body 310 becoming separated from mold body 314.

Door hinge 316 is configured to allow door body 310 to rotate relative to mold body 314 about an axis of rotation. The axis of rotation is oriented such that door body 310 may rotate (e.g., pivot) to be inserted within aperture 328 (a "closed" position) or to be outside of aperture 328 (an "open" position). In the open position of door body 310, a practitioner may access the mold cavity defined by mold body 314 and one or more teeth of the patient, such as to manipulate restorative material introduced into the mold cavity by the practitioner. In some such examples, the range of rotation of door hinge 316 about an axis may be limited by the configuration and/or placement of door hinge 316 with respect to door body 310 and mold body 314. For example, door body 310 attached to mold body 314 via door hinge 316 may not be able to rotate 360° about an axis of rotation due to the presence of mold body 314.

In some examples, door hinge 316 may bias door body 310 in the closed position and/or the opened position, or both, depending on the position of door body 310 relative to mold body 314. For example, door hinge 316 may be a spring-loaded hinge.

Door hinge 316 may be used in combination with any of the example tools described herein. For example, some examples any of the tools described herein that include a door body and a mold body configured to mate together may include a hinge for mechanically connecting the door body and the mold body.

In addition to or instead of door hinge 316, one or more other mechanical features can be used to assist in the alignment of mold body 314 and door body 310, such as, but not limited to, sliders, guides, bevels, chamfers, and the like. For example, mold body 314 and/or door body 310 may include a slider feature that acts a guide for door body 310, such as to allow door body 310 to slide along an edge of aperture 328 and guide door body 310 along mold body 314 to mate with aperture 328.

Figure 5:
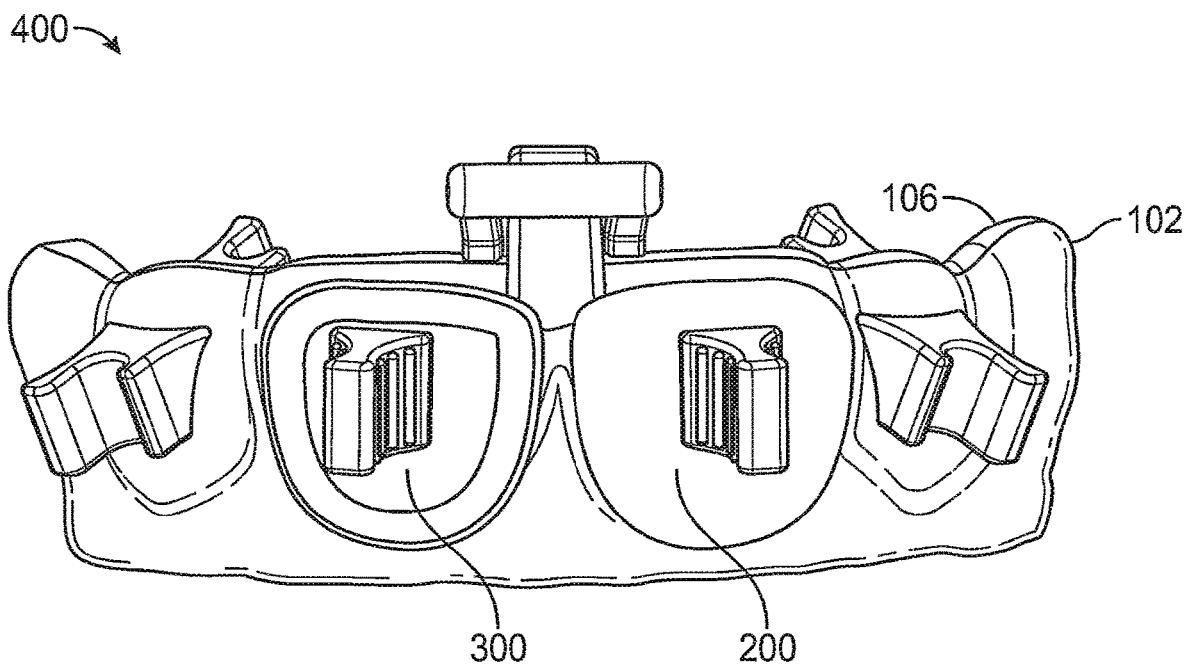
FIG. 5 is a front view of another example tool for forming a dental restoration, where the tool includes the mold bodies of FIG. 1, the door body of FIGS. 2A and 2B, and the door body of FIGS. 3A and 3B.

FIG. 5 is a front view of another example tool 400 for forming a dental restoration that includes the mold bodies 102 and 106 of FIG. 1, the door body 200 of FIGS. 2A and 2B, and the door body 300 of FIGS. 3A and 3B. The door bodies 200 and 300 are each readily separable from and engageable with the mold body 102. For example, in the illustrated example, each of the door bodies 200 and 300 are shown engaged with mold body 102. As shown in FIG. 5, door bodies having different configurations (e.g., sizes, shapes, and the like) may be used with the same mold body.

Figure 6A:
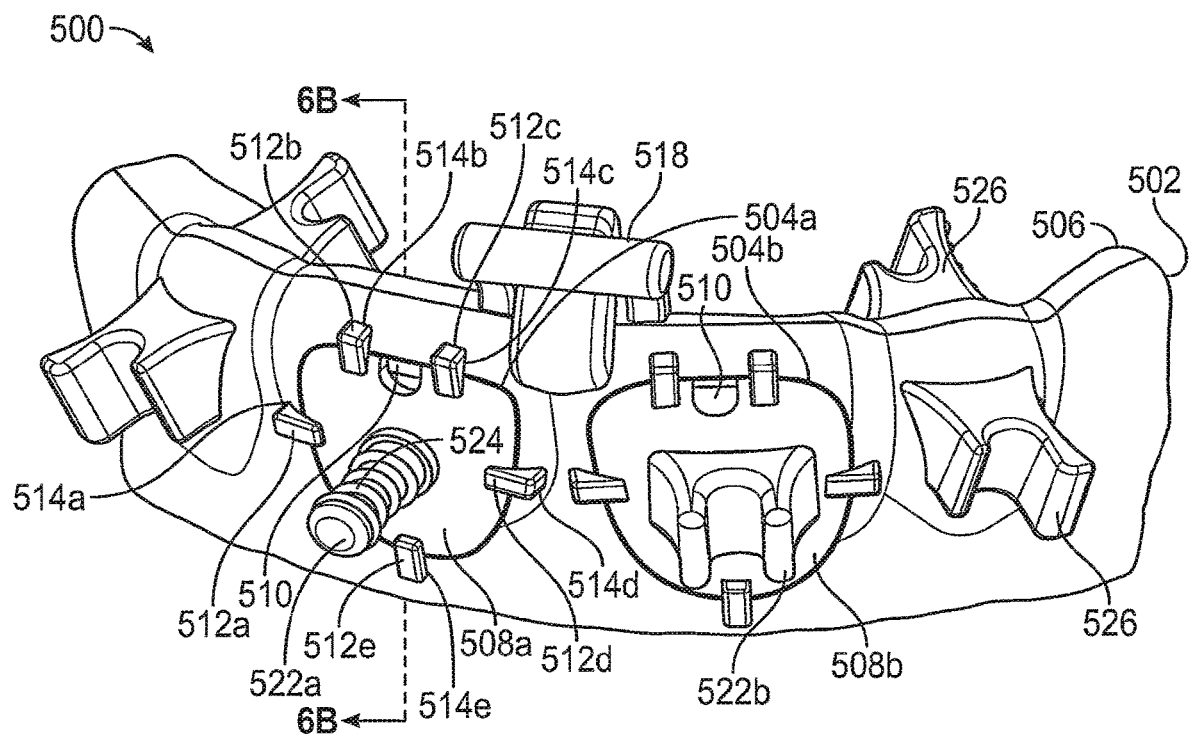
FIGS. 6A, 6B, and 6C are perspective and side cross-sectional views of another example tool for forming a dental restoration.
Figure 6B:
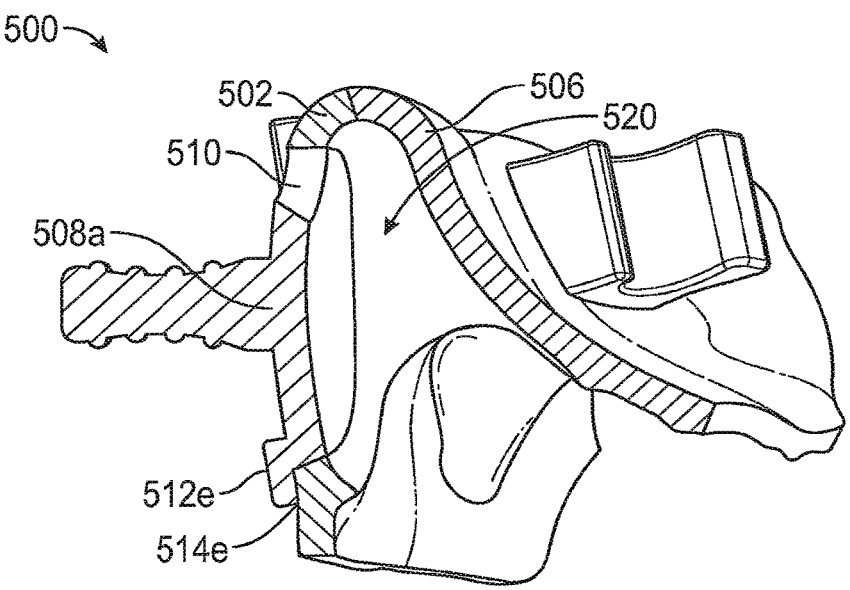

FIGS. 6A and 6B are a perspective and side cross-sectional views of another example tool 500 for forming a dental restoration. FIG. 6B is a cross-sectional view of the tool 500 taken along the line "6B" of FIG. 6A. The tool 500 may include first mold body 502, similar to first mold body 102 of FIGS. 1 and 4, which may define apertures 504*a* and 504*b*, similar to the apertures 104*a* and 104*b* of FIG. 1, a second mold body 506, similar to the second mold body 106 of FIGS. 1 and 4, door bodies 508*a* and 508*b*, similar to the example door bodies 200 and 300 of FIGS. 2A-4. In the illustrated example, door body 508*a* defines a vent 510, which may be an opening positioned within door body 508*a*, within mold body 502, partially within the mold body 502 and door body 508*a*, or combinations thereof. In some examples, vent 510 may be configured to allow excess restorative material to flow out of a mold cavity 520, which may be removed prior to curing (e.g., with a scalar instrument), providing for easier removal of flash. Alternatively, or in addition, vent 510 may be configured to allow air to flow out of the mold cavity.

In some examples, vent 510 may be configured such that vent 510 is drafted towards the dental restoration in order to reduce mechanical interlocking between tool 500 and the formed dental restoration (formed by curing the restorative material within mold cavity 520 of mold body 502). In some such examples, vent 510 may not be uniform in size. For example, vent 510 may decrease in cross-sectional area in a direction from mold cavity 520 to the outer surface of mold body 502 and/or door body 508. The decrease in cross-section area of vent 510 in the direction away from mold cavity 520 may help prevent restorative material from remaining in vent 510. For example, if restorative material enters vent 510, the restorative material may flow out of vent 510 away from mold cavity 520. If restorative material remains in vent 510 when curing, the cured material may provide mechanical locking with the formed dental restoration, and tool 500 may become difficult to remove. By drafting vent 510 towards the restoration, e.g., as shown in FIG. 6B, such that the vent 510 has a larger cross-section proximate to the dental restoration than the outer surface of mold body 502, mechanical interlocking may be reduced, the tool 500 may be more easily be removed from a formed dental restoration, and the possibility of adversely affecting the integrity of the restoration may be reduced.

Drafting vent 510 towards the formed restoration may also provide a predictable fracture of the cured flash superficially, e.g., in a direction away from the cured restorative material. In this way, drafting the vent 510 towards the restoration may provide easier removal of the cured flash.

In some examples, aperture 504*a* and aperture 504*b* may be different shapes and door body 508*a* and door body 508*b* may be different shapes. The shape of door body 508*a* may correspond to the shape of aperture 504*a* and the shape of door body 508*b* may correspond to the shape of aperture 504*b*. In this way, apertures 504*a*, 504*b* may be configured to mate with only the door intended to be used with the respective aperture. This may help reduce user error, e.g., if placement of the incorrect door in aperture 504*a*, 504*b* would result in a malformed dental restoration, e.g., because of the way the door body pushes the restorative material in the mold cavity or because door bodies 508*a*, 508*b* are configured to provide surface features or the like to the dental restoration. In other examples, the aperture 504*a* and the aperture 504*b* may be the same shape and the door body 508*a* and the door body 508*b* may be the same shape, such that door bodies 508*a*, 508*b* may mate with either aperture 504*a*, 504*b*.

In some examples, one or more of mold body 502, mold body 506, door body 508*a*, or door body 508*b*, and/or any of the example mold bodies or door bodies described herein, may include one or more indicia for facilitating one or more of mating door body 508*a* with aperture 504*a* or mating door body 508*b* with aperture 504*b* (or mating the door body with the respective aperture in any of the examples described herein), mating mold body 502 with mold body 506, and/or positioning one or more of mold body 502, mold body 506, door body 508a, or door body 508b with respect to one any of the other components and/or with respect to the teeth of the patient. For example, the indicia may provide information to aid a practitioner in correctly mating door body 508a with aperture 504a instead of attempting to mate door body 508a with aperture 504b. As another example, the indicia may aid the practitioner in correctly orienting door body 508a relative to aperture 504a. As another example, the indicia may provide information to aid a practitioner in correctly positioning mold body 502 and/or mold body 506 with respect to the teeth and/or with respect to one another.

In the illustrated example, the indicia may include one or more key structures, such as key structures 512a-512e of door body 508a, and one or more corresponding keyholes, such as keyholes 514a-514e defined by mold body 502. For example, the practitioner may align each of key structures 512a-512e with a corresponding keyhole 514a-514e to ensure that door body 508a is correctly oriented relative to aperture 504a. While, in the illustrated example, key structures 512a-512e and corresponding keyholes 514a-514e appear to be similarly shaped oriented around about door body 508a as those of door body 508b, in some examples, door bodies 508a and 508b may include key structures with different shapes and/or locations such that key structures of one door body 508 will clearly be corresponding with key holes about one aperture or the other such that the key structures and keyholes will help the practitioner to identify which door body 508 corresponds to which aperture 504.

Alternatively, or in addition to key structures and keyholes, other visual or physical indicia may be used to help a practitioner correctly match a door body to a corresponding aperture. Other indicia may include, for example, color coding, symbols, markings, and/or any other suitable indicia or combination thereof. For example, door body 508a may include one or more colors or symbols that match the color or symbol associated with corresponding aperture 504a (e.g., printed on mold body 502 next to aperture 504a and/or lining a portion of mold body 502 proximate aperture 504a and/or inside aperture 504a and/or indicating orientation relative to aperture 504, e.g., one color and/or symbol indicating the top and/or another indicating the bottom including, for example, one color printed on a top of door body 508a and on mold body 502 next to the top of respective aperture 504a and/or lining a portion of mold body 502 proximate the top of respective aperture 504a and/or inside the top of aperture 504a and another color). As another example, one of more of door body 508a, door body 508b, or mold body 502 may include other markings indicating which door body 508 corresponds to which aperture 504 and/or the correct orientation of door body 508 with respect to corresponding aperture 504. For example, similar to key structures and key holes, notches (physical or printed) may be marked at or near the perimeter of door body 508a and/or 508b as well as about or along an inner surface of apertures 504a and/or 504b and a practitioner knows to align notches on corresponding door bodies 508 and apertures 504.

As another example, colored lines or other indicia may be formed on or near an interproximal edge mold body 502 and/or mold body 506 to assist the practitioner in placement of the respective mold body on the teeth. For example, the indicia may be used to prevent or provide indication of upside-down placement of the mold body.

As another example, an inner surface of either or both of apertures 504 may be distinguished from other portions of mold body 502 by coloring or other indicia that is distinct from adjacent portions of mold body 502. This may allow a practitioner to more easily see the perimeter of the aperture 504 to aid in correct placement of respective door body 508.

The indicia discussed herein may be integrated into the respective mold components or may be separate from and applied to a mold component. For example, the markings may be 3D components that are an integrated feature of the mold design, the colorings may be a color of the material used to form portions the mold component, and/or the markings and/or coloring may be applied to a surface of the mold component using ink or any suitable material.

In some examples, tool 500 may include a release film (e.g., PTFE, Saran Wrap or another releasable material) configured for placement on one or more surfaces of door body 508a and/or 508b, including, for example, a surface facing mold cavity 520 when respective door body 508a or 508b is placed in respective aperture 504a or 504b, to facilitate release of restorative material from the surface of the door body 508a and/or 508b. For example, a practitioner can apply the release film on one or both door bodies 508a, 508b prior to bringing the door bodies into contact with restorative material in cavity 520 and exposed via apertures 504a, 504b. In addition to, or instead of the release film, tool 500 may include a coating on one or more surfaces of door body 508a and/or 508b to facilitate release of restorative material from the surface of door body 508a and/or 508b. The coating can be, for example, a lubricious coating.

In some examples, tool 500 may include one or more additional door bodies 508 corresponding to one or more of the apertures 504. That is, one aperture 504 may be used with multiple doors. For example, multiple door bodies, including door body 508a, may correspond to aperture 504a. Each door body for a particular aperture 504 may provide a different function. For example, door body 508a may be configured for one or more of final shaping or final layering of at least a portion of the dental restoration and tool 500 may include additional door bodies for use in intermediate layering and/or shaping of the dental restoration. At least a portion of each of the additional door bodies may be configured to mate with aperture 504a. For example, an additional door body may be configured for shaping an underlying shade layer of at least the portion of the dental restoration. As another example, an additional door body may be configured to form one or more mamelons, one or more grooves, or and/or one or more pits on the dental restoration. For example, the surface of the door body that faces the cavity when the door is applied to the mold body may define one or more physical features (e.g., one or more mamelons, one or more grooves, or and/or one or more pits) for forming in the dental restoration.

As an additional example, an additional door body may be configured for near net shaping of at least the portion of the dental restoration. Forming the restorative material in a near net shape may allow a practitioner to determine whether any changes to the color of the dental restoration are desirable before curing. In this way, the door body that provides for near net shaping of a restorative material prior to curing may increase the workability of the restorative material.

As another example, an additional door body may be configured for applying an intermediate layer of restorative material. The intermediate layer of restorative material may comprise restorative material that is different than a material applied during final layering using door body 508a. Tool 500 may include any suitable number of door bodies according to particular needs.

Figure 6C:
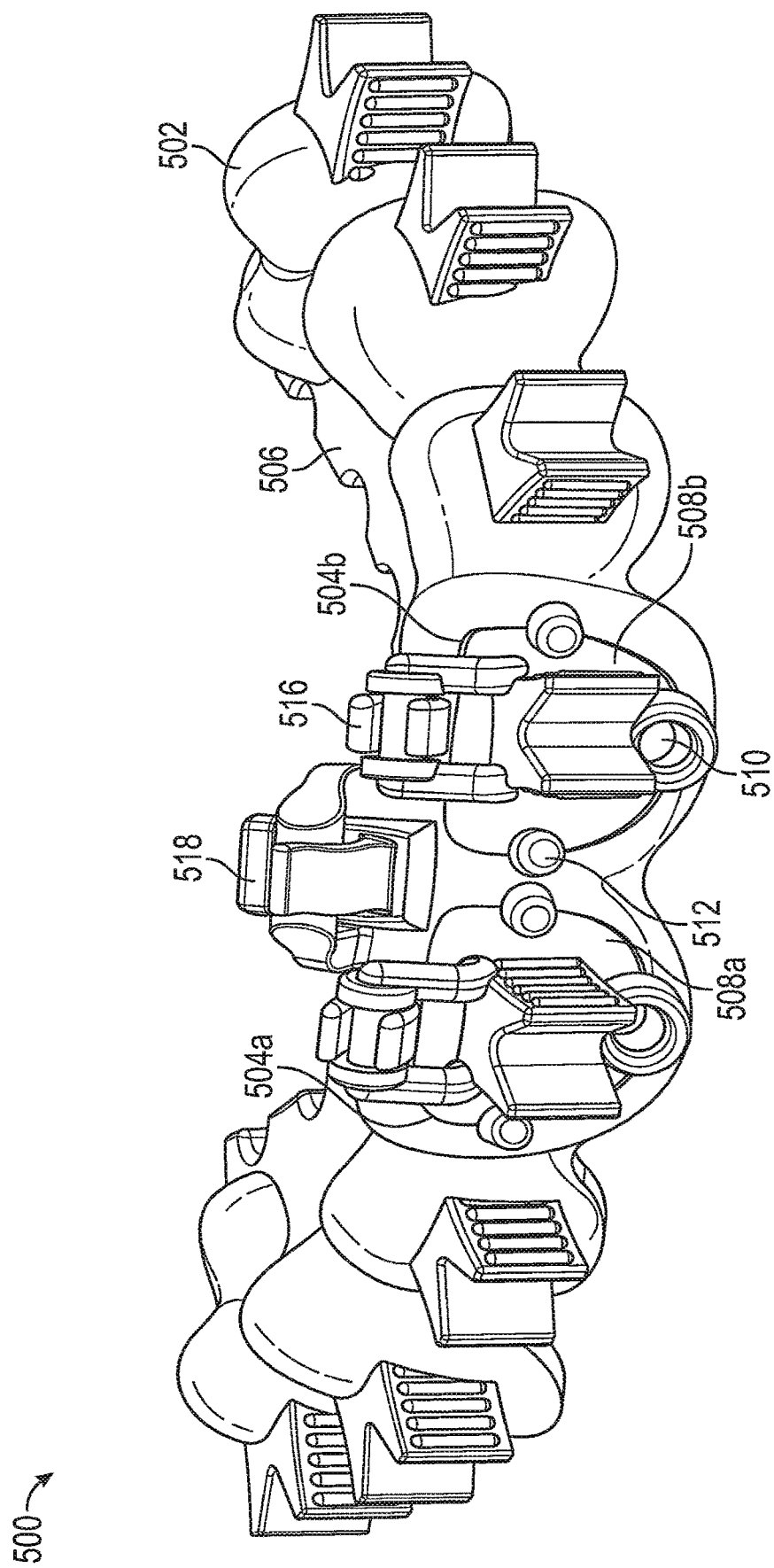

As shown in FIG. 6C, in some examples, door body 508a or 508b may be attached to mold body 502 via a respective door hinge 516. As with door hinge 316 shown in FIGS. 4A and 4B, door hinge 516 may mechanically connect and align door bodies 508a, 508b and mold body 502, thereby reducing the degrees of freedom of door body 508b in which door body 508b may move with respect to mold body 502. In addition, door hinge 516 may help ensure that the correct door body 508a, 508b is used with the corresponding aperture 504a, 504b, respectively. Door hinge 516 may be similar to door hinge 316. For example, door hinge 516 may be formed separate from door body 508b and/or mold body 502, or door hinge 516 may be formed as an integral part of door body 508b and/or mold body 502. In some examples, door hinge 316 may be a snap hinge, a living hinge, a barrel hinge, or a pin joint hinge.

In some examples, mold bodies 502 and 506 may engage with one another via a clamp 518. Clamp 518 includes two or more parts that interlock together in order to engage mold bodies 502 and 506. For example, mold body 502 may include a first part of clamp 518 and mold body 506 may include a second part of clamp 518 which is configured to mechanically interlock with the first part of clamp 518 to secure mold bodies 502, 506 to each other in a tight-fitting relationship, such that seams between mold bodies 502, 506 are closed and restorative material may be contained within a mold cavity defined by mold bodies 502, 506 and one or more teeth of the patient. The first and second parts of clamp 518 may be separate from each other (e.g., free floating relative to each other) or may be mechanically connected together.

In some examples, clamp 518 may be configured to interlock using a hinge-like mechanism. In other examples, first and second parts of clamp 518 may rest against one another without mechanically interlocking. In some examples, clamp 518, or more specifically, a part of clamp 518, may be configured to rotate or slightly rotate about an axis of rotation. In some such examples, the range of rotation of clamp 518 about an axis may be limited by the configuration and/or placement of clamp 518 with respect to mold body 502 and/or mold body 506. For example, mold body 502 attached to mold body 506 via clamp 518 may not be able to fully rotate about an axis of rotation due to the presence of mold body 506. Additionally, or alternatively, mold bodies 502, 506 may engage with each other via a hinge, a clip, or another structure configured to mechanically connect and engage adjacent mold bodies 502 and 506 with each other. In another example, mold bodies 502, 506 may be configured to engage with each other via a snap fit or other interlocking mechanism that does not allow for relative rotational movement between mold bodies 502, 506. When the mold bodies 502, 506 combine with at least one tooth of the patient to form a mold cavity, clamp 518 is configured to be at least proximate an incisal edge of at least one of the tooth or teeth to be restored.

In the example shown in FIGS. 6A and 6C, clamp 518 is located proximate an incisal edge of a tooth or teeth to be restored when mold bodies 502, 506 are positioned over one or more teeth of a patient. In cases in which an incisal edge is being formed by a mold tool such as tool 500, the incisal edge may be a likely place to experience flash formation. Clamp 518 may help ensure a relatively tight fit between the mold bodies 502, 506 to help reduce or eliminate the flash that occurs along this edge. Any flash that does occur may be very thin along the incisal edge and may be relatively easily removed with a dental instrument. In other examples, however, clamp 518 may be proximate another surface of a tooth when mold bodies 502, 506 are positioned over one or more teeth of the patient, and may help reduce or eliminate the flash at that other location.

By providing a relatively tight fit along the incisal edge or another edge of mold bodies 502, 506, clamp 518 may help excess restorative material preferentially flow toward vent 510 where flash may be relatively easily seen and removed during finishing of the restoration.

In some examples, clamp 518 may help mold bodies 502, 506 self-align with each other and stay fixed relatively to each other. These features may increase the ease of use of tool 500. For example, clamp 518 may help ensure that the corresponding mold bodies 502, 506 are used with each other. Clamp 518 may also allow for mold body 502 and mold body 506 to be moved and/or placed together, e.g., without mold bodies 502, 506 becoming separated from each other. Clamp 518 may be formed separate from the mold bodies 502, 506 and connected to the mold bodies 502, 506, or clamp 518 may be formed by clamp parts that are integral with each of mold bodies 502, 506.

Clamp 518 may be used in combination with any of the example tools described herein. For example, any of the mold bodies described herein may include a clamp for engaging with another mold body, according to particular needs.

In some examples, one or more door bodies 508a, 508b may include a protrusion extending in a direction away from mold body 502 when door bodies 508a, 508b are inserted in respective apertures 504a, 504n. The protrusions may be configured to provide a handle or a gripping mechanism for a practitioner, e.g., the hand of the practitioner or a tool manipulated by the practitioner, to grasp the respective door bodies 508a, 508b. An example protrusion 522a is shown in FIGS. 6A and 6C. Door body 508a includes protrusion 522a, such that mating door body 508a with aperture 504a may be facilitated by gripping protrusion 522a. In some examples, protrusion 522a includes gripping features such as ribs 524. Ribs 524 may increase the friction between a practitioner's tool or hand and may help prevent the hand of the practitioner or a tool manipulated by the practitioner from slipping from protrusion 522a.

In addition to or instead of some examples, providing a handle or a gripping mechanism for a practitioner, a protrusion extending away from a door body may define a structure configured to mate with at least a portion of a clamp or another dental instrument. For example, as shown in FIG. 6A, door body 508b may include protrusion 522b that defines a structure configured to mate with at least a portion (e.g., the end or end portion) of a clamp that applies clamping pressure to door body 508b in a direction towards mold body 502 when door body 508b in inserted in aperture 504b. Clamping pressure may help excess restorative material preferentially flow toward vent 510 and toward more accessible and less critical areas of the tooth, such as the incisal edge, where flash may be relatively easily seen and removed during finishing of the restoration. In some examples, a clamp in protrusion 522b may hold door body 508b within aperture 504b. Protrusion 522b may allow for easy and stable placement of a clamp.

Integrated grips provided by protrusion 522a and/or clamping mechanisms provided by protrusion 522b may increase the ease of use of any of door bodies 508a, 508b. For example, protrusions 522 may allow a practitioner to easily identify the points on the door body 508a, 508b to use for placing and removing the door body and/or attaching a clamp to door body 508a, 508b, making use of the door bodies more intuitive. Protrusions 522 may also provide securement of the components (e.g., to reduce the possibility that the door body to which the protrusion is attached is not dropped or to secure the door body to the mold body), and may also provide leverage for removing after the restorative material has been cured.

In some examples, mold body 502, 506 may include one or more protrusions 526 configured to mate with at least a portion of a clamp that also engages with a door body. For example, as shown in FIG. 6A, protrusions 526 may each define a structure configured to mate with at least a portion (e.g., the end or end portion) of a clamp or another dental instrument used to place, align, secure, manipulate, or release the mold body. In addition to or instead of a protrusion, in some examples, one or both mold bodies 502, 506 (as well as other mold bodies or door bodies described herein) may define recessed features that can be used to locate a clamp, receive a gripper, or provide an alignment feature.

The integrated clamping locations provided by protrusions 526 may allow for the easy and stable placement of a clamp, with the ability to optimize the placement of the clamp for desired force distribution. For example, using digital design, a tool designer, manually or with the aid of software, may select the locations of protrusions 526 based on the pressure points that will result from placing the clamp at the particular locations.

Further, building in clamping locations in mold bodies 502, 506 via protrusions 526 may help reduce variability of the amount of clamping pressure applied to mold bodies 502, 506 from practitioner-to-practitioner, and may increase the ease of use of tool 500 (e.g., reducing the training required to use tool 500). Rather than a practitioner applying clamps to mold bodies 502, 506 in an idiosyncratic manner, the integrated clamping locations provided by protrusions 526 may provide for relatively uniform clamping in a known, specific location (e.g., as compared to hand clamping).

FIGS. 7A-7G illustrate steps of an example method of using the tool 400 of FIG. 5 to form a dental restoration. A practitioner may place mold body 106 over at least one tooth of a patient, the at least one tooth being the site for the desired dental structure to be formed using tool 400, or being near the site for the desired dental structure to be formed. In the example shown in FIG. 7A, the at least one tooth includes two teeth 602a and 602b, but can include one tooth or more than two teeth in other examples.

Figure 7A:
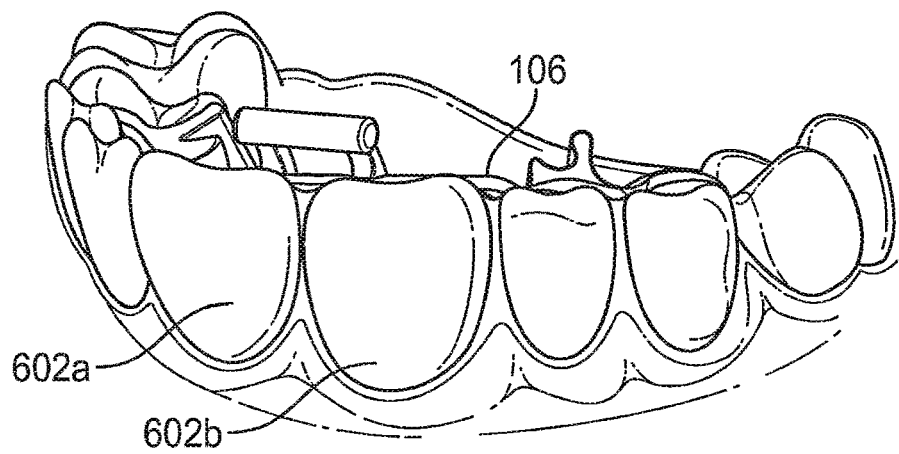
FIGS. 7A-7G illustrate example steps for using the tool of FIG. 5 to form a dental restoration.
Figure 7B:
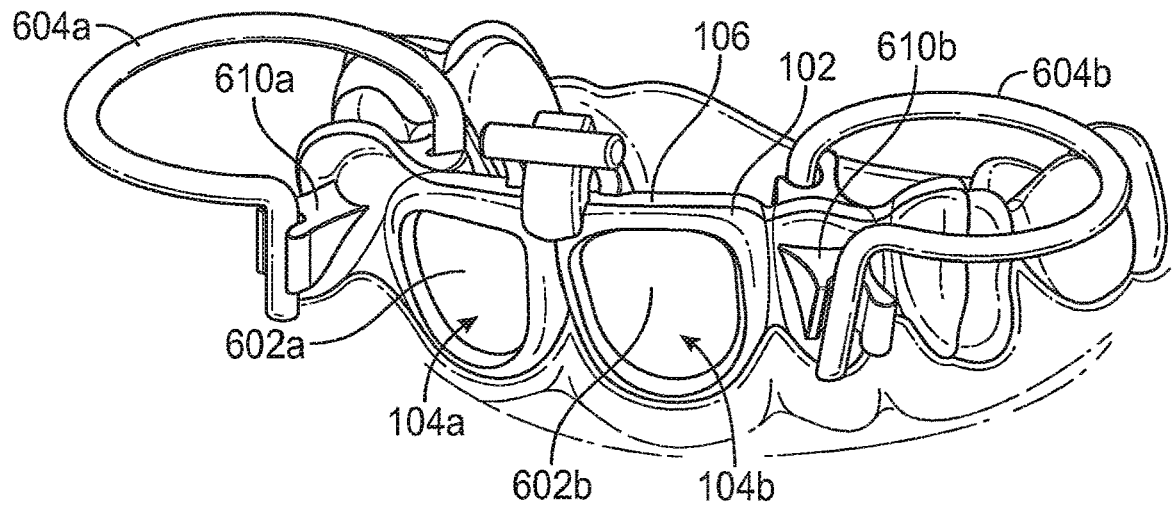

The practitioner may also position mold body 102 over the teeth and attach mold body 102 to teeth 602a and 602b, such as by engaging mold body 102 with mold body 106. In some examples, the practitioner may use additional fixation structures to connect mold bodies 102, 106. For example, the practitioner may engage one or more clamps 604a and 604b with respective portions of mold bodies 102 and 106 (FIG. 7B). These portions of mold bodies 102, 106 may, for example, be configured to receive and engage with clamps 604a, 604b in a relatively tight fit such that clamps 604a, 604b stay in place relative to mold bodies 102, 106.

Figure 7C:
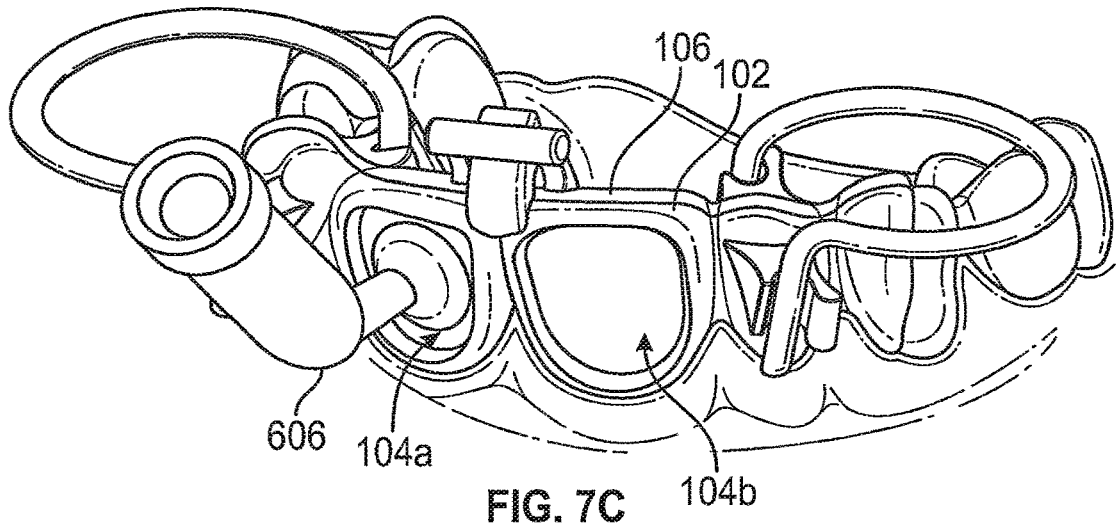
Figure 7D:
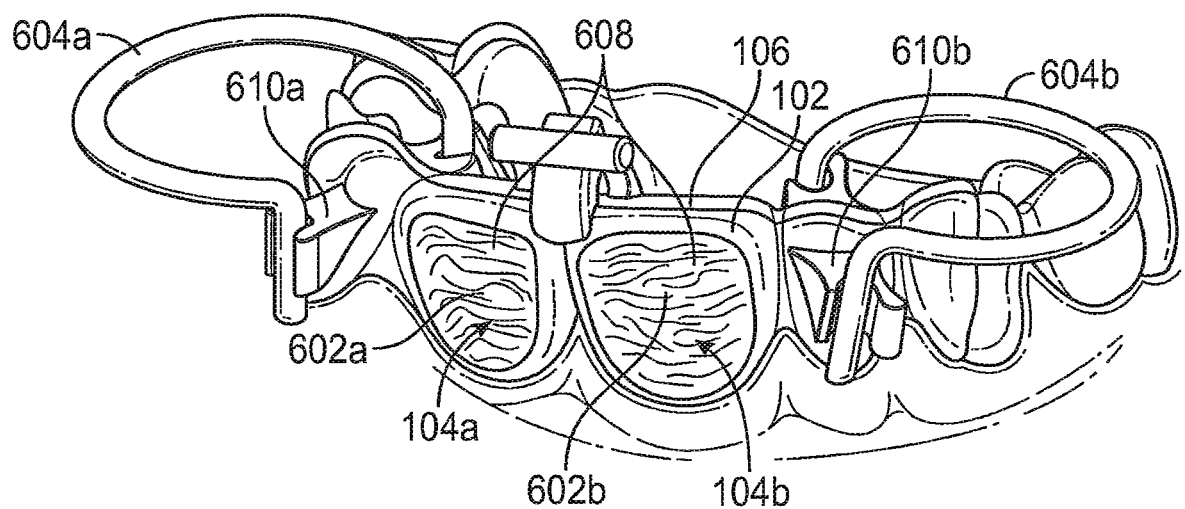

The practitioner may introduce restorative material into a mold cavity defined by mold bodies 102, 106 and the teeth 602a, 602b around which mold bodies 102, 106 are positioned using any suitable technique. In some examples, the practitioner may fill the mold cavity with restorative material by introducing the restorative material through one or more of apertures 104a and 104b and into the mold cavity (FIG. 7C). For example, the practitioner may use a tool such as restorative material introduction device 606, to place the restorative material into the mold cavity. As shown in FIG. 7C, a tip of the device 606 may be at least partially introduced into aperture 104a in order to introduce the restorative material into the mold cavity. In some examples, restorative material 608 may be placed in the mold cavity through multiple apertures, including aperture 104a and 104b (FIG. 7D).

In addition to or instead of using restorative material introduction device 606, the practitioner may introduce restorative material 608 into the mold cavity by fully or partially prefilling the mold cavity with restorative material 608 before placement of the mold body 102 and/or 106 over teeth 602a, 602b and/or by placing restorative material 608 on teeth 602a and 602b and then subsequently placing mold bodies 102 and/or 106 over the teeth 602a and 602b and restorative material 608.

Figure 7E:
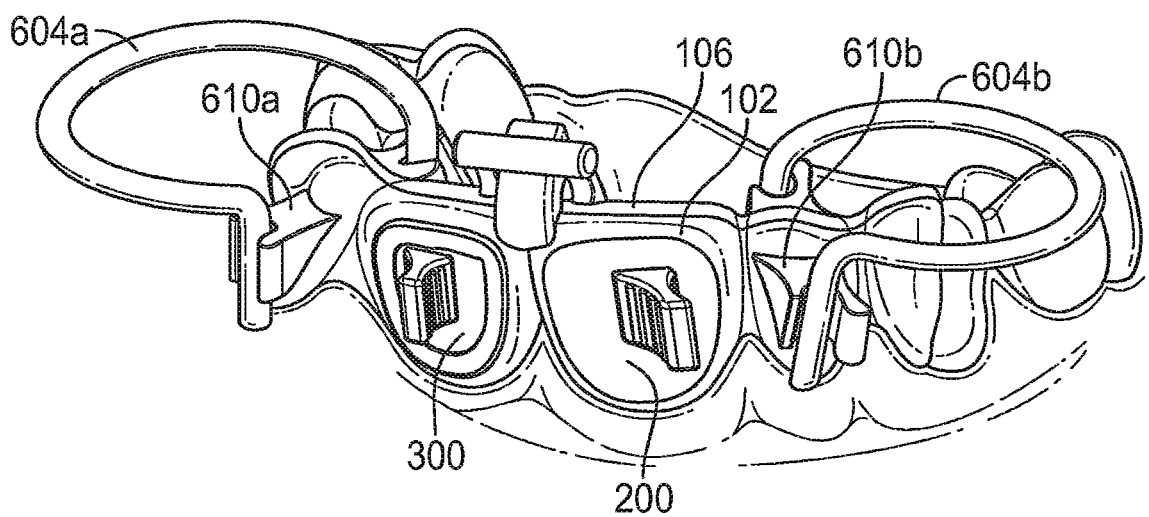
Figure 7F:
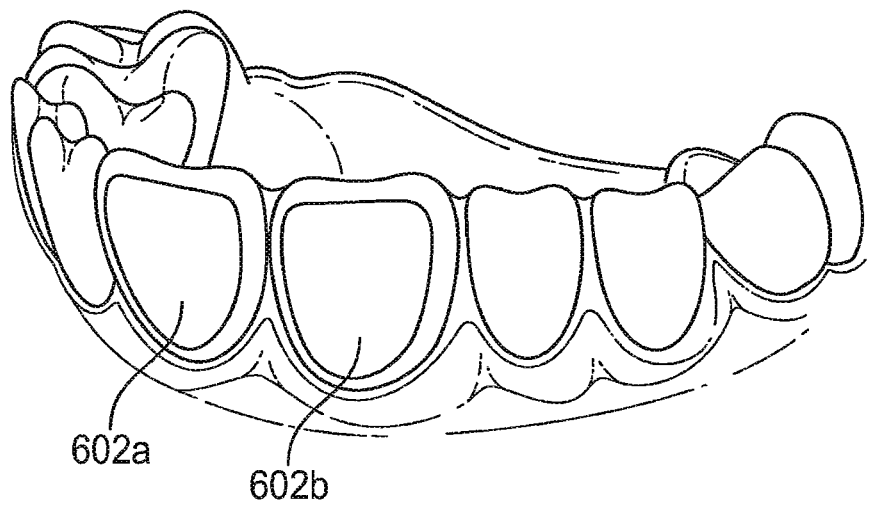
Figure 7G:
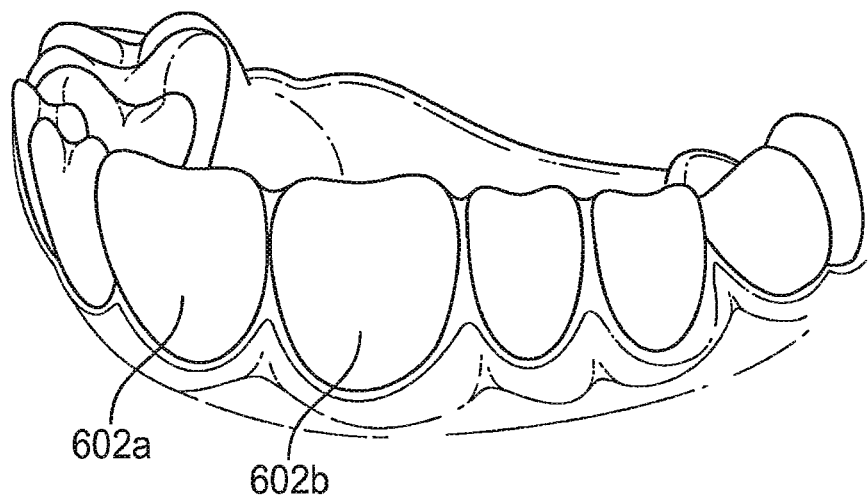

After at least some restorative material 608 is introduced into the mold cavity, the practitioner may place at least a portion of each of door bodies 200, 300 within the corresponding apertures 104a and 104b (FIG. 7E). The door bodies 200, 300 may be used to shape one or more layers of restorative material 608 on the surface of the tooth, to compress restorative material 608 within the mold cavity, or any combination thereof. In some examples, the door bodies 200, 300 may shape one or more layers of restorative material on the lingual or facial surface of the tooth.

In some examples, the practitioner may cure the restorative material 608, either while the door bodies 300 and 200 are mated in the mold body 102 or after removing one or more of the door bodies 300 and 200. For example, in examples in which the restorative material is light curable, the practitioner may expose the restorative material to the curing light (e.g., a blue light) through one or both of the mold bodies 102, 106, which may be formed of a material transparent to the curing light. The practitioner may remove the door bodies 300 and 200 and the mold bodies 102 and 106 from the teeth 602a and 602b, which now have restored structure defined by the restorative material (FIG. 6F). Removing the mold bodies 102 and 106 may include separating the mold body 102 from the mold body 106, which may include, for example, disengaging one or more clamps 604a and 604b with portions of each of mold bodies 102 and 106. In some examples, the one or more of the door bodies 300 or 200 may leave "witness marks" on the lingual or facial surface of the tooth, but such marks may be relatively easily removable because they are relatively thin. In some examples, the practitioner may finish the teeth 602a and 602b, which now include restored dental structure defined by the restorative material, such as by polishing, to remove flash or other undesired surface imperfections (FIG. 6G).

In some examples, the practitioner may place a release film on at least a portion of a surface of door body 200, 300 before placing the at least a portion of door body 200, 300 within respective aperture 104a and/or 104b. The release film may reduce the likelihood of trapping air within the mold cavity during stamping of the restorative material with door body 200, 300 and/or may facilitate release of restorative material 608 from the surface of door body 200, 300. The practitioner may remove the at least a portion of door body 200, 300 from respective aperture 104a and/or 104b, remove the release film from the at least a portion of the surface or surfaces, place additional restorative material through aperture 104a and/or 104b and into the mold cavity, and place the at least a portion of door body 200, 300 (or, in some examples, a different door body) within respective aperture 104a and/or 104b. In some examples, door body 200, 300 may be removed from respective aperture 104a and/or 104b and remain connected to mold body 102. For example, door body 200, 300 may be connected to mold body 102 via a door hinge (e.g., door hinge 316 shown in FIG. 4B) and may be removed from the respective aperture 104a and/or 104b while remaining connected to mold body 102 via the door hinge.

In addition to, or instead of, the release film, in some examples, the practitioner may apply a coating on at least a portion of a surface of the door body 200, 300 intended to contact the restorative material before placing the at least a portion of door body 200, 300 within respective aperture 104a and/or 104b. The coating may reduce the likelihood of trapping air within the mold cavity during stamping of restorative material 608 with door body 200, 300 and/or may facilitate release of restorative material from the surface of door body 200, 300. The practitioner may subsequently remove the at least a portion of door body 200, 300 from respective aperture 104a and/or 104b, place additional restorative material 608 through aperture 104a and/or 104b and into the mold cavity, and place the at least a portion of door body 200, 300 (or, in some examples, a different door body) within respective aperture 104a and/or 104b. Release coatings may also be applied to any of the mold components during the manufacturing process. The coating may be removable or non-removable from the mold component by the practitioner. For example, in some examples, a practitioner may remove the coating after using door body 200, 300 to place restorative material 608.

In some examples, placement of the at least a portion of door body 200, 300 within respective aperture 104a and/or 104b provides one or more of final shaping or layering of at least a portion of the dental restoration. The method shown in FIGS. 7A-7G may further include placing one or more additional door bodies within aperture 104a and/or 104b to shape an underlying shade layer, form one or more structures such as mamelons, grooves, and/or pits, to provide near net shaping, and/or to provide an intermediate layer of restorative material.

For example, in the method shown in FIGS. 7A-7G, a practitioner may introduce a first layer of restorative material through aperture 104a and/or 104b and into the mold cavity, place a first door body within respective aperture 104a and/or 104b to form a first layer of the dental restoration, cure the first layer of restorative material, remove the door body from respective aperture 104a and/or 104b, place a second layer of restorative material through aperture 104a and/or 104b and into the mold cavity, and then place a second door body within respective aperture 104a and/or 104b, and cure the second layer of restorative material to form a second layer of the dental restoration. Any suitable number of door bodies may be used to place additional layers of restorative material including, for example, different shade (color and/or translucency) layers and/or different mechanical property layers, to form structures, to provide near-net shaping, and/or to provide final shaping and/or layering. In some examples, two or more of the restorative materials are different materials. In addition, or instead, in some examples, two or more of the restorative materials are the same material.

Alternatively, or in addition, the practitioner may introduce a first restorative material through the aperture 104a and/or 104b and into the mold cavity, place a first door body within respective aperture 104a and/or 104b to form the dental restoration, cure the first restorative material, remove the door body from respective aperture 104a and/or 104b, remove mold body 102 and/or 106, manually adjust or "cut-back" the dental restoration to create an underlying geometry, and then replace mold bodies 102, 106 over teeth 602a, 602b, and repeat the molding process (including curing) with additional restorative material over the first restorative material to form the dental restoration. Any suitable number of door bodies, mold bodies, and restorative materials (with appropriate intermittent cure steps for each restorative material) may be used to place additional layers of restorative material including, for example, different shade layers and/or layers having different mechanical properties, to form structures, to provide near-net shaping, and/or to provide final shaping and/or layering. In some examples, two or more of the restorative materials are different materials.

In some examples, the same door body may be used to provide multiple functions. For example, the same door body may be used to apply an intermediate layer of restorative material and/or form structures. In other examples, different door bodies may be used for one or more functions, e.g., each function described above or two or more of the functions described above. When different door bodies are used for a particular aperture, the doors may be numbered or otherwise labeled to indicate the sequence in which the doors may be used. Any suitable combination of door bodies, each for providing one or more functions, may be used to achieve the desired dental restoration characteristics.

In some examples, at least one of mold body 102, mold body 106, door body 200, 300 may define at least one protrusion, such as the protrusions 610a and 610b defined by mold body 102 shown in FIGS. 7B-7E. In some examples, protrusion 610a, 610b may be configured to provide a gripping mechanism for a practitioner, e.g., the hand of the practitioner or a tool manipulated by the practitioner. At least one of attaching mold body 102 and/or 106 to teeth 602a and/or 602b, placing at least the portion of door body 200, 300 within respective aperture 104a and/or 104b, or removing door body 200, 300, mold body 102, and/or 106 from teeth 602a and/or 602b may be facilitated by gripping the at least one protrusion 610a, 610b.

For example, a practitioner may grip one or more of protrusion 610a, 610b to attach mold body 102 to teeth 602a and/or 602b and/or to remove mold body 102 from teeth 602a and/or 602b. In some examples, protrusion 610a, 610b may define a structure configured to mate with at least a portion of a clamp and the method may further comprise mating at least the portion of the clamp with the structure. For example, as shown in FIGS. 7B-7E, protrusions 610a and 610b may each define a structure configured to mate with at least a portion (e.g., the ends or end portions) of clamp 604a or 604b and the method may further comprise mating portions of clamps 604a and 604 with the structures of the respective protrusions 610a and 610b.

In some examples, one or more protrusions 610a, 610b may define at least one lever configured to provide a mechanism for use in prying the respective mold body 102 or mold body 106 away from the one or more teeth around which it is positioned. A practitioner may, for example, remove mold body 102 or mold body 106 from the at least one tooth using the lever to apply force to pry mold body 102 or mold body 106 away from the tooth to be restored. In this way, in some examples, a practitioner may use protrusion 610a and/or 610b to move mold body 102 relative to teeth 602a and 602b. In addition to, or alternatively to, protrusions 610a, 610b, indentations may provide mating or movability features for mold body 102 and/or 106. For example, mold body 102 and/or 106 may include indentations configured to mate with at least a portion of a clamp.

In addition to the advantages of tool 100 of FIG. 1, inclusion of the contoured door bodies of FIGS. 2A-7E may allow for shaping/contouring with use of a contoured surface of the door body designed to mate with the respective aperture. The fit between the door body and respective aperture may be close-fit, such that the door body substantially covers (e.g., completely covers or nearly covers) the aperture. The inside surface of the door body may be contoured to match the contour of the restoration design and features, providing for a molded finish while still providing the practitioner greater control. Additionally, as described above, multiple door bodies may be used for different functions.

In some examples, when restorative material is introduced into a mold cavity that is defined by a mold body, e.g., described with respect to FIGS. 1-7G, excess restorative material may flow into unintended areas in the patient's mouth. This excess restorative material may be referred to as flash material. When cured, the flash material may be difficult to remove. In some examples, a tool used to form a dental restoration, such as a mold body, can include one or more structural features that are configured to help reduce the amount of flash material that may result after restorative material is introduced into a cavity at least partially defined by the tool and/or may result in flash being less in more critical and/or hard to access areas of the tooth while diverting the flow or excess restorative material, and thus flash, to less critical and/or more accessible areas of the tooth where flash may easily be removed. Example structural features are described with respect to FIGS. 8-16. These structural features can be used in combination with any of the other features of tools described herein, such as, but not limited to, door hinges, mold body clamps, release coatings, and the like.

Figure 8:
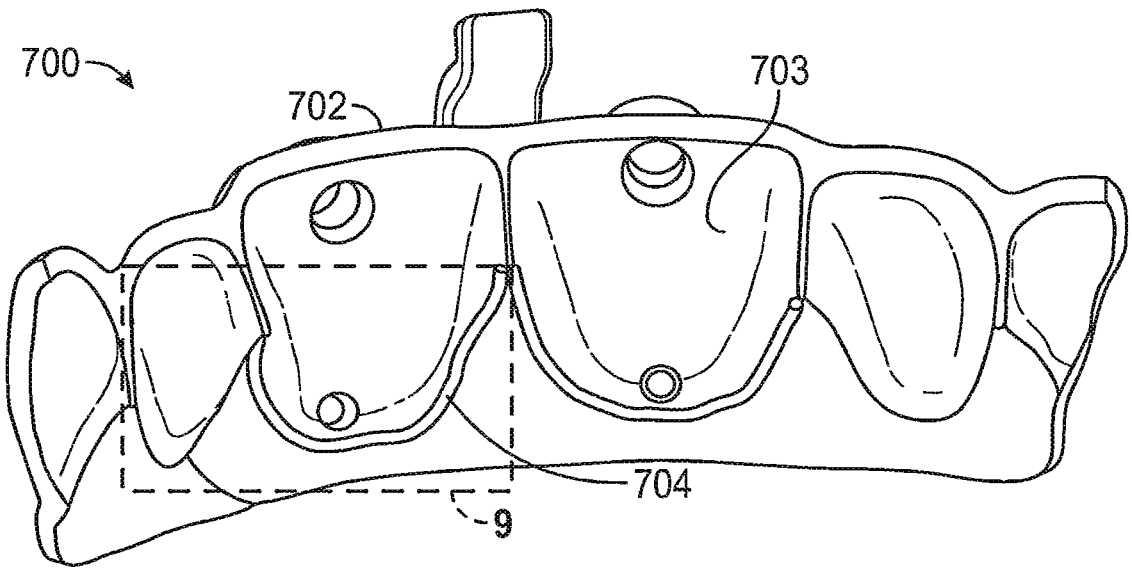
FIGS. 8 and 9 are interior views of another example tool for forming a dental restoration.
Figure 9:
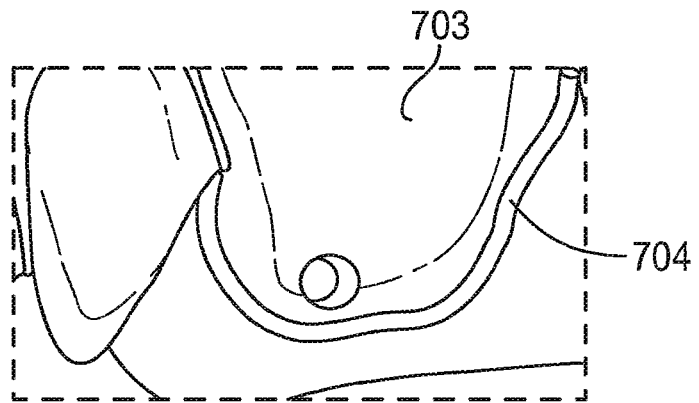

FIGS. 8 and 9 are interior views of another example tool 700 that can be used to form a dental restoration. The tool includes a mold body 702 configured to provide a customized fit with at least one tooth of a patient. Mold body 702 may be configured to combine with at least the at least one tooth of the patient to define a mold cavity 703 encompassing at least a portion of desired tooth structure of the at least one tooth of the patient. Restorative dental material is introduced into mold cavity 703 (partially shown in FIGS. 8 and 9) in order to define a dental restoration. The interior view of mold body 702 shown in FIGS. 8 and 9 shows the surface of the tool that defines at least part of mold cavity 703 and faces inward into mold cavity 703. In in the example shown in FIGS. 8 and 9, mold body 702 defines a ridge 704 configured to contact at least a portion of a tooth to be restored of the at least one tooth to concentrate sealing pressure at at least a portion of a perimeter of the mold cavity.

For example, mold body 702 may be configured to be placed at a surface of a tooth such that ridge 704 is at a perimeter of a mold cavity that is formed by mold body 702 and the tooth when mold body 702 is placed over the surface of the tooth. Ridge 704 may be configured to extend toward the tooth to such an extent such that it creates sealing pressure against the tooth. The sealing pressure may function to reduce or prevent the seepage of restorative material from the mold cavity such that flashing is either prevented altogether, substantially thin such that it is relatively easy to remove even after curing of the restorative material, and/or in more accessible and/or less critical areas of the tooth.

For example, a ridge, such as ridge 704, may concentrate pressure and promote sealing in critical areas of a restoration, such as the gingival margin and/or interproximal contacts, where excess flash can be difficult to see and remove. Left in place, residual flash in these areas may have undesirable effects such as entrapment of food particles and gingival irritation. A ridge such as ridge 704 may assure that excess restorative material may preferentially flow toward vents and toward more accessible and less critical areas of the tooth, such as the incisal edge, where flash may be relatively easily seen and removed during finishing of the restoration.

In some examples, the design of sealing ridges may be particularly enabled by CAD tools and the size, shape and/or position can be optimized based on analytical tools such as finite element modeling and/or machine learning based on feedback from practitioners.

Although illustrated as being at a perimeter of the mold cavity configured to be near a gingival contour of the tooth, ridge 704 may be at any suitable position at a perimeter of the mold cavity. A ridge such as ridge 704 may be used in combination with any of the example tools described herein. For example, any of the mold bodies described herein may include a ridge to concentrate sealing pressure at a perimeter of a mold cavity.

When tool 700 is formed using digital design, e.g., based on a 3D model of at least part of a patient's tooth structure, the patient's gingival margin can be determined. Thus, the digital design may permit ridge 704 to be properly positioned on mold body 702. In contrast, when a mold body is formed using a wax model or other physical model of the patient's tooth, the gingival margin may not be readily visible or determinable. In this way, digital design may facilitate the design and manufacture of tool 700.

Figure 10:
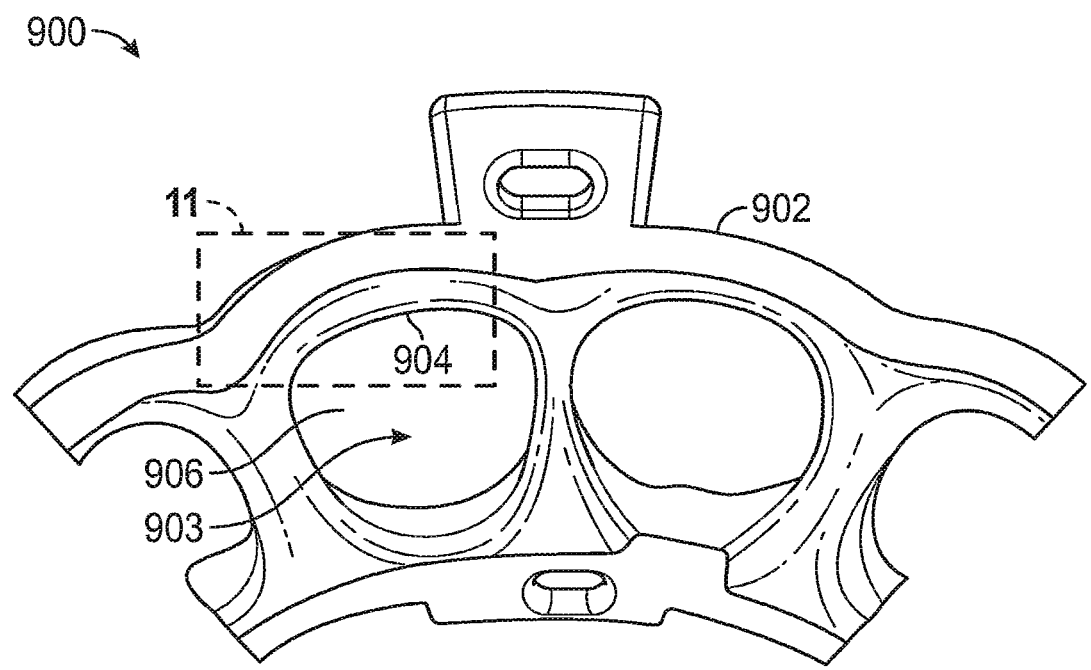
FIGS. 10 and 11 are bottom views of another example tool for forming a dental restoration.
Figure 11:
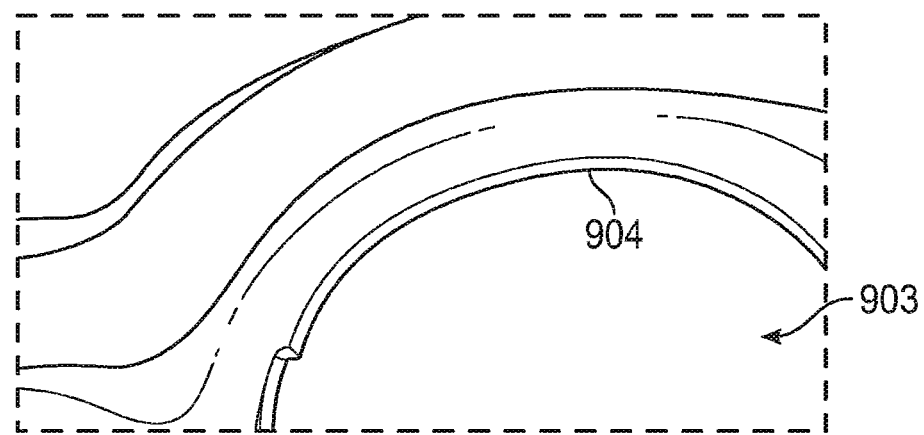

FIGS. 10 and 11 are bottom views of another example tool 900 for forming a dental restoration. The tool includes a mold body 902 configured to provide a customized fit with at least one tooth of a patient. Mold body 902 may be configured to combine with at least the at least one tooth of the patient to define a mold cavity 903 encompassing at least a portion of desired tooth structure of the at least one tooth of the patient. Mold cavity 903 is only partially shown in FIGS. 10 and 11. Like mold body 702 of FIGS. 7 and 8, mold body 902 may include a ridge 904 configured to contact at least a portion of a tooth to be restored of the at least one tooth to concentrate sealing pressure at at least a portion of a perimeter of the mold cavity.

Ridge 904 may be similar to ridge 704 of FIGS. 8 and 9. For example, mold body 902 may be configured to be placed at a surface of a tooth such that ridge 904 is at a perimeter of a mold cavity that is formed by mold body 902, the tooth, and/or any other components when mold body 902 is placed on the surface of the tooth. Ridge 904 may be configured to extend toward the tooth to such an extent such that it creates sealing pressure against the tooth. The sealing pressure may function to reduce or prevent the seepage of restorative material from the mold cavity such that flashing is either prevented altogether, substantially thin such that it is easy to remove even after curing of the restorative material, and/or in more accessible and/or less critical areas of the tooth.

For example, a ridge, such as ridge 904, may concentrate pressure and promote sealing in critical areas of a restoration, such as the gingival margin and/or interproximal contacts, where excess flash can be difficult to see and remove. Left in place, residual flash in these areas may have undesirable effects such as entrapment of food particles and/or gingival irritation. A ridge such as ridge 904 may assure that excess restorative material may preferentially flow toward vents and toward more accessible and less critical areas of the tooth, such as the incisal edge, where flash may be relatively easily seen and removed during finishing of the restoration.

Although illustrated as being at a perimeter of an opening 906 of mold body 902, ridge 904 may be at any suitable position at a perimeter of the mold cavity. Opening 906 is, for example, an opening defined by mold body 902 and configured to receive at least part of a tooth of the patient in order to mate mold body 902 with the at least one tooth in order to define mold cavity 903. A ridge such as ridge 904 may be used in combination with any of the example tools described herein. For example, any of the mold bodies described herein may include a ridge to concentrate sealing pressure at a perimeter of a mold cavity.

Use of a ridge, such as ridge 704 or ridge 904, may reduce the likelihood of flash by ensuring good sealing at the perimeter of the mold cavity to be filled. For example, these ridges may concentrate clamping pressure at the base of the tooth, sealing the mold cavity against the pressure developed during filling the mold with restorative material via a traditional injection port, during packing of the restorative material through an aperture such as apertures 104 and 504 discussed above, or during placement of the door bodies such as those discussed above with reference to FIGS. 1-7G. Any flash that does occur may be relatively thin along the ridgeline, making it easy to remove with a dental instrument.

Figure 12:
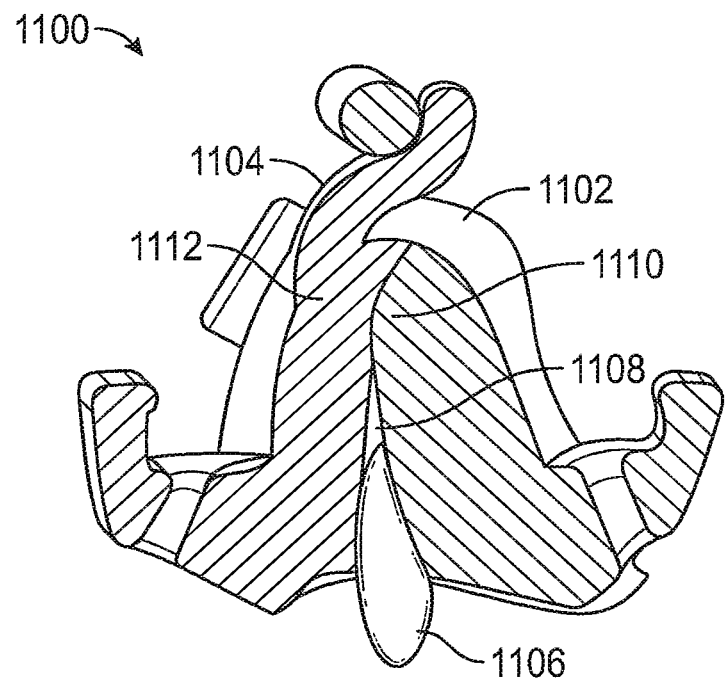
FIGS. 12 and 13 are assembled and expanded cross-sectional views of another example tool for forming a dental restoration.
Figure 13:
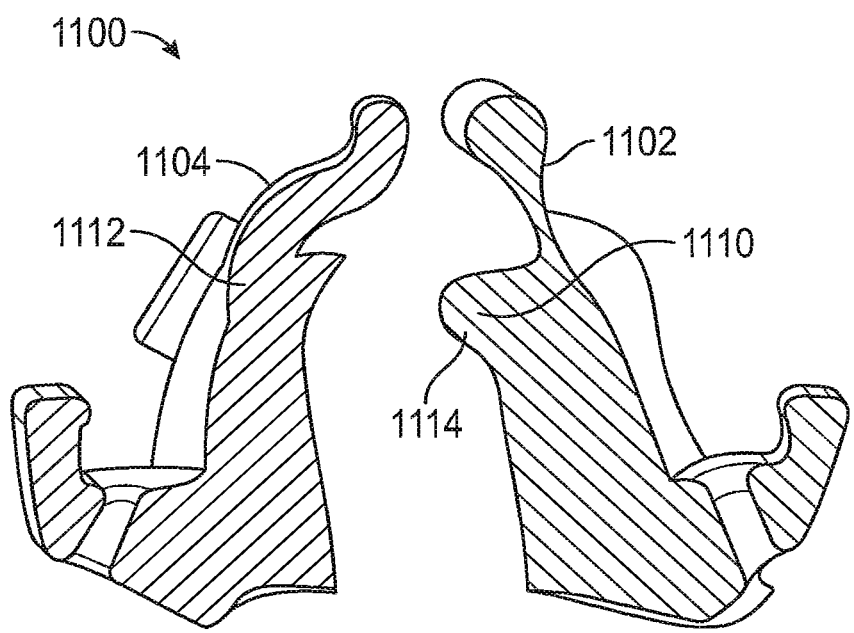

FIGS. 12 and 13 are assembled and expanded cross-sectional views of another example tool 1100 for forming a dental restoration. In the example shown in FIGS. 11 and 12, tool 1100 includes a mold body 1102 and a mold body 1104, which are each configured to provide a customized fit with at least one tooth of a patient, such as tooth 1106 (only partially shown in FIG. 12). Mold body 1102, 1104 may be configured to combine with tooth 1106 to define a mold cavity 1108 encompassing at least a portion of desired tooth structure of tooth 1106. A mold cavity 1108 is configured to receive restorative material, e.g., which may be used to form a dental restoration. Mold bodies 1102, 1104 may be, for example, examples of mold bodies 102, 106 of FIG. 1 or any of the other mold bodies described herein.

When mold bodies 1102 and 1104 combine with tooth 1106 to form mold cavity 1108, a portion 1110 of mold body 1102 may be configured to abut a portion 1112 of mold body 1104. Portion 1110 of mold body 1102 includes an overbuilt portion 1114, as shown in in FIG. 13. Thus, when portion 1110 of mold body 1102 abuts portion 1112 of mold body 1104, overbuilt portion 1114 is configured to provide intimate contact between portion 1110 of mold body 1102 and portion 1112 of mold body 1104. For example, because overbuilt portion 1114 is not designed to purely mimic the shape (e.g., contour and dimensions) of portion 1112 of mold body 1104 that it abuts, as it would in a simple mold that purely outlines the desired tooth structure, but is instead overbuilt, it may create sealing pressure (e.g., may define a gasket) between portion 1110 of mold body 1102 and portion 1112 of mold body 1104 when mold bodies 1102 and 1104 combine with tooth 1106 to form mold cavity 1108, as shown in FIG. 12. The sealing pressure may function to reduce or prevent the seepage of restorative material from mold cavity 1108 such that flashing is either prevented altogether, relatively thin such that it is easy to remove even after curing of the restorative material, and/or in more accessible and/or less critical areas of the tooth.

In some examples, the design of overbuilt portions may be particularly enabled by CAD tools and the size, shape and/or position can be optimized based on analytical tools such as finite element modeling and/or machine learning based on feedback from practitioners.

For example, an overbuilt portion, such as overbuilt portion 1114, may concentrate pressure and promote sealing in critical areas of a restoration, such as the gingival margin and/or interproximal contacts, where excess flash can be difficult to see and remove. Left in place, residual flash in these areas may have undesirable effects such as entrapment of food particles and/or gingival irritation. An overbuilt portion, such as overbuilt portion 1114, may help excess restorative material preferentially flow toward vents and toward more accessible and less critical areas of the tooth, such as the incisal edge, where flash may be relatively easily seen and removed during finishing of the restoration.

In addition, overbuilt portion 1114 may allow for larger manufacturing tolerances when forming mold bodies 1102, 1104 that mate together and define a relatively tight seal between mold bodies 1102, 1104. For example, if one or both mold bodies 1102, 1104 are underformed during manufacture, mold bodies 1102, 1104 may nevertheless still mate together to form a relatively tight seal therebetween due to overbuilt portion 1114.

Although illustrated as being near an incisal edge of mold cavity 1108, overbuilt portion 1114 may be at any suitable position where intimate contact between two pieces of tool 1100 may be desired. Although portion 1112 may be configured to form a recess, the portion may be substantially flat, form a protrusion, or form any suitable shape according to particular needs.

In some examples, overbuilt portion 1114 may be formed from a compressible material and may be configured to be compressed against portion 1112 of mold body 1104 when mold bodies 1102 and 1104 combine with tooth 1106 to form mold cavity 1108, as shown in FIG. 12. In addition, or alternatively, portion 1112 of mold body 1104 configured to abut overbuilt portion 1114 may be formed from a compressible material and may be configured to be compressed against portion 1110 of mold body 1102 when mold bodies 1102 and 1104 combine with tooth 1106 to form mold cavity 1108. Thus, in some examples, one or both overbuilt portion 1114 and portion 1112 of mold body 1104 configured to abut overbuilt portion 1114 may be formed from a compressible material.

An overbuilt portion such as overbuilt portion 1114 may be used in combination with any of the example tools described herein. For example, any of the mold bodies described herein may include an overbuilt portion to concentrate sealing pressure against another mold body, a tooth, or a door body, according to particular needs.

Overbuilt portions such as overbuilt portion 1114 that are designed to be between mold components may reduce or even prevent flash in at least some areas of the tooth by ensuring good sealing between different portions of a tool for forming a dental restoration. As with the sealing ridges, the overbuilt portion of a mold body may be a digitally enabled approach that can be designed based on scan data of a patient and may ensure robust and intimate contact of the mold faces at the seams. A designer may tune the amount of overbuild between the mold faces to optimize performance. In contrast, when mold bodies configured to engage one another are manually formed over a physical model of patient's tooth structure, a practitioner may form a unitary structure over the physical model and then cut the unitary structure to define two mold bodies that are configured to engage one another. The mold bodies formed by cutting the unitary structure results in mold bodies with mating structures that have the same dimensions, rather than an overbuilt mating structure. The mating structures with the same dimensions may not permit the same type of robust and intimate contact resulting from the overbuilt mating portions described with respect to FIGS. 12A and 12B.

Figure 14A:
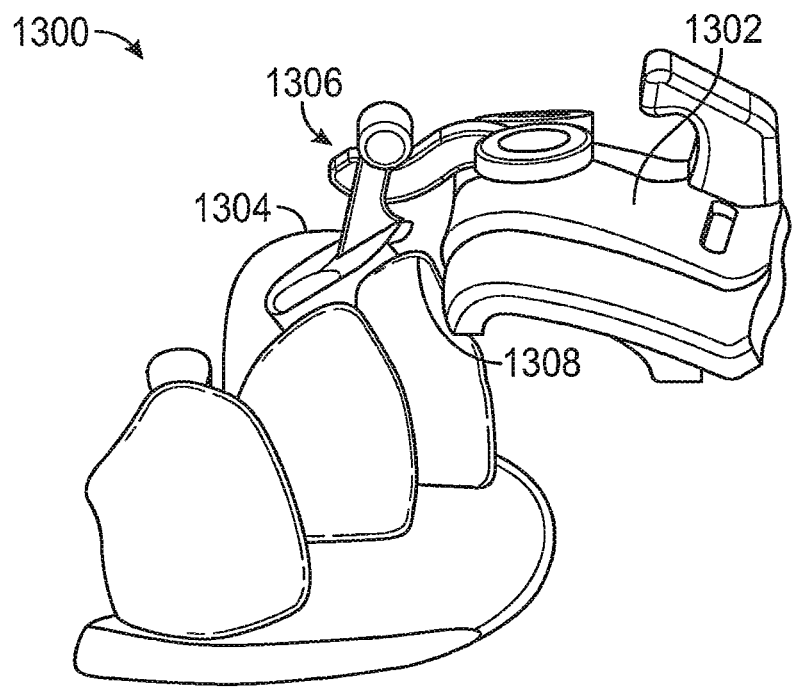
FIGS. 14A and 14B are side and top views of another example tool for forming a dental restoration.
Figure 14B:
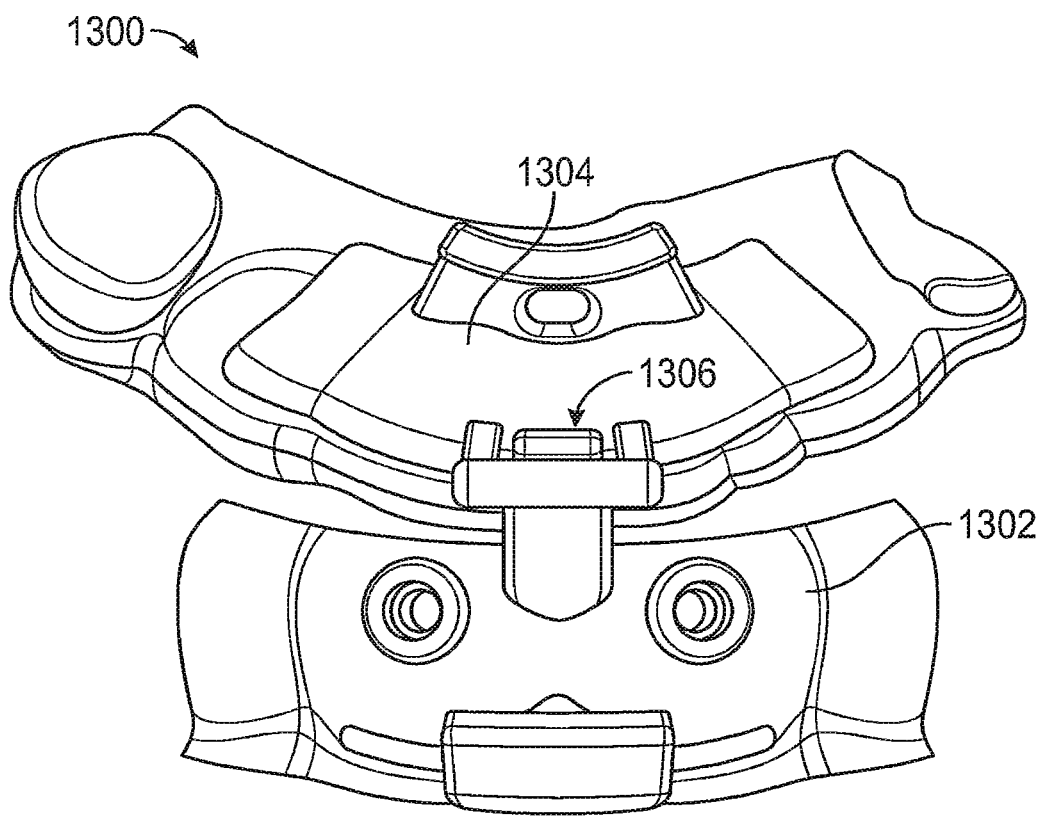

FIGS. 14A and 14B are side and top views of another example tool 1300 for forming a dental restoration. Tool 1300 includes a mold body 1302 and a mold body 1304, each configured to provide a customized fit with at least one tooth of a patient. Mold bodies 1302, 1304 may be configured to combine with the tooth or teeth of the patient to define a mold cavity encompassing at least a portion of desired tooth structure of the tooth or teeth. Mold bodies 1302, 1304 may be, for example, examples of mold bodies 102, 106 of FIG. 1 or any of the other mold bodies described herein.

Mold bodies 1302, 1304 may be configured to form a clamp 1306 when engaged with one another, as shown in FIGS. 14A and 14B. Clamp 1306 may be an example of clamp 518 shown in FIGS. 6A and 6C. In some examples, clamp 1306 may alternatively be a clip, a hinge, or another structure configured to engage mold bodies 1302, 1304 with each other. In another example, mold bodies 1302 and 1304 may be configured to attach to each other via a snap fit or another interlocking mechanism. When mold bodies 1302, 1304 combine with the at least one tooth of the patient to form the mold cavity, clamp 1306 is configured to be at least proximate an incisal edge 1308 of at least one of the tooth or teeth to be restored.

A clamp, such as clamp 1306, configured to be proximate an incisal edge of a tooth or teeth to be restored may be used in combination with any of the example tools described herein. For example, any of the mold bodies described herein may form a clamp with another door body, according to particular needs.

In cases where an incisal edge is being formed by a mold tool such as tool 1300, the incisal edge may be a likely place to experience flash formation. An integrated mold clamping feature, such as clamp 1306 may help ensure relatively tight clamping between the mold bodies 1302, 1304 to help reduce or eliminate the flash that occurs along this edge. Any flash that does occur may be very thin along incisal edge 1308 and may be relatively easily removed with a dental instrument.

In some examples, by providing relatively tight clamping along the incisal edge, a clamp such as clamp 1306 may help excess restorative material preferentially flow toward vents where flash may be relatively easily seen and removed during finishing of the restoration.

In addition, in some examples, the integrated mold clamping feature, such as clamp 1306 may help mold bodies 1302, 1304 self-align with each other and stay fixed relatively to each other. These features may increase the ease of use of tool 1300.

Figure 15:
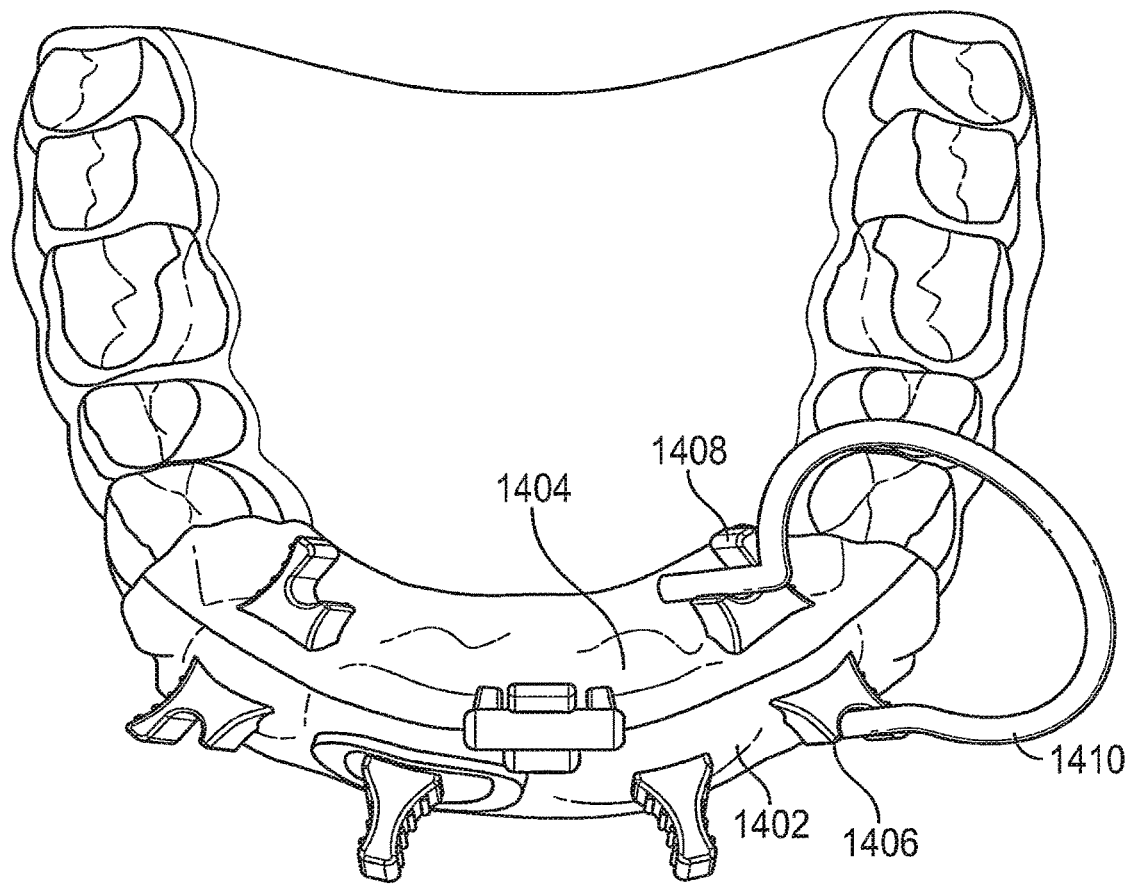
FIG. 15 is a top view of another example tool for forming a dental restoration.

FIG. 15 is a top view of another example tool 1400 for forming a dental restoration. Tool 1400 includes mold bodies 1402 and 1404, each configured to provide a customized fit with at least one tooth of a patient and configured to combine with the at least one tooth of the patient to define a mold cavity encompassing at least a portion of desired tooth structure of the at least one tooth. Mold bodies 1402, 1404 may be, for example, examples of mold bodies 102, 106 of FIG. 1 or any of the other mold bodies described herein.

Mold body 1402 may define a structure 1406 and mold body 1404 may define a structure 1408. Structure 1406 may be configured to mate with at least a portion of a clamp 1410 and structure 1408 may be configured to mate with at least another portion of clamp 1410. Clamp 1410 may be configured to secure mold bodies 1402 and 1404 to one another when portions of clamp 1410 mate with structures 1406 and 1408. In some examples, clamp 1410 may alternatively be a clip, a hinge, or another structure configured to engage mold bodies 1402 and 1404 with one another.

Structures 1406 and 1408 may be integrally formed in mold bodies 1402 and 1404 to provide an integral feature by which a clamp, such as clamp 1410 may be attached to both mold bodies 1402 and 1404 to hold mold bodies 1402 and 1404 together. Although structures 1406 and 1406 are illustrated as protrusions, structures 1406 and 1408 may alternatively be indentations or any other structure capable of attaching clamp 1410 to mold bodies 1402 and 1404. In some examples, clamp 1410 may be integrally formed in mold bodies 1402 and 1404 and/or structures 1406 and 1408. In some examples, mold bodies 1402 and 1404 may include structures 1406 and 1408 or structures similar to structures 1406 and 1408 configured to mate with another dental instrument other than clamp 1410 that may be used to place, align, secure, manipulate, and/or release mold bodies 1042 and/or 1404. For example, mold bodies 1402 and/or 1404 may include one or more structures such as, for example, a pry bar, a lever, a handle, an alignment feature, or the like, according to particular needs.

Integral structures such as structures 1406 and 1408 configured to mate with portions of a clamp, such as clamp 1410, may be used in combination with any of the example tools described herein. For example, any of the mold bodies or door bodies described herein may form a structure configured to mate with a clamp to allow the mold body or door body to be held together with another component, according to particular needs.

As discussed above with respect to protrusion 522b in FIG. 6A, clamping pressure that can be placed on the outside of two mold halves, such as mold bodies 1402 and 1404, may help ensure tight contact while filling the mold cavity defined by mold bodies 1402, 1404 with a restorative material, and reduce flash along the gingival margin and in the interproximal areas. This clamping pressure may counteract the application pressure of the restorative as the practitioner is filling.

The sealing pressure may function to reduce or prevent the seepage of restorative material from the mold cavity such that flashing is either prevented altogether, relatively thin such that it is easy to remove even after curing of the restorative material, and/or in more accessible and/or less critical areas of the tooth.

For example, clamping pressure may concentrate pressure and promote sealing in critical areas of a restoration, such as the gingival margin and/or interproximal contacts, where excess flash can be difficult to see and remove. Left in place, residual flash in these areas may have undesirable effects such as entrapment of food particles and/or gingival irritation. Clamping pressure may help excess restorative material preferentially flow toward vents and toward more accessible and less critical areas of the tooth, such as the incisal edge, where flash may be relatively easily seen and removed during finishing of the restoration.

The integrated clamping locations provided by structures 1406, 1408 may allow for the easy and stable placement of the clamps, such as clamp 1410, with the ability to optimize the placement of clamp 1410 for desired force distribution. For example, using digital design, a tool designer, manually or with the aid of software, may select the locations of structures 1406, 1408 based on the pressure points that will result from placing the clamp at the particular locations.

Further, building in clamping locations in mold bodies 1402, 1404 via structures 1406, 1408 may help reduce variability of the amount of clamping pressure applied to mold bodies 1402, 1404 from practitioner-to-practitioner, and may increase the ease of use of tool 1400 (e.g., reducing the training required to use tool 1400). Rather than a practitioner applying clamps to mold bodies 1402, 1404 in an idiosynractic manner, the integrated clamping locations provided by structures 1406, 1408 may provide for relatively uniform clamping in a known, specific location (e.g., as compared to hand clamping).

Figure 16:
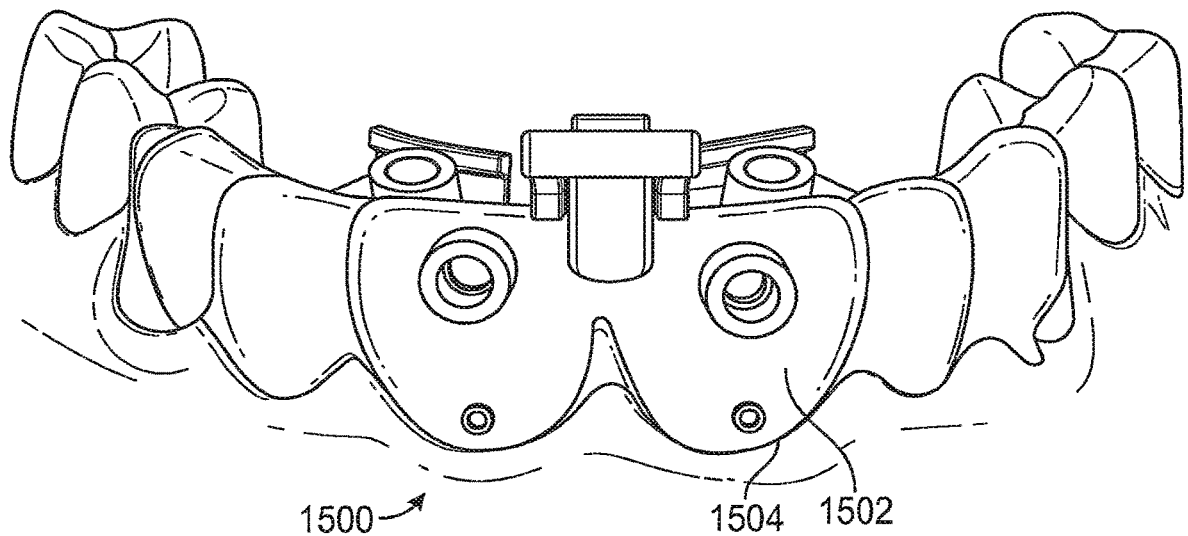
FIG. 16 is a perspective view of another example tool for forming a dental restoration.

FIG. 16 is a perspective view of another example tool 1500 for forming a dental restoration. Tool 1500 may include a mold body 1502 configured to provide a customized fit with at least one tooth of a patient and configured to combine with the at least one tooth of the patient to define a mold cavity encompassing at least a portion of desired tooth structure of the tooth to be restored. Mold body 1502 may define an edge 1504 defining a contour configured to match at least a portion of a gingival contour of a tooth to be restored. This may be referred to as gingival contouring in some examples.

A mold body with an edge configured to define a contour configured to match at least a portion of a gingival contour of a tooth to be restored may be used in combination with any of the example tools described herein. For example, any of the mold bodies or door bodies described herein may define a contour configured to match at least a portion of a gingival contour of a tooth to be restored, according to particular needs.

Contouring edge 1504 of mold body 1502 along the gingival margin may allow a practitioner access to the gingival margin and thus the ability to manage restorative material subgingivally. This may allow the practitioner to remove excess material below the gingiva before curing the composite, which may minimize the amount of flash on the final restoration.

The gingival contouring of mold body 1502 may be designed using a digital model of a patient's tooth structure. In contrast, with manual techniques for forming mold bodies using a physical model of a patient's tooth structure, the gingival margin may not be readily determinable.

Figure 17A:
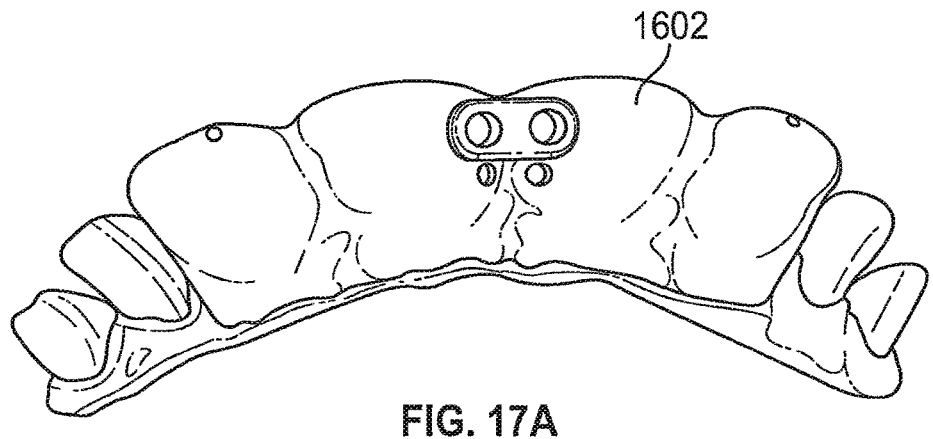
FIGS. 17A and 17B are front and top views of an example mold body of an example tool for forming a dental restoration.
Figure 17B:
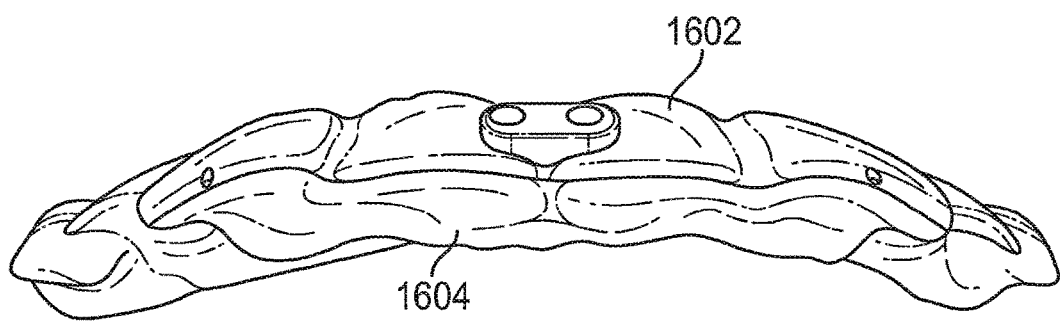
Figure 18A:
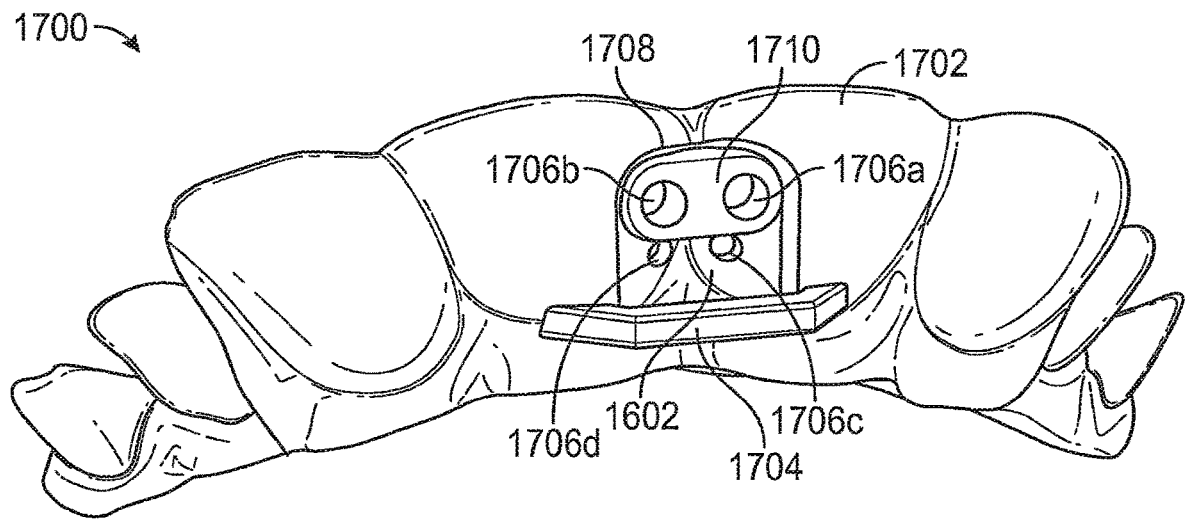
FIGS. 18A and 18B are front and bottom views of an example tool for forming a dental restoration, where the tool includes the mold body of FIGS. 17A and 17B and an additional mold body.
Figure 18B:
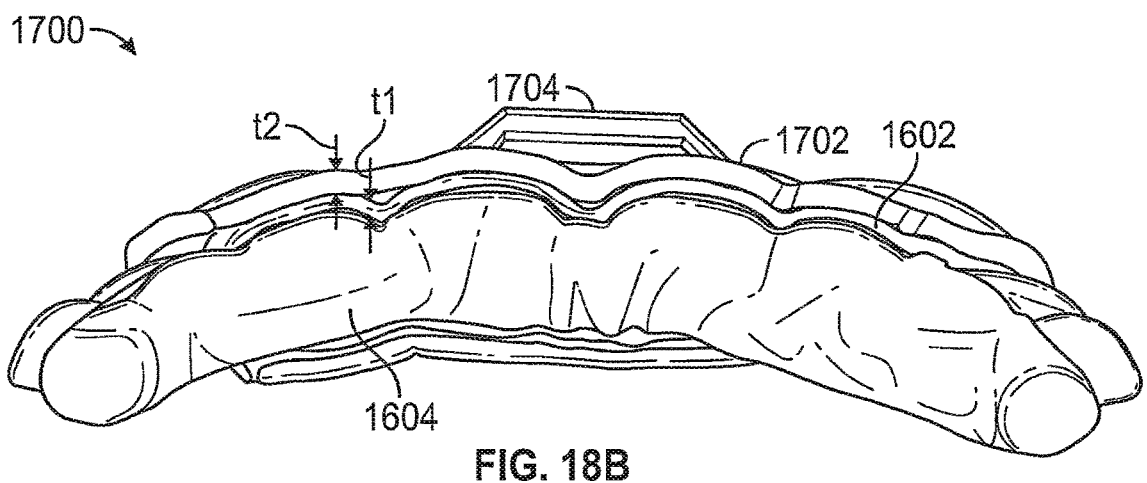

FIGS. 17A and 17B are front (e.g., facial) and top (e.g., incisal) views of another example mold body 1602 of an example tool for forming a dental restoration. FIGS. 18A and 18B are front and bottom views of another example tool 1700 for forming a dental restoration, where the tool 1700 includes mold body 1602 of FIGS. 17A and 17B and an additional mold body 1702.

Mold body 1602 may be configured to provide a customized fit with at least one tooth of a patient, such as the teeth 1604. At least a portion of the mold body 1602 may be configured to surround at least a portion of teeth 1604. Mold body 1602 may be configured to combine with teeth 1604 to define a mold cavity encompassing at least a portion of desired tooth structure of teeth 1604.

At least a portion of mold body 1702 may be configured to surround at least a portion of mold body 1602. Additionally, mold body 1702 may be stiffer than mold body 1602 such that mold body 1702 provides structural support to mold body 1602 such that the mold cavity does not expand as restorative material is inserted into the mold cavity.

In some examples, mold body 1702 may include a material that is more rigid than a material used to compose mold body 1602 such that mold body 1702 is stiffer than mold body 1602. Alternatively, or in addition, mold body 1702 may include structures that provide stiffness that is greater than that of mold body 1602. For example, a support structure 1704 may provide structural support to mold body 1702 such that mold body 1702 is stiffer than mold body 1602 along at least a portion of mold body 1702 or along the entire mold body 1702. As another example, mold body 1702 may define one dimension with a greater thickness than a corresponding dimension of mold body 1602. For example, mold body 1702 may have a thickness "t2" that is greater than a thickness "t1" of mold body 1602. As another example, mold body 1702 may include one or more ribs providing structural support to mold body 1702. Support structure 1704 may also serve as a handle for placement and/or removal of mold body 1702.

In some examples, mold body 1602 may define one or more apertures, such as apertures 1706a-1706d. Apertures 1706a and 1706b may be configured to allow placement of restorative material into the mold cavity and apertures 1706c and 1706d may allow for excess restorative material to flow out of the mold cavity. Outer mold body 1702 may define an aperture 1708 that may be larger than each of apertures 1706a-1706d and may be configured to allow access to apertures 1706a-1706d when at least a portion of mold body 1702 is surrounding at least a portion of mold body 1602. Further, larger aperture 1708 that is larger than apertures 1706a-1706d of mold body 1602 may allow for access to apertures 1706a-1706d, even when there may be misalignment between mold bodies 1602, 1702.

Additionally, in some examples, aperture 1708 being larger than apertures 1706a-1706d may prevent or reduce unwanted material flow between mold bodies 1702 and 1602. In some examples, support structure 1704 may be located proximate larger aperture 1708 to provide additional structural support proximate larger aperture 1708, where the rigidity of mold body 1702 may otherwise be compromised by larger aperture 1708.

In some examples, a reinforcement structure 1710 may be located around and/or proximate one or more of apertures 1706a-1706d to provide structural reinforcement to the mold body 1602 such that mold body 1602 retains its shape given that apertures such as apertures 1706a-1706d may otherwise compromise the structural integrity of mold body 1602. In some examples, mold body 1602 may be compressible.

The described features of mold bodies 1602 and 1702 may be combined with any of the other features described herein. In some examples, one or more of the other features described above, such as apertures, door bodies, ridges or other overbuilt portions configured to abut a tooth and/or another mold body, clamps, integrated clamping locations, and gingival contouring, may be used with mold bodies 1602, 1702.

Defining a mold cavity with an inner mold body, such as mold body 1602, which may be compliant, may allow the inner mold body to adapt around seams of the mold cavity as needed. This may help provide proper sealing between mold components to prevent flash, reduce flash, result in flash that is relatively thin such that it is easy to remove even after curing of the restorative material, and/or preferentially result in flash in more accessible and/or less critical areas of the tooth.

For example, a relatively compliant mold body, such as mold body 1602, may allow for proper sealing in some areas of a restoration, such as the gingival margin and/or interproximal contacts, where excess flash can be difficult to see and remove. Left in place, residual flash in these areas may have undesirable effects such as entrapment of food particles and/or gingival irritation. Allowing for proper sealing may assure that excess restorative material will preferentially flow toward vents and toward more accessible and less critical areas of the tooth, such as the incisal edge, where flash may be relatively easily seen and removed during finishing of the restoration.

A more rigid outer mold body 1702 nested around the more compliant mold body 1702 adds structural support to maintain the intended cavity shape. Inner mold body 1602 may intimately nest within rigid mold body 1702, which may help to increase the uniformity of the counter pressure applied by mold body of tool 1700 during the filling process.

In some examples, a mold body similar to mold body 1602 may first be placed on a lingual side of teeth 1604. Mold body 1602 may be placed on the facial side of teeth 1604 and may abut at least a portion of the mold body that is on the lingual side of the teeth. Mold body 1702 may be placed over the inner components, including mold body 1602, to help secure them in place. In some examples, a dental restoration (e.g., a veneer) may be formed by introducing a restorative material (e.g., Filtek™ Supreme Universal A2, available from 3M ESPE Dental Products in St. Paul, Minnesota) in the mold cavity through apertures 1706a and 1706b, with excess material able to flow out of apertures 1706c and 1706d. The excess material may be removed, the restorative material cured, and the tool removed. In other examples, the mold body placed on the lingual side of the teeth may be of similar rigidity as mold body 1602.

In other examples, in addition to or instead of introducing restorative material into a mold cavity via apertures 1706a, 1706b, the restorative material may be applied to teeth 1604 and then mold body 1602 may be placed on teeth 1604, and/or the restorative material may be applied to mold body 1602 and then placed on teeth 1604.

Figure 19A:
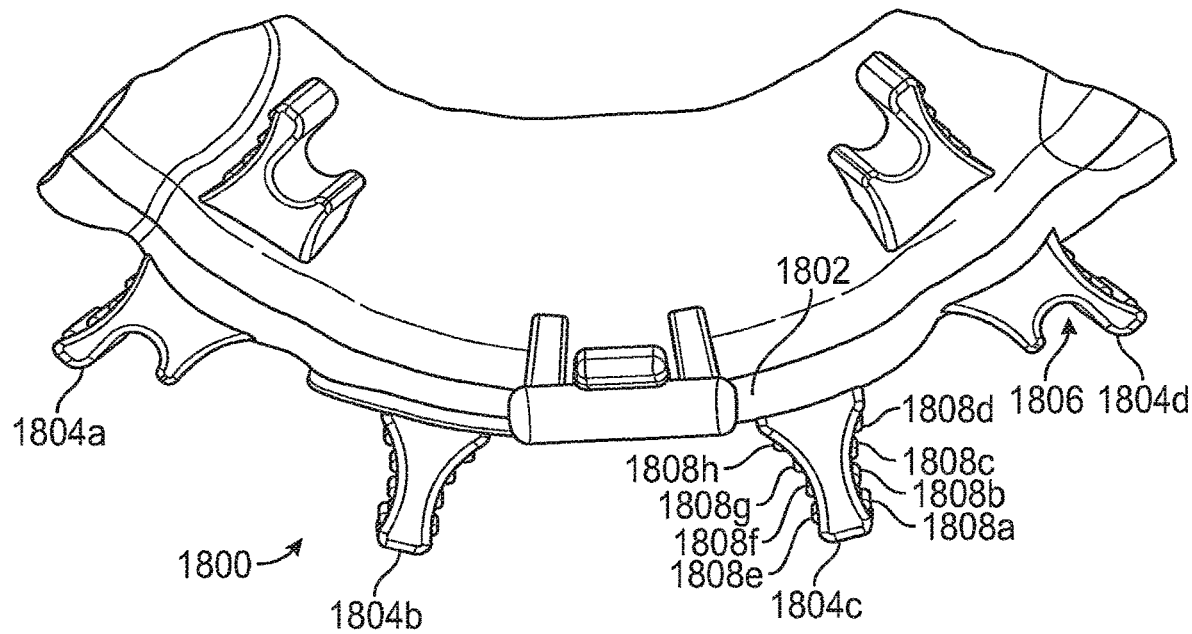
FIGS. 19A and 19B are top and perspective views of another example tool for forming a dental restoration.
Figure 19B:
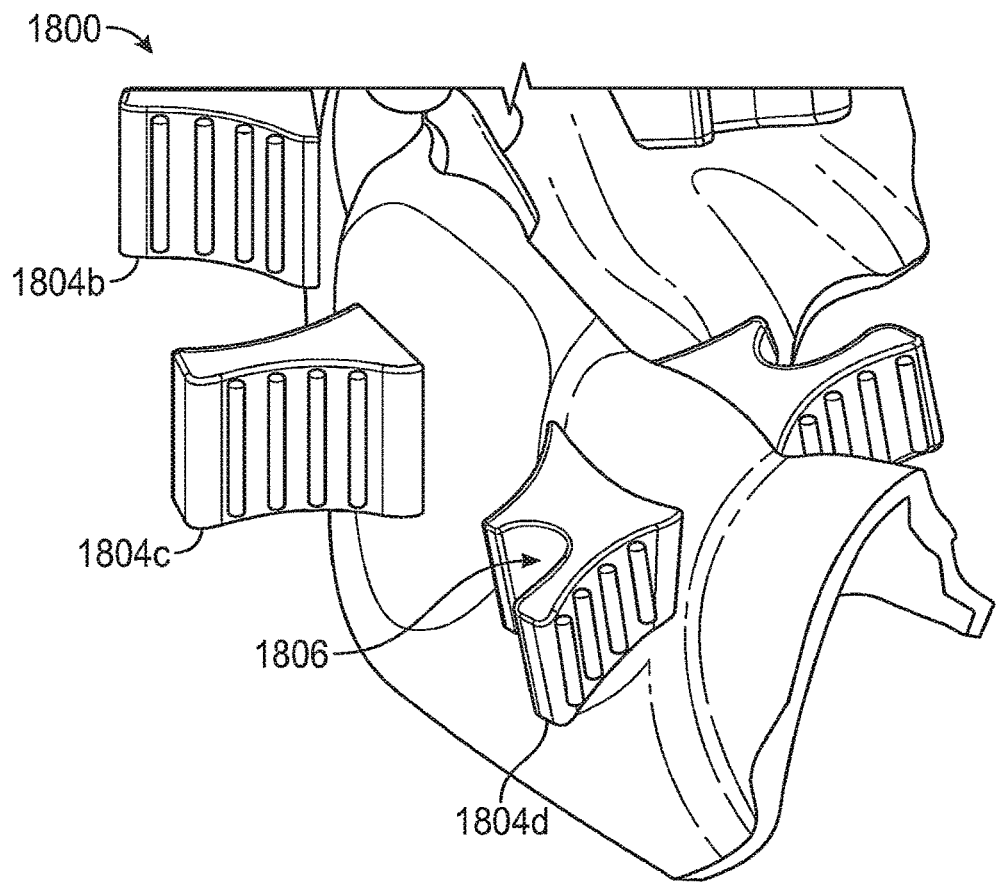

FIGS. 19A and 19B are top and perspective views of another example tool 1800 for forming a dental restoration. The tool may include a mold body 1802 configured to provide a customized fit with at least one tooth of a patient and configured to combine with the tooth or teeth of the patient to define a mold cavity encompassing at least a portion of desired tooth structure of a tooth. Mold body 1802 may define at least one protrusion, such as protrusions 1804a-1804d configured to provide a gripping mechanism for a practitioner. The grips may be configured for gripping by fingers and/or by a dental instrument such as a hemostat. In some examples, one or more of protrusions 1804a-1804d, such as 1804a and 1804d may define a structure configured to mate with at least a portion of a clamp. For example, the recess 1806 defined by protrusion 1804d may be configured to receive a portion of a clamp. In some examples, one or more of protrusions 1804a-1804d may define one or more ribs, such as ribs 1808a-1808h defined by protrusion 1804c. Ribs 1808a-1808h may allow a practitioner to better grip protrusion 1804c.

In some examples, one or more of protrusions 1804a-1804d may define one or more levers configured to provide a mechanism for use in prying mold body 1802 away from the dental restoration after curing of the dental restoration. For example, the shape of each of protrusions 1804a-1804d may define a lever that may be used in such a manner.

Protrusions configured to allow a gripping mechanism to a practitioner and/or configured to mate with a portion of a clamp, such as protrusions 1804a-1804d may be used in combination with any of the example tools described herein. For example, any of the mold bodies or door bodies described herein may include a protrusion like protrusions 1804a-1804d, according to particular needs. Protrusions 1804a-1804d are examples of protrusion 206 of FIGS. 2A and 2B and protrusion 522B of FIG. 6A.

Integrated grips provided by protrusions 1804a-1804d may increase the ease of use of any of the mold bodies described herein. For example, protrusions 1804a-1804d may allow a practitioner to easily identify the points on the tool to use for placing and removing the tool, making use of the tools more intuitive. Protrusions 1804a-1804d may also provide securement of the components (e.g., to reduce the possibility that the mold body to which the protrusion is attached is not dropped), and may also provide leverage for removing after the restorative has been cured. In some examples, protrusions may also include through holes to allow securement with floss threaded through the hole. In some examples, the protrusions may instead or additionally be configured as indentations.

In some cases, it may be desirable to form a dental structure between adjacent teeth, such as to reduce or eliminate a diastema. A mold body that is configured to provide a customized fit over one or more teeth to define a mold cavity may facilitate the formation of a dental structure between adjacent teeth. The dental structure between adjacent teeth can be an entire dental restoration or may be a part of a dental restoration, in which case the same mold body may be used to form the other parts of the dental restoration or another mold body, such as the mold bodies described above with respect to FIGS. 1-19B, may be used to form the other parts of the dental restoration.

Figure 20A:
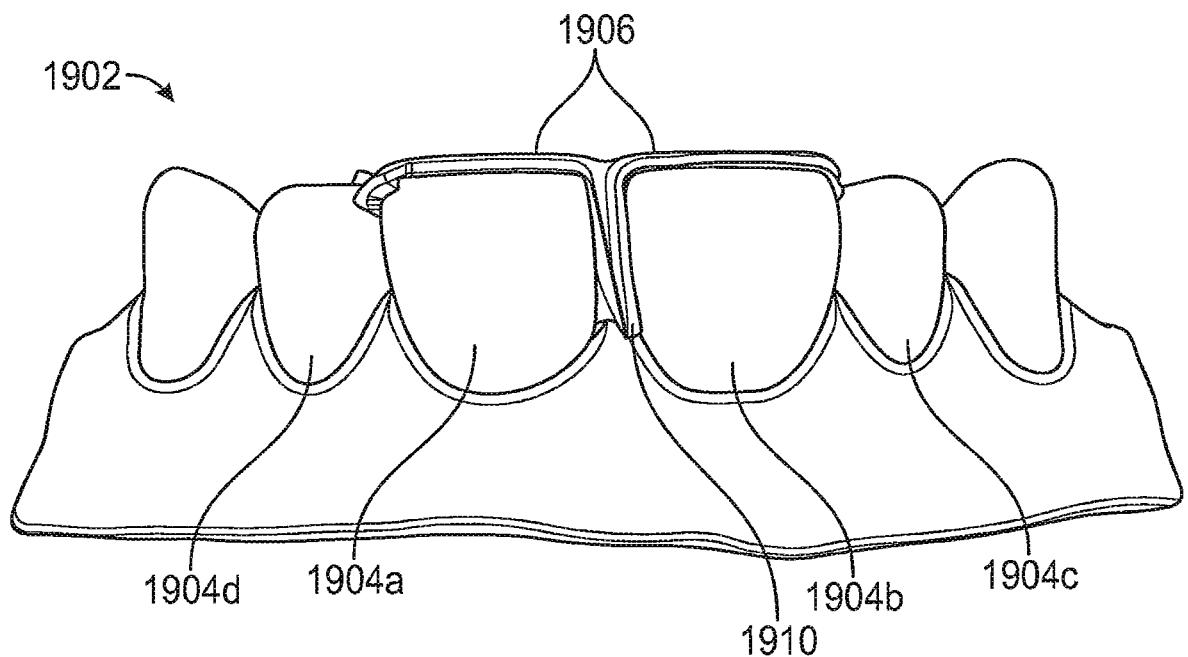
FIGS. 20A-20E illustrate another example mold body for forming a dental restoration.
Figure 20B:
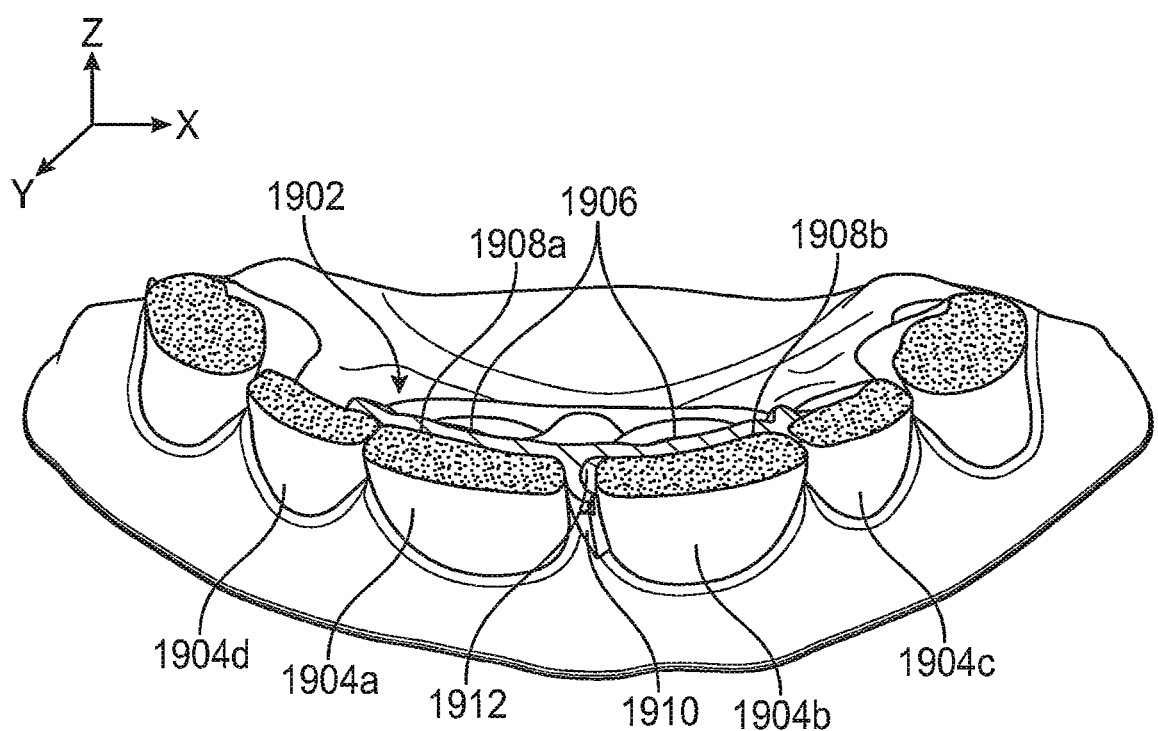
Figure 20C:
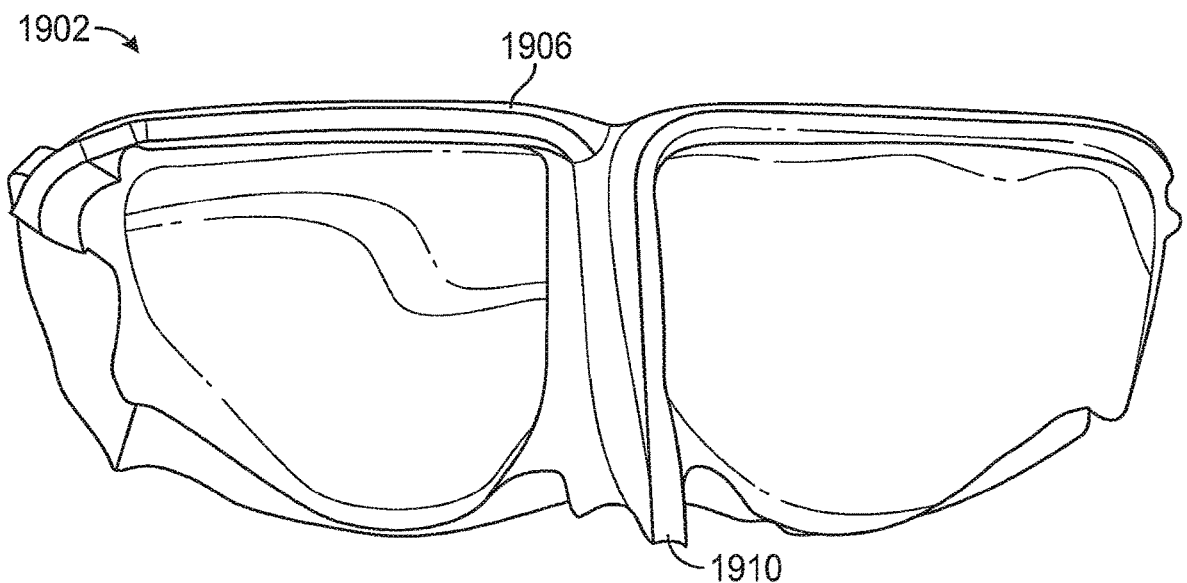
Figure 20D:
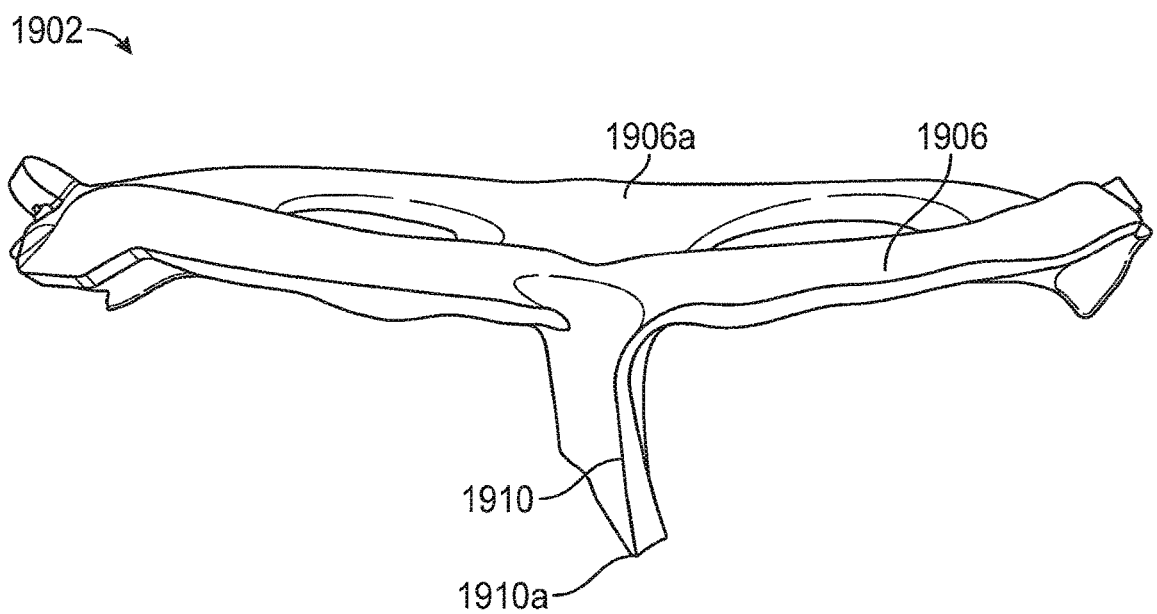
Figure 20E:
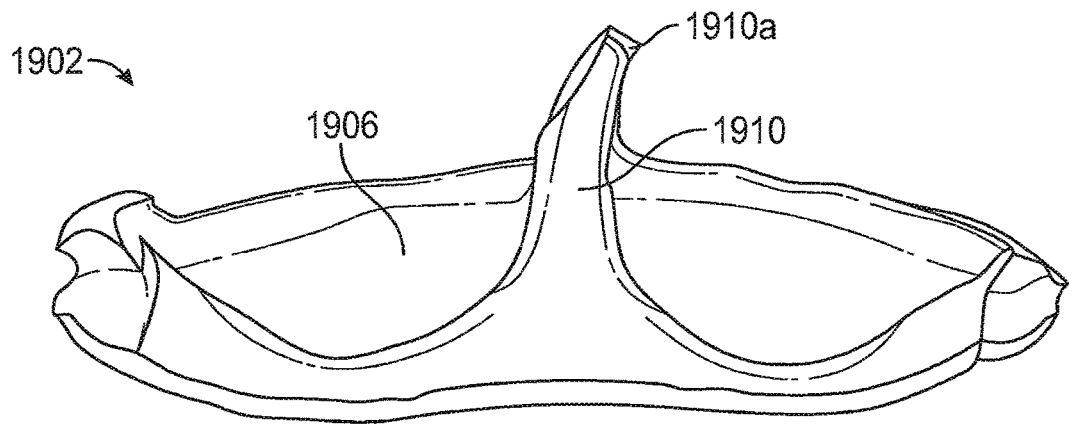

FIGS. 20A-20E illustrate example mold body 1902 that can be used to form a dental structure between adjacent teeth. FIG. 20A illustrates mold body 1902 attached to two or more teeth 1904a, 1904b, 1904c, and/or 1904d (collectively, "teeth 1904"), FIG. 20B illustrates a cross-sectional view of teeth 1904 and mold body 1902 when it is attached to two or more teeth 1904, the cross-section being taken in the x-y plane (orthogonal x-y-z axes are shown in FIG. 20B for ease of description), FIG. 20C illustrates a front view of mold body 1902, FIG. 20D illustrates a top view of mold body 1902, and FIG. 20E illustrates a bottom view of mold body 1902. Mold body 1902 may also be referred to as a wrapping matrix in some examples.

Mold body 1902 may be configured to be attached to two or more teeth 1904, which can be, but do not have to be, adjacent to each other. Mold body 1902 includes a base member 1906 configured to provide a customized fit with the two or more teeth 1904. For example, base member 1906 may be configured to contact a reference geometry, such as, for example, a lingual surface 1908a and 1908b of each of two adjacent teeth 1904a and 1904b, and mate with the reference geometry when mold body 1902 is attached to the two or more teeth 1904. A side of base member 1906 configured to contact the teeth may have a geometry that corresponds to the reference geometry such that the teeth having the reference geometry nest in base member 1906. The reference geometry can be, for example, any suitable surface of a tooth, such as, but not limited to, a lingual surface, a facial surface, an incisal surface, or an occlusal surface of the tooth. Although base member 1906 is shown in FIGS. 20A-20E as being fit over teeth 1904a, 1904b, in other examples, base member 1906 may be configured to provide a customized fit over other teeth. For example, the reference geometry may be tooth 1904c and/or tooth 1904d, where tooth 1904c is nonadjacent to tooth 1904b to be restored.

Mold body 1902 includes an interproximal member 1910 configured to be disposed between two adjacent teeth 1904a and 1904b. Interproximal member 1910 is mechanically connected to base member 1906 and extends from base member 1906. Base member 1906 may be configured to help engage mold body 1902 with teeth 1904, stabilize interproximal member 1910 relative to tooth 1904b to be restored, and properly align interproximal member 1910 relative to teeth 1904.

In the example shown in FIGS. 20A-20E, mold body 1902 is configured to combine with at least two teeth 1904 to define a mold cavity 1912 encompassing at least a first portion of desired tooth structure of tooth 1904*b*. In some examples, the portion of desired tooth structure may define an interproximal surface of tooth 1904*b*. For example, as shown in FIG. 20B, interproximal member 1910 of mold body 1902 may extend between adjacent teeth 1904*a*, 1904*b* and, together with tooth 1904*b*, defines mold cavity 1912. The portion of desired tooth structure may, in some cases, also include an expanded region that may include portions of the facial, lingual, and/or incisal surfaces of tooth 1904*b*. In these examples, interproximal member 1910 or another portion of mold body 1902 may wrap around the other surface or surfaces of tooth 1904*b* to be restored.

Interproximal member 1910 extends from a back portion 1906*a* of base member 1906 towards the facial surface of tooth 1904*b* when mold body 1902 is positioned on the teeth 1904 of the patient. In the example shown in FIGS. 20A-20E, back portion 1906*a* is configured to sit adjacent to a lingual surface of tooth 1904*b* when mold body 1902 is fit over teeth 1904. In some examples, an end 1910*a* of interproximal member 1910 may extend past facial surface of tooth 1904*b* (in a direction away from the lingual surface), although in other examples, end 1910*a* of interproximal member 1910 may remain between adjacent teeth 1904*a*, 1904*b*, in an interproximal region or may be positioned at the facial surface of tooth 1904*b*, when mold body 1902 is properly attached to teeth 1904.

Although FIG. 20A illustrates interproximal member 1910 as being primarily positioned between adjacent teeth 1904*a*, 1904*b*, in some examples, interproximal member 1910 may also cover a portion of tooth 1904*b* to be restored. For example, in addition to extending between adjacent teeth, interproximal member 1910 may cover a portion of the lingual and/or facial surface of tooth 1904*b* to be restored. This may help close mold cavity 1912 and contain restorative material within mold cavity 1912, as well as define portions of the facial, lingual and/or incisal surfaces of tooth 1904*b* to be restored.

In some examples, a practitioner may attach mold body 1902 to teeth 1904, fill mold cavity 1912 with restorative material, and, if necessary, remove some or all excess restorative material to define the desired interproximal surface of tooth 1904*b*. For example, the practitioner may remove any restorative material that remains outside of mold cavity 1912. Thereafter, the practitioner may cure the restorative material and remove mold body 1902 from teeth 1904. In addition to, or instead of, filling mold cavity 1912 with restorative material after attaching mold body 1902 to teeth 1904, the practitioner may apply restorative material directly to mold body 1902, attach mold body 1902 to teeth 1904, cure the restorative material, and remove mold body 1902 from teeth 1904. These steps may provide a portion of desired tooth structure defining an interproximal surface of tooth 1904*b*.

In some examples, after using mold body 1902 to form portion of desired tooth structure defining an interproximal surface of tooth 1904*b*, the practitioner may then use a second mold body, such as one of the mold bodies of the other examples described herein (e.g., mold bodies 102, 106 shown in FIG. 1) or any other suitable mold body, to form other tooth structure. The second mold body may be configured to define tooth structure adjacent to the interproximal surface defined by mold body 1902 and/or tooth structure overlapping with the interproximal surface.

After forming the tooth structure that defines an interproximal surface of tooth 1904*b* using mold body 1902, a practitioner may apply the second mold body to one or more teeth including tooth 1904*b* to define a second mold cavity, fill the second mold cavity with restorative material, cure the restorative material, and remove the mold body from tooth 1904*b*. In some examples, in addition to or instead of filling the second mold cavity after the second mold body is attached to the desired teeth 1904, the practitioner may fill the second mold body with the restorative material prior to attaching the second mold body tooth 1904*b*, and/or the practitioner may apply the restorative material to tooth 1904*b* and then attach the second mold body to tooth 1904*b*. Thus, mold body 1902 may be used to form an interproximal portion of desired tooth structure defining an interproximal surface of tooth 1904*b*, and another mold body may be used to form other portions of desired tooth structure on tooth 1904*b*. In some examples, the use of mold body 1902 without the use of a subsequent mold body may give tooth 1904*b* the desired structure. This technique may be particularly useful in closing diastemas and may be combined with active wedging (such as that described in International Patent Publication No. WO 2016/094272 A1) to create tight, yet flossible contacts between anterior teeth.

In some examples, mold body 1902 may include a coating and/or a release film to facilitate release of the restorative material form the surface of mold cavity 1912. In addition, in some examples, mold body 1902 may include a protrusion or handle or the like to help a practitioner physically grasp mold body 1902 (manually or with the aid of a gripping device).

Figure 21A:
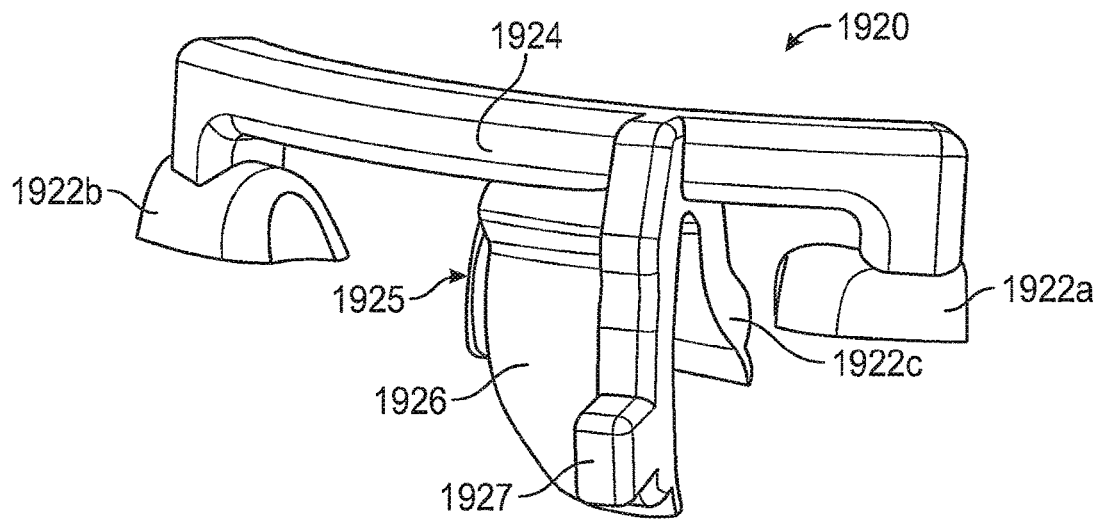
FIGS. 21A and 21B are perspective and front views of another example tool for forming a dental restoration.
Figure 21B:
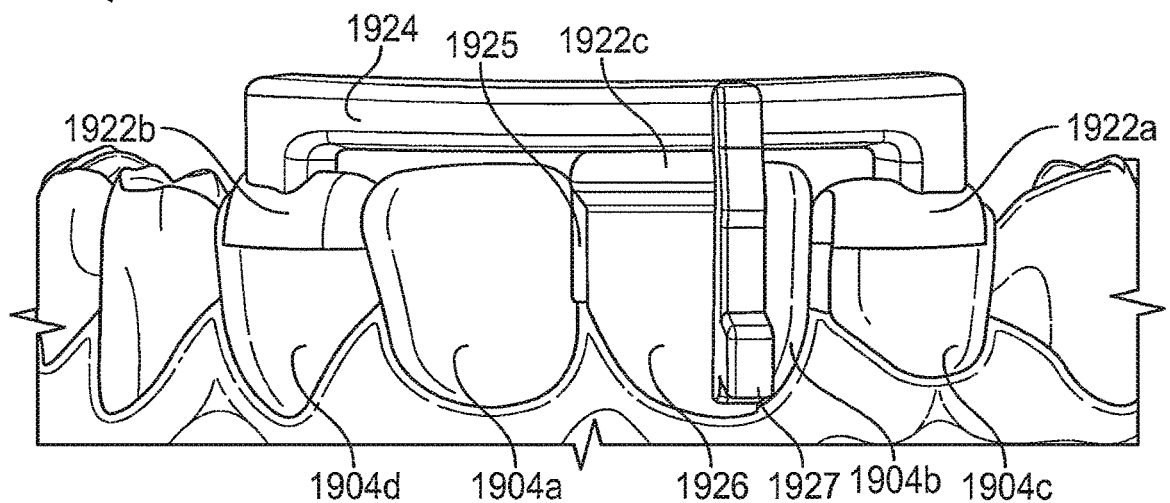

Although mold body 1902 is shown as being attached to adjacent teeth 1904*a*, 1904*b* to define mold cavity 1912 between adjacent teeth 1904*a*, 1904*b*, in some examples, mold body 1902 may be configured to attach to one or more teeth that may not be adjacent to each other, as described with respect to FIGS. 21A and 21B.

FIGS. 21A and 21B are perspective and front views, respectively, of another example tool 1920 for forming a dental restoration in an interproximal region between adjacent teeth. In the example shown in FIGS. 21A and 21B, mold 1920 is configured to form a dental structure that is an interproximal portion of tooth 1904*b*. In some examples, the dental restoration may also include portions of the facial, lingual and/or incisal surfaces of a tooth. Tool 1920 is similar to tool 1902 shown in FIGS. 20A-20E, but includes a plurality of base members 1922*a*, 1922*b*, 1922*c*, as well as interproximal member 1925. Base members 1922*a*, 1922*b*, 1922*c* help engage tool 1920 with teeth 1904, stabilize interproximal member 1925 relative to tooth 1904*b* to be restored, and properly position interproximal member 1925 relative to tooth 1904*b* to be restored. Although three base member 1922*a*, 1922*b*, 1922*c* are shown in FIGS. 21A and 21B, in other examples, mold body 1920 may include any suitable number of base members to provide stability to interproximal member 1925, such as, but not limited to, two, four, five or more. In some examples, tool 1920 does not include interproximal member 1925. For example, tool 1920 may be stabilized and aligned with tooth 1904*b* to be restored using base members 1922*a*, 1922*b*, 1922*c* and without the use of interproximal member 1925.

Base members 1922*a*, 1922*b*, 1922*c* are configured to provide a customized fit with teeth 1904*c*, 1904*d*, 1922*b*, respectively. As shown in FIG. 21B, base member 1922*a* is configured to contact a reference geometry that is tooth 1904*c* adjacent to tooth 1904*b* to be restored, and base member 1922*b* may contact a reference geometry other than a tooth adjacent to tooth 1904*b* to be restored, such as, for example, tooth 1904*d*. In some examples, base member 1922*a* may be configured to contact a reference geometry other than tooth 1904*c*. For example, base member 1922*a* may be configured to contact a tooth that is not adjacent to tooth 1904*b* to be restored. A base member 1922*a*, 1922*b*, 1922*c* may surround or cover a portion of a surface of one or more teeth 1904*c*, 1904*d*, 1904*b*, respectively. For example, base members 1922*a* and/or 1922*b* may surround or cover a portion of the incisal surface of teeth 1904*c* and/or 1904*d*.

As discussed above, in some cases, a mold body, such as tool 1920, may also include a portion that wraps around another surface of a tooth, such as the facial or lingual surface of the tooth. An example of this is shown in FIGS. 21A and 21B with respect to wrapping member 1926, which is configured to extend at least partially over a facial surface of tooth 1904*b* to be restored when mold body 1920 is positioned over teeth 1904 such that interproximal member 1925 is positioned between adjacent teeth 1904*a*, 1904*b*. Wrapping member 1926 is similar to interproximal member 1910 of FIGS. 20A-20E. Wrapping member 1926 may engage the facial surface of tooth 1904*b* to be restored or may be spaced from the facial surface of tooth 1904*b* and form a mold cavity that is positioned between the facial surface of tooth 1904*b* and wrapping member 1926. In some examples, wrapping member 1926 may encompass the portion of tooth 1904*b* to be restored.

In the example shown in FIGS. 21A and 21B, mold body 1920 includes a handle 1924, which is a structure with which mold body 1920 may be grasped. Handle 1924 may allow for a practitioner to place mold body 1920 in the mouth of a patient with greater ease, e.g., in comparison to some mold bodies without handle 1924.

In some examples, mold body 1920 may include one or more other features to increase the ease of use of mold body 1920, as described herein. For example, mold body 1920 may include a protrusion 1927, which is a structure that aids the use of mold body 1920. For example, protrusion 1927 may be configured to provide a handle or a gripping mechanism for a practitioner, e.g., the hand of the practitioner or a tool manipulated by the practitioner, and/or ease the mating of mold body 1920 with one or more teeth 1904. In this way, mating mold body 1920 with one or more teeth 1904 may be facilitated by gripping protrusion 1927. Protrusion 1927 may ease the handling of mold body 1920 by the practitioner, e.g., may prevent the hand of the practitioner or a tool manipulated by the practitioner from slipping from mold body 1920. In some examples, protrusion 1927 may prevent the practitioner from having to handle mold body 1920 using interproximal member 1910 or another portion of mold body 1920, which may be cumbersome and/or awkward to hold or use to place mold body 1920 in contact with teeth 1904. Protrusion 1927 may also be used to pry tool 1902, interproximal member 1925, and/or wrapping member 1926 from tooth 1904*b* after forming the dental restoration.

In some examples, mold body 1920 may include one or more of a pry, a lever, or indicia features. In some examples, mold body 1920 may include a coating and/or a release film to facilitate release of the restorative material form the surface of mold body 1920 defining a mold cavity.

Figure 22:
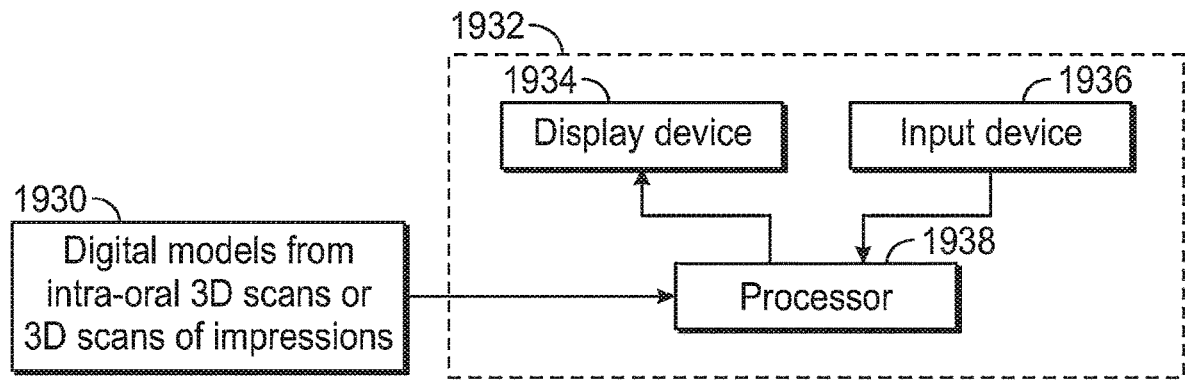
FIG. 22 is a diagram of an example system that may be used to design any of the tools of FIGS. 1-21B.

FIG. 22 is a diagram of an example system 1932 that can be used to design any of the tools described herein. System 1932 includes display device 1934, user input device 1936, and processor 1938. Processor 1938 may include, for example, one or more processors, such as one or more microprocessors, digital signal processors (DSPs), general purpose microprocessors, application specific integrated circuits (ASICs), field-programmable gate arrays (FPGAs), programmable logic circuitry, equivalent discrete or integrated logic circuitry, or the like as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements. In general, system 1932 may comprise any suitable arrangement of hardware (e.g., circuitry), alone or in combination with software and/or firmware, to perform the various techniques described herein. Processor 1938 may be housed in a variety of devices including, for example, one or more supercomputers, servers, personal computers, tablets, mobile phones, and/or other mobile devices.

Display device 1934 is configured to present information to a user, e.g., under the control of processor 1938. Input device 1936 may include a button or keypad, a speaker for voice commands, a mouse or touchpad for moving a cursor or providing input, and the like. In some examples display device 1934 may be a touch screen, and may also act as an input device 1936.

Although not shown in FIG. 22, system 1932 may also include a memory configured to store instructions required to perform tasks attributed to system 1932. The memory may comprise any suitable memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to system 1932 herein.

A practitioner may use system 1932 to select and define one or more tools (e.g., mold bodies 102, 106 of FIG. 1, door body 200 of FIGS. 2A and 2B, as well as the other mold bodies and door bodies described herein) using a digital 3D model based upon intra-oral 3D scans or 3D scans of impressions or models of teeth. Processor 1938 may be configured to receive digital 3D models of teeth (1930) from intra-oral scans or scans of impressions of teeth. Example systems that can be used to generate digital 3D images or models based upon image sets from multiple views are described in U.S. Pat. Nos. 7,956,862 and 7,605,817. These systems can use an intra-oral scanner to obtain digital images from multiple views of teeth or other intra-oral structures, and those digital images are processed to generate a digital 3D model representing the scanned teeth.

Figure 23:
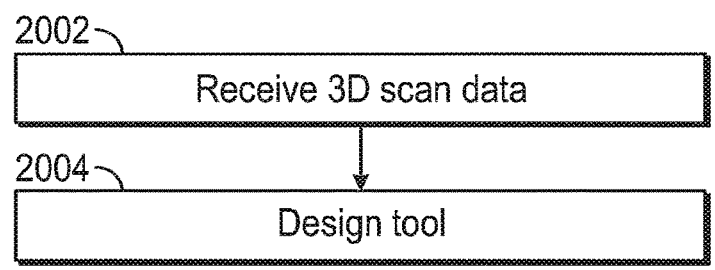
FIG. 23 is a flow diagram illustrating an example method of designing any of the tools of FIGS. 1-21B.

FIG. 23 is a flow diagram illustrating an example method of designing any of the tools of FIGS. 1-21B. Although FIG. 23 is described with respect to system 1932 shown in FIG. 22, the method may be performed by another system, along or in combination with system 1932, in other examples. The method may include receiving, by processor 1938, a 3D scan data of a tooth structure of a patient (2002). The method may further include designing, by processor 1932, a tool for forming the dental restoration of the tooth based on the D3 scan data of the mouth of the patient (2004). The tool may be any of the example tools described herein. Designing the tool may include incorporating any the features described herein that are not based solely on the scan data of the tooth structure of the patient such as, for example, apertures, protrusions, door body configurations, or other features that may improve the functionality of the tool.

In some examples, the method may further include controlling, by processor 1938, a 3D printer to define the tool. For example, the tool may be printed from Accura® 60 resin (a clear plastic) on the 3D Systems Viper™ printer, available from 3D Systems of Rock Hill, South Carolina. In some examples, the method may further include manufacturing the tool by a CAD/CAM milling processes.

In some examples, tool design may be facilitated by creation of a target restoration design. Commercial design software, such as that available from Exocad™ of Darmstadt, Germany, may be used to create a target restoration, optionally review the proposed design with the practitioner, and then use a combination of CAD design, part libraries and/or Boolean operation to create the design of the custom tool.

In some examples, the method may further include controlling, by processor 1938, a device to process at least a portion of a surface of the tool to facilitate removal of the tool from a dental restoration after curing of the dental restoration and/or a smooth finish of at least one surface of the dental restoration. For example, controlling the device to process the portion of the surface of the tool may include controlling the device to polish the portion of the surface to result in the portion of the surface being smoother than before polishing. As another example, controlling the device to process the portion of the surface of the tool comprises controlling the device to coat the portion of the surface with a material, such as methacrylate resin, and curing the portion of the surface to result in the portion of the surface being smoother than before coating. As another example, controlling the device to process the portion of the surface of the tool may include controlling the device to coat the portion of the surface with a material (e.g., Rubber Sep® Release Agent from Taub Products of Jersey City, New Jersey) to result in the portion of the surface having less adhesion force with restorative material than before coating.

When leveraging additive manufacturing technologies to fabricate the tools described herein, layer lines may be visible on the surface of the appliance and thus transferred to the restoration created with the appliance. These layer lines may require the practitioner to spend additional time smoothing the final restoration to achieve an acceptable surface finish. Thus, by polishing and/or coating the surface of the appliance, the layer lines can be removed and leave a smoother surface finish to the restoration.

Additionally, polishing and/or coating the surface of the tool may increase the visibility through the tool due to the reduced scattering of light from the rough surfaces. Visual feedback and light transmission for curing are increased when the light scattering is reduced. Reducing the surface roughness of the mold cavity also reduces the mechanical interlocking of the restorative to the mold face. This allows for lower release forces to remove the mold, improving reliability of the process.

Figure 24:
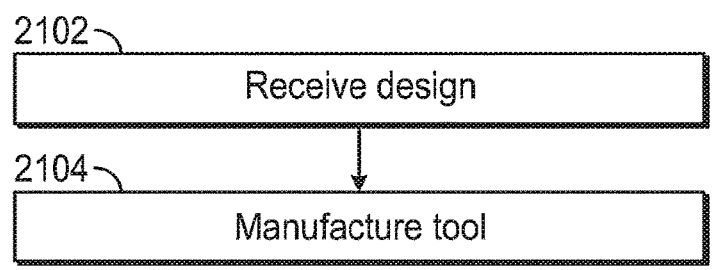
FIG. 24 is a flow diagram illustrating an example method for forming any of the tools of FIGS. 1-21B.

FIG. 24 is a flow diagram illustrating an example method for forming any of the tools of FIGS. 1-21B. The method may include receiving, from a remote manufacturing facility, a design for a custom tool for forming the dental restoration of the tooth (2102). The method may further include manufacturing the tool based on the received design (2104). In some examples, manufacturing the tool comprises manufacturing the tool by a CAD/CAM milling processes. In some examples, manufacturing the tool comprises 3D printing the tool. In some examples, the method may further include processing one or more portions of one or more surfaces of the tool as described with reference to FIG. 23.

Various examples have been described. Modifications to the described examples may be made within the spirit of this disclosure. For example, custom tools can be fabricated off of initial tooth geometry or digitally optimized tooth geometry (e.g. hole-filling to close gaps in the data, pulling and scaling data from tooth libraries, testing in a virtual articulator). Tools can fit precisely to the existing structure or can be optimized to selectively move or position tissue. Custom tools may be formed to generate a digitally optimized tooth structure that will require the practitioner to remove tooth structure prior to application of the tool. Such plans can be communicated to the practitioner via images, digital models, and/or reduction copings. Tools can be printed or milled. Tools can be made from the full range of 3D printed materials (strength, flexibility, translucency, color). Tools can be coated with a range of agents to enhance sealing, optimize release, surface finish and optical transparency. Tools can contain features to indicate or define fill level of different restorative materials (shade, fill level, physical properties).

Physical characteristics (elasticity, roughness, transparency, etc.) of tools can vary across the tool to improve sealing capability, dimensional fidelity, texture imparted to restorative material, degree of cure of material, etc.). Tools and/or mold or door bodies can interlock with each other or with standard components (e.g., matrix bands). Tools can be used inside or outside of the mouth of a patient. Restorative material may be placed or injected through apertures in tools, applied to tooth structure and/or the tool prior to the application of the tool, such that application shapes the material. Tools can be degradable (e.g. by solvent/heat) to release from the restorative material or enable undercut geometries and/or reduce parting lines. Tools could be collapsible (deflated, frangible, etc.). Kits can be created of the patient specific tools and associated products and quantities, (e.g. adhesives, filling, and polishing materials selected for the patient needs and/or doctor preferences). Series of tools may be used sequentially in the direct filling process in order to control the geometries of multiple layers of a dental restoration on a tooth.

Dental scans may be taken at any suitable time, such as at diagnostic appointment to facilitate custom tools fabrication prior to a dental restoration appointment. Tools may be manufactured locally or digital scan data may be sent to a remote location for production. Acquisition of patient 3D data, creation of a treatment plan, creation of a tool design, and fabrication of the tool may be completed in any combination of geographic locations including, for example, a dental office, a dental laboratory, and/or an industrial facility.

The following examples are within the scope of the disclosure:

Clause 1: A tool for forming a dental restoration, the tool comprising a mold body configured to provide a customized fit with at least one tooth of a patient, a single piece of the mold body defining an aperture configured to align with a portion of a surface of a tooth to be restored of the at least one tooth, the mold body being configured to combine with the at least one tooth to define a mold cavity encompassing at least a portion of desired tooth structure of the tooth to be restored, wherein the aperture is larger than a tip of a restorative dental material introduction device and configured to allow placement and flow of a restorative material into the mold cavity to cover the portion of the surface of the tooth to be restored.

Clause 2: The tool of clause 1, wherein the dental restoration comprises a layer formed over the surface of a portion of the tooth to be restored.

Clause 3: The tool of clause 1 or 2, wherein the mold body comprises a first mold body, the tool further comprising a second mold body configured to provide a customized fit with the at least one tooth of the patient, wherein the first and second mold bodies are configured to combine with the at least one tooth of the patient to form the mold cavity encompassing the at least the portion of desired tooth structure of the tooth to be restored.

Clause 4: The tool of clause 3, wherein the second mold body is separable from and engageable with the first mold body.

Clause 5: The tool of clause 3 or 4, wherein, when the first and second mold bodies combine with the at least one tooth of the patient to form the mold cavity, at least a portion of the first mold body is configured to abut a portion of the second mold body, wherein at least one of the portion of the first mold body or the portion of the second mold body comprises an overbuilt portion such that, when the portion of the first mold body abuts the portion of the second mold body, the overbuilt portion is configured to provide intimate contact between the portion of the first mold body and the portion of the second mold body.

Clause 6: The tool of any of clauses 3-5, wherein the first and second mold bodies are configured to form a clamp when the second mold body is engaged with the first mold body, and wherein, when the first and second mold bodies combine with the at least one tooth of the patient to form the mold cavity, the clamp is configured to be at least proximate an incisal edge of the tooth to be restored.

Clause 7: The tool of any of clauses 3-6, wherein the first mold body defines a first structure configured to mate with at least a first portion of a clamp and the second mold body defines a second structure configured to mate with at least a second portion of the clamp, the clamp being configured to secure the first and second mold bodies to one another when the first portion of the clamp mates with the first structure and the second portion of the clamp mates with the second structure.

Clause 8: The tool of any of clauses 1-7, wherein the mold body defines a vent configured to at least one of allow excess restorative material to flow out of the mold cavity or allow air to flow out of the mold cavity.

Clause 9: The tool of any of clauses 1-8, further comprising a door body corresponding to the portion of the surface of the tooth to be restored, at least a portion of the door body being configured to mate with the aperture, wherein the mold body and the door body are configured to combine with the at least one tooth of the patient to form the mold cavity encompassing the at least the portion of desired tooth structure of the tooth to be restored.

Clause 10: The tool of clause 9, wherein the door body is separable from and engageable with the mold body.

Clause 11: The tool of clause 9, wherein the door body is attached to the mold body via a hinge.

Clause 12: The tool of any of clauses 9-11, wherein a side of the door body configured to mate with the mold body defines a chamfered edge Clause 13: The tool of any of clauses 9-12, wherein at least one of the mold body or the door body defines a vent configured to at least one of allow excess restorative material to flow out of the mold cavity or allow air to flow out of the mold cavity.

Clause 14: The tool of any of clauses 9-13, further comprising a release film configured for placement on a surface of the door body to facilitate release of restorative material from the surface of the door body.

Clause 15: The tool of any of clauses 9-14, further comprising a coating configured for placement on a surface of the door body to facilitate release of restorative material from the surface of the door body.

Clause 16: The tool of any of clauses 9-15, wherein the door body comprises a first door body, the aperture comprises a first aperture, the portion of the lingual or facial surface of the one tooth to be restored of the at least one tooth comprises a first portion of a first lingual or facial surface of a first tooth to be restored of the at least one tooth, the mold body defines a second aperture configured to align with a second portion of a second lingual or facial surface of a second tooth to be restored of the at least one tooth, and the second portion comprises a majority of the second lingual or facial surface of the second tooth to be restored, the tool further comprising a second door body corresponding to the second portion of the second lingual or facial surface of the second tooth to be restored, at least a portion of the second door body being configured to mate with the second aperture, wherein the mold body, the first door body, and the second door body are configured to combine with the at least one tooth of the patient to form the mold cavity encompassing at least the portion of desired tooth structure of the at least one tooth.

Clause 17: The tool of clause 16, wherein the first aperture and the second aperture are different shapes and the first and second door bodies are different shapes, the shape of the first door body corresponding to the shape of the first aperture and the shape of the second door body corresponding to the shape of the second aperture.

Clause 18: The tool of clause 16, wherein the first aperture and the second aperture are the same shape and the first and second door bodies are the same shape.

Clause 19: The tool of any of clauses 16-18, wherein one or more of the mold body, the first door body, or the second door body comprise one or more indicia for facilitating one or more of mating the first door body with the first aperture or mating the second door body with the second aperture.

Clause 20: The tool of clause 19, wherein the one or more indicia comprise one or more of: a key structure and a corresponding keyhole; color coding; one or more symbols; or one or more other integrated or applied markings.

Clause 21: The tool of any of clauses 9-20, wherein the door body comprises a first door body configured for one or more of final shaping or final layering of at least a portion of the dental restoration, the tool further comprising one or more of: a second door body, at least a portion of the second door body being configured to mate with the aperture, the second door body being configured for shaping an underlying shade layer of at least the portion of the dental restoration; a third door body, at least a portion of the third door body being configured to mate with the aperture, the third door body being configured to form one or more of one or more mamelons, one or more grooves, or one or more pits; a fourth door body, at least a portion of the fourth door body being configured to mate with the aperture, the fourth door body being configured for near net shaping of at least the portion of the dental restoration; or a fifth door body, at least a portion of the fifth door body being configured to mate with the aperture, the fifth door body being configured for applying an intermediate layer of restorative material, the intermediate layer of restorative material comprising a first restorative material that is different than a material applied during final layering by the first door body.

Clause 22: The tool of clauses 9-21, wherein at least one of the mold body or the door body defines at least one protrusion configured to provide a gripping mechanism for a practitioner.

Clause 23: The tool of clause 22, wherein the at least one protrusion defines one or more ribs.

Clause 24: The tool of clauses 22 or 23, wherein the at least one protrusion defines a structure configured to mate with at least a portion of a clamp.

Clause 25: The tool of any of clauses 22-24, wherein the at least one protrusion defines at least one lever configured to provide a mechanism for use in prying the mold body away from the tooth to be restored.

Clause 26: The tool of any of clauses 1-25, further comprising a coating configured for placement on a surface of the mold body to facilitate release of restorative material from the surface of the mold body.

Clause 27: The tool of any of clauses 1-26, wherein the mold body comprises a ridge configured to contact at least a portion of the tooth to be restored of the at least one tooth to concentrate sealing pressure at at least a portion of a perimeter of the mold cavity.

Clause 28: The tool of clause 27, wherein the at least the portion of the perimeter of the mold cavity is configured to be located proximate to a gingival contour of the tooth to be restored when the mold body combines with at least the at least one tooth of the patient to form the mold cavity.

Clause 29: The tool of any of clauses 1-28, wherein the first mold body defines an edge defining a contour configured to substantially match at least a portion of a gingival contour of the tooth to be restored.

Clause 30: The tool of any of clauses 1-29, wherein a ratio of an area of the aperture to a cross-sectional area of the tip is greater than or equal to about 2:1.

Clause 31: The tool of any of clauses 1-30, wherein the aperture is configured to align with a majority of the portion of the surface of the tooth to be restored.

Clause 32: The tool of any of clauses 1-31, further comprising the restorative dental material introduction device.

Clause 33: A tool for forming a dental restoration, the tool comprising a mold body configured to provide a customized fit with at least one tooth of a patient, the mold body defining an aperture configured to align with a portion of a surface of one tooth to be restored of the at least one tooth; and a door body corresponding to the portion of the surface of the tooth to be restored, at least a portion of the door body being configured to mate with the aperture, wherein the mold body and the door body are configured to combine with the at least one tooth of the patient to form the mold cavity encompassing the at least the portion of desired tooth structure of the tooth to be restored.

Clause 34: The tool of clause 33, wherein the surface of the tooth to be restored is a lingual surface, a facial surface, an incisal surface, or an interproximal surface.

Clause 35: The tool of clause 33 or 34, wherein the dental restoration comprises a layer formed over the surface of a portion of the tooth to be restored.

Clause 36: The tool of any of clauses 33-35, wherein the mold body comprises a first mold body, the tool further comprising a second mold body configured to provide a customized fit with the at least one tooth of the patient, wherein the first and second mold bodies are the door body are configured to combine with the at least one tooth of the patient to form the mold cavity encompassing the at least the portion of desired tooth structure of the tooth to be restored.

Clause 37: The tool of clause 36, wherein the second mold body is separable from and engageable with the first mold body.

Clause 38: The tool of clause 36 or 37, wherein, when the first and second mold bodies combine with the at least one tooth of the patient to form the mold cavity, at least a portion of the first mold body is configured to abut a portion of the second mold body, wherein at least one of the portion of the first mold body or the portion of the second mold body comprises an overbuilt portion such that, when the portion of the first mold body abuts the portion of the second mold body, the overbuilt portion is configured to provide intimate contact between the portion of the first mold body and the portion of the second mold body.

Clause 39: The tool of any of clause 36-38, wherein the first and second mold bodies are configured to form a clamp when the second mold body is engaged with the first mold body, and wherein, when the first and second mold bodies combine with the at least one tooth of the patient to form the mold cavity, the clamp is configured to be at least proximate an incisal edge of the tooth to be restored.

Clause 40: The tool of any of clauses 36-39, wherein the first mold body defines a first structure configured to mate with at least a first portion of a clamp, and the second mold body defines a second structure configured to mate with at least a second portion of the clamp, the clamp being configured to secure the first and second mold bodies to one another when the first portion of the clamp mates with the first structure and the second portion of the clamp mates with the second structure.

Clause 41: The tool of any of clauses 33-40, wherein the door body is separable from and engageable with the mold body.

Clause 42: The tool of any of clauses 33-41, wherein at least one of the door body or the mold body defines a vent configured to at least one of allow excess restorative material to flow out of the mold cavity or allow air to flow out of the mold cavity.

Clause 43: The tool of any of clauses 33-42, further comprising a release film configured for placement on a surface of the door body to facilitate release of restorative material from the surface of the door body.

Clause 44: The tool of any of clauses 33-43, further comprising one or more of a coating configured for placement on a surface of the door body to facilitate release of restorative material from the surface of the door body or a coating configured for placement on a surface of the mold body to facilitate release of restorative material from the surface of the mold body.

Clause 45: The tool of any of clauses 33-44, wherein the door body comprises a first door body, the aperture comprises a first aperture, the portion of the surface of the one tooth to be restored of the at least one tooth comprises a first portion of a first surface of a first tooth to be restored of the at least one tooth, and the mold body defines a second aperture configured to align with a second portion of a surface of a second tooth to be restored of the at least one tooth, the tool further comprising a second door body corresponding to the second portion of the second surface of the second tooth to be restored, at least a portion of the second door body being configured to mate with the second aperture; the mold body, the first door body, and the second door body being configured to combine with the at least one tooth of the patient to form the mold cavity encompassing at least the portion of desired tooth structure of the at least one tooth.

Clause 46: The tool of clause 45, wherein the first aperture and the second aperture are different shapes and the first and second door bodies are different shapes, the shape of the first door body corresponding to the shape of the first aperture and the shape of the second door body corresponding to the shape of the second aperture.

Clause 47: The tool of clause 45, wherein the first aperture and the second aperture are the same shape.

Clause 48: The tool of any of clauses 45-47, wherein one or more of the mold body, the first door body, or the second door body comprise one or more indicia for facilitating one or more of mating the first door body with the first aperture or mating the second door body with the second aperture.

Clause 49: The tool of clause 48, wherein the one or more indicia comprise one or more of: a key structure and a corresponding keyhole; color coding; one or more symbols; or one or more other integrated or applied markings.

Clause 50: The tool of any of clauses 33-49, wherein the door body comprises a first door body configured for one or more of final shaping or final layering of at least a portion of the dental restoration, the tool further comprising one or more of: a second door body, at least a portion of the second door body being configured to mate with the aperture; the second door body being configured for shaping an underlying shade layer of at least the portion of the dental restoration; a third door body, at least a portion of the third door body being configured to mate with the aperture; the third door body being configured to form one or more of one or more mamelons, one or more grooves, or one or more pits; a fourth door body, at least a portion of the fourth door body being configured to mate with the aperture; the fourth door body being configured for near net shaping of at least the portion of the dental restoration; or a fifth door body, at least a portion of the fifth door body being configured to mate with the aperture, the fifth door body being configured for applying an intermediate layer of restorative material, the intermediate layer of restorative material comprising a first restorative material that is different than a material applied during final layering by the first door body.

Clause 51: The tool of any of clauses 33-50, wherein the mold body comprises a ridge configured to contact at least a portion of the tooth to be restored of the at least one tooth to concentrate sealing pressure at at least a portion of a perimeter of the mold cavity.

Clause 52: The tool of clause 51, wherein the at least the portion of the perimeter of the mold cavity is configured to be located proximate to a gingival contour of the tooth to be restored when the mold body combines with at least the at least one tooth of the patient to form the mold cavity.

Clause 53: The tool of any of clauses 33-52, wherein the mold body defines an edge configured to substantially overlay at least a portion of a gingival contour of the tooth to be restored.

Clause 54: The tool of any of clauses 33-53, wherein at least one of the mold body or the door body defines at least one protrusion configured to provide a gripping mechanism for a practitioner.

Clause 55: The tool of clause 54, wherein the at least one protrusion defines one or more ribs.

Clause 56: The tool of clause 54 or 55, wherein the at least one protrusion defines a structure configured to mate with at least a portion of a clamp.

Clause 57: The tool of any of clauses 54-56, wherein the at least one protrusion defines at least one lever configured to provide a mechanism for use in prying the mold body away from the tooth to be restored.

Clause 58: A tool for forming a dental restoration, the tool comprising a mold body configured to provide a customized fit with at least one tooth of a patient, the mold body being configured to combine with at least the at least one tooth of the patient to define a mold cavity encompassing at least a portion of desired tooth structure of the at least one tooth of the patient, the mold body comprising a ridge configured to contact at least a portion of a tooth to be restored of the at least one tooth to concentrate sealing pressure at at least a portion of a perimeter of the mold cavity.

Clause 59: The tool of clause 58, wherein the at least the portion of the perimeter of the mold cavity is configured to be located proximate to a gingival contour of the tooth to be restored when the mold body combines with at least the at least one tooth of the patient to form the mold cavity.

Clause 60: The tool of clause 58 or 59, wherein the dental restoration is a layer formed over the surface of a portion of the tooth to be restored.

Clause 61: A tool for forming a dental restoration, the tool comprising a first mold body configured to provide a customized fit with at least one tooth of a patient; and a second mold body configured to provide a customized fit with the at least one tooth of the patient, wherein the first and second mold bodies are configured to combine with the at least one tooth of the patient to define a mold cavity encompassing at least a portion of desired tooth structure of the at least one tooth wherein, when the first and second mold bodies combine with the at least one tooth of the patient to form the mold cavity, at least a portion of the first mold body is configured to abut a portion of the second mold body, wherein the portion of the first mold body comprises an overbuilt portion such that, when the portion of the first mold body abuts the portion of the second mold body, the overbuilt portion is configured to provide intimate contact between the portion of the first mold body and the portion of the second mold body.

Clause 62: The tool of clause 61, wherein the dental restoration is layer formed over the surface of a portion of the tooth.

Clause 63: The tool of clause 61 or 62, wherein the overbuilt portion of the first mold body is formed from a compressible material, the overbuilt portion being configured to be compressed against the portion of the second mold body when the first and second mold bodies combine with the at least one tooth of the patient to form the mold cavity.

Clause 64: A tool for forming a dental restoration, the tool comprising a first mold body configured to provide a customized fit with at least one tooth of a patient and a second mold body configured to provide a customized fit with the at least one tooth of the patient, wherein the first and second mold bodies are configured to combine with the at least one tooth of the patient to define a mold cavity encompassing at least a portion of desired tooth structure of the at least one tooth, and wherein the first and second mold bodies are configured to form a clamp when the second mold body is engaged with the first mold body, wherein, when the first and second mold bodies combine with the at least one tooth of the patient to form the mold cavity, the clamp is configured to be at least proximate an incisal edge of at least one tooth to be restored of the at least one tooth.

Clause 65: The tool of clause 64 wherein the dental restoration is a layer formed over the surface of a portion of the tooth to be restored.

Clause 66: A tool for forming a dental restoration, the tool comprising a first mold body configured to provide a customized fit with at least one tooth of a patient, the first mold body defining a first structure configured to mate with at least a first portion of a clamp; and a second mold body configured to provide a customized fit with the at least one tooth of the patient, the second mold body defining a second structure configured to mate with at least a second portion of the clamp, the clamp being configured to secure the first and second mold bodies to one another when the first portion of the clamp mates with the first structure and the second portion of the clamp mates with the second structure, wherein the first and second mold bodies are configured to combine with the at least one tooth of the patient to define a mold cavity encompassing at least a portion of desired tooth structure of the at least one tooth.

Clause 67: The tool of clause 66, wherein the dental restoration is a layer formed over the surface of a portion of the at least one tooth.

Claim 68: The tool of clause 66 or 67, wherein at least one of the first structure or the second structure extends away from the first mold body or the second mold body, respectively.

Claim 69: The tool of clause 66 or 67, wherein at least one of the first structure or the second structure is recessed in the first mold body or the second mold body, respectively.

Clause 70: A tool for forming a dental restoration, the tool comprising a mold body configured to provide a customized fit with at least one tooth of a patient, the mold body defining an edge defining a contour configured to match at least a portion of a gingival contour of a tooth to be restored of the at least one tooth; wherein the mold body is configured to combine with the at least one tooth of the patient to define a mold cavity encompassing at least a portion of desired tooth structure of the tooth to be restored.

Clause 71: The tool of clause 70, wherein the dental restoration is a layer formed over the surface of a portion of the tooth to be restored.

Clause 72: A tool for forming a dental restoration, the tool comprising: a first mold body configured to provide a customized fit with at least one tooth of a patient, the first mold body having a first stiffness, at least a first portion of the first mold body being configured to surround at least a portion of the at least one tooth, the first mold body being configured to combine with the at least one tooth to define a mold cavity encompassing at least a portion of desired tooth structure of the at least one tooth; and a second mold body having a second stiffness that is greater than the first stiffness, at least a portion of the second mold body being configured to surround at least a second portion of the first mold body.

Clause 73: The tool of clause 72, wherein the first mold body comprises a first material and the second mold body comprises a second material that is more rigid that the first material.

Clause 74: The tool of clause 72, wherein the first and second mold bodies are formed from the same material.

Clause 75: The tool of any of clauses 72-74, wherein the second stiffness is greater than the first stiffness due to the structures of the second and first mold bodies, respectively.

Clause 76: The tool of clause 75, wherein the second mold body defines one or more of at least one dimension with a greater thickness that a corresponding dimension of the first mold body or one or more support ribs.

Clause 77: The tool of clause any of clauses 72-76, wherein the first mold body defines a first aperture configured to allow placement of restorative material into the mold cavity, the second mold body defines a second aperture, and the second aperture is larger than the first aperture and is configured to allow access to the first aperture when the at least the portion of the second mold body is surrounding the at least the second portion of the first mold body.

Clause 78: The tool of clause 77, wherein the second mold body comprises a reinforcement structure proximate the second aperture and configured to provide reinforcement to the second mold body.

Clause 79: The tool of any of clauses 72-79, wherein the dental restoration is a layer formed over the surface of a portion of the at least one tooth.

Clause 80: The tool of any of clauses 72-80, wherein the first mold body is compressible.

Clause 81: A tool for forming a dental restoration, the tool comprising a mold body configured to provide a customized fit with at least one tooth of a patient, the mold body being configured to combine with the at least one tooth of the patient to define a mold cavity encompassing at least a portion of desired tooth structure of a tooth of the at least one tooth, the mold body defining at least one protrusion configured to provide a gripping mechanism for a practitioner, the protrusion defining a structure configured to mate with at least a portion of a clamp.

Clause 82: The tool of clause 81, wherein the protrusion defines one or more ribs.

Clause 83: The tool of clause 81 or 82, wherein the at least one protrusion defines at least one lever configured to provide a mechanism for use in prying the mold body away from the dental restoration after curing of the dental restoration.

Clause 84: The tool of any of clauses 81-83, wherein the dental restoration is a layer formed over the surface of a portion of the at least one tooth.

Clause 85: A method of designing a tool for forming a dental restoration of a tooth, the method comprising receiving, by one or more processors, a three-dimensional scan data of a tooth structure of a patient; and designing, by the one or more processors, a tool for forming the dental restoration of the tooth based on the three-dimensional scan data of the mouth of the patient; wherein the tool is the tool of any of clauses 1-84.

Clause 86: The method of clause 85, further comprising controlling, by the one or more processors, a three-dimensional printer to define the tool.

Clause 87: The method of clause 85, further comprising manufacturing the tool by a CAD/CAM milling processes.

Clause 88: The method of any of clauses 85-87, further comprising controlling, by the one or more processors, a device to process at least a portion of a surface of the tool to facilitate at least one of: removal of the tool from a dental restoration prior to curing of the dental restoration; removal of the tool from a dental restoration after curing of the dental restoration; or a smooth finish of at least one surface of the dental restoration.

Clause 89: The method of clause 88, wherein controlling the device to process the at least the portion of the surface of the tool comprises controlling the device to polish the at least the portion of the surface to result in the at least the portion of the surface being smoother than before polishing.

Clause 90: The method of clause 88 or 89, wherein controlling the device to process the at least the portion of the surface of the tool comprises controlling the device to coat the at least the portion of the surface with a material to result in the at least the portion of the surface being smoother than before coating.

Clause 91: The method of any of clauses 88-90, wherein controlling the device to process the at least the portion of the surface of the tool comprises controlling the device to coat the at least the portion of the surface with a material to result in the at least the portion of the surface having less adhesion force with restorative material than before coating.

Clause 92: A method for forming a tool for forming a dental restoration of a tooth, the method comprising receiving, from a remote manufacturing facility, a design for a custom tool for forming the dental restoration of the tooth; and manufacturing the tool for forming the dental restoration of the tooth based on the received design, wherein the tool is the tool of any of clauses 1-81.

Clause 93: The method of clause 92, wherein manufacturing the tool comprises manufacturing the tool by a CAD/CAM milling processes.

Clause 94: The method of clause 92, wherein manufacturing the tool comprises 3D printing the tool.

Clause 95: The method of any of clauses 92-94, wherein manufacturing the tool comprises processing at least a portion of a surface of the tool to facilitate at least one of removal of the tool from a dental restoration prior to curing of the dental restoration; removal of the tool from a dental restoration after curing of the dental restoration; or a smooth finish of at least one surface of the dental restoration.

Clause 96: The method of clause 95, wherein processing the at least the portion of the surface of the tool comprises polishing the at least the portion of the surface to result in the at least the portion of the surface being smoother than before polishing.

Clause 97: The method of clause 95 or 96, wherein processing the at least the portion of the surface of the tool comprises coating the at least the portion of the surface with a material to result in the at least the portion of the surface being smoother than before coating.

Clause 98: The method of any of clauses 95-97, wherein processing the at least the portion of the surface of the tool comprises coating the at least the portion of the surface with a material to result in the at least the portion of the surface having less adhesion force with restorative material than before coating.

Clause 99: A method of forming a dental restoration, the method comprising: attaching a mold body to at least one tooth of a patient, the mold body configured to provide a customized fit with at least one tooth of a patient, a single piece of the mold body defining an aperture configured to align with a portion of a surface of a tooth to be restored of the at least one tooth, the mold body being configured to combine with the at least one tooth to define a mold cavity encompassing at least a portion of desired tooth structure of the tooth to be restored, wherein the aperture is larger than a tip of a restorative dental material introduction device and configured to allow placement and flow of a restorative material into the mold cavity to cover the portion of the surface of the tooth to be restored; filling the mold cavity with restorative material; curing the restorative material; and removing the mold body from the at least one tooth.

Clause 100: The method of clause 99, further comprising, after filling the mold cavity with restorative material, placing at least a portion of a door body within the aperture, the door body corresponding to the portion of the surface of the at least one tooth to be restored, at least the portion of the door body being configured to mate with the aperture.

Clause 101: The method of clause 99 or 100, wherein filling the mold cavity with restorative material comprises aligning a tip of a restorative dental material introduction device with the aperture and introducing the restorative material into the mold cavity via the restorative dental material introduction device, wherein a ratio of an area of the aperture to a cross-sectional area of the tip is greater than or equal to about 2:1.

Clause 102: The method of any of clauses 99-101, wherein the mold body comprises a first mold body, the method further comprising attaching a second mold body to the at least one tooth, the second mold body being configured to provide a customized fit with the at least one tooth, the first and second mold bodies being configured to combine with the at least one tooth of the patient to form the mold cavity encompassing at least the portion of desired dental structure of the tooth to be restored.

Clause 103: The method of any of clauses 102, further comprising engaging the second mold body with the first mold body; and separating the second mold body from the first mold body.

Clause 104: The method of clause 102 or 103, wherein when the first and second mold bodies combine with the at least one tooth of the patient to form the mold cavity, at least a portion of the first mold body abuts a portion of the second mold body, wherein at least one of the portion of the first mold body or the portion of the second mold body comprises an overbuilt portion such that, when the portion of the first mold body abuts the portion of the second mold body, the overbuilt portion provides intimate contact between the portion of the first mold body and the portion of the second mold body.

Clause 105: The method of any of clauses 102-104, wherein the first and second mold bodies are configured to form a clamp when the first and second mold bodies are engaged together, wherein, when the first and second mold bodies combine with the at least one tooth of the patient to form the mold cavity, the clamp is configured to be at least proximate an incisal edge of the tooth to be restored.

Clause 106: The method of any of clauses 102-105, wherein the first mold body defines a first structure configured to mate with at least a first portion of a clamp, and the second mold body defines a second structure configured to mate with at least a second portion of the clamp, the clamp being configured to secure the first and second mold bodies to one another when the first portion of the clamp mates with the first structure and the second portion of the clamp mates with the second structure, the method further comprising mating the first portion of the clamp with the first structure; and mating the second portion of the clamp with the second structure.

Clause 107: The method of any of clauses 99-106, further comprising placing at least a portion of a door body within the aperture, the door body corresponding to the portion of the surface of the tooth to be restored, at least the portion of the door body being configured to mate with the aperture.

Clause 108: The method of any of clause 107, wherein the door body is separable from and engageable with the mold body.

Clause 109: The method of clause 107 or 108, wherein at least one of the mold body or the door body defines a vent configured to allow excess restorative material to flow out of the mold cavity.

Clause 110: The method of any of clauses 107-109, further comprising placing a release film on at least a portion of a surface of the door body before placing the at least a portion of the door body within the aperture; removing the at least a portion of the door body from the aperture; removing the release film from the at least a portion of the surface; and placing the at least a portion of the door body within the aperture.

Clause 111: The method of any of clauses 107-110, further comprising placing a coating on at least a portion of a surface of the door body before placing the at least a portion of the door body within the aperture; removing the at least a portion of the door body from the aperture; and placing the at least a portion of the door body within the aperture.

Clause 112: The method of any of clauses 107-111, wherein the door body comprises a first door body, the aperture comprises a first aperture, the portion of the lingual or facial surface of the one tooth of the at least one tooth comprises a first portion of a first lingual or facial surface of a first tooth of the at least one tooth, and the mold body defines a second aperture configured to align with a second portion of a second lingual or facial surface of a second tooth of the at least one tooth, the method further comprising placing at least a portion of a second door body within the second aperture, the second door body corresponding to the second portion of the lingual or facial surface of the second tooth of the at least one tooth, at least the portion of the second door body being configured to mate with the second aperture.

Clause 113: The method of clause 112, wherein the first aperture and the second aperture are different shapes and the first and second door bodies are different shapes, the shape of the first door body corresponding to the shape of the first aperture and the shape of the second door body corresponding to the shape of the second aperture.

Clause 114: The tool of clause 112, wherein the first aperture and the second aperture are the same shape and the first and second door bodies are the same shape.

Clause 115: The tool of any of clauses 112-114, wherein one or more of the mold body, the first door body, or the second door body comprise one or more indicia for facilitating one or more of mating the first door body with the first aperture or mating the second door body with the second aperture.

Clause 116: The tool of clause 115, wherein the one or more indicia comprise one or more of: a key structure and a corresponding keyhole; color coding; one or more symbols; or one or more other integrated or applied markings.

Clause 117: The method of any of clauses 107-116, wherein placing the at least a portion of the door body within the aperture provides one or more of final shaping of at least a portion of the dental restoration, and the door body comprises a first door body, the method further comprising: placing additional restorative material into the mold cavity and at least one of: placing at least a portion of a second door body within the aperture to shape an underlying shade layer of the at least the portion of the dental restoration, the at least the portion of the second door body being configured to mate with the aperture; placing at least a portion of a third door body within the aperture to form one or more of one or more mamelons; one or more grooves; or one or more pits, the at least the portion of the third door body being configured to mate with the aperture; placing at least a portion of a fourth door body within the aperture to provide near net shaping of the at least the portion of the dental restoration, the at least the portion of the fourth door body being configured to mate with the aperture, or placing at least a portion of a fifth door body within the aperture to apply an intermediate layer of restorative material, the intermediate layer of restorative material comprising a first restorative material that is different than a material applied during final layering by the first door body.

Clause 118: The method of clause 117, wherein the additional restorative material comprises first additional restorative material, further comprising, after placing the first additional restorative material and at least one of the at least the portion of the second door body, the third door body, the fourth door body, or the fifth door body within the aperture, curing the first additional restorative material with the door within the aperture, adjusting the cured composite (e.g., by cutting back the composite to create an underlying geometry), placing second additional restorative material in the mold cavity, placing at least one of the at least the portion of the second door body, the third door body, the fourth door body, or the fifth door body within the aperture, and curing the second additional restorative material.

Clause 119: The method of claim 118, wherein the first and additional restorative materials are the same.

Clause 120 The method of claim 118, wherein the first and additional restorative materials are different.

Clause 121: The method of any of clauses 107-120, wherein at least one of the mold body or the door body defines at least one protrusion configured to provide a gripping mechanism for a practitioner, wherein one or more of attaching the mold body to at least one tooth, placing at least the portion of the door body within the aperture, or removing the door body and the mold body from the at least one tooth comprises gripping at least one protrusion of the at least one protrusion.

Clause 122: The method of clause 121, wherein the at least one protrusion defines one or more ribs.

Clause 123: The method of clause 121 or 122, wherein the at least one protrusion defines a structure configured to mate with at least a portion of a clamp, the method further comprising mating at least the portion of the clamp with the structure.

Clause 124: The method of any of clauses 121-123, wherein the at least one protrusion defines at least one lever configured to provide a mechanism for use in prying the mold body away from the tooth to be restored, and wherein removing the mold body from the at least one tooth comprises using the lever to pry the mold body away from the tooth to be restored.

Clause 125: The method of any of clauses 99-124, wherein the mold body comprises a ridge configured to contact at least a portion of a tooth to be restored of the at least one tooth to concentrate sealing pressure at at least a portion of a perimeter of the mold cavity.

Clause 126: The method of clause 125, wherein the at least the portion of the perimeter of the mold cavity is configured to be located proximate to a gingival contour of the tooth when the mold body combines with at least the at least one tooth of the patient to form the mold cavity.

Clause 127: The method of any of clauses 99-126, wherein the mold body defines an edge defining a contour configured to substantially match at least a portion of a gingival margin of the tooth.

Clause 128: The method of any of clauses 99-127, wherein filling the mold cavity comprises placing the restorative material through the aperture and into the mold cavity.

Clause 129: The method of any of clauses 99-128, wherein filling the mold cavity comprises filling the mold body with restorative material before attaching the mold body to the at least one tooth.

Clause 130: The method of any of clauses 99-129, wherein filling the mold cavity comprises placing the restorative material on the tooth to be restored before attaching the mold body to the at least one tooth.

Clause 131: A method of designing a tool for forming a dental restoration of a tooth, the method comprising: receiving, by one or more processors, a three dimensional scan data of a tooth structure of a patient; and designing, by the one or more processors, a tool for forming the dental restoration of the tooth based on the three dimensional scan data of the mouth of the patient, wherein the tool comprises a mold body configured to provide a customized fit with at least one tooth of a patient, the mold body defining an aperture configured to align with a portion of a surface of the at least one tooth, the aperture being sufficiently large to allow placement and flow of a restorative material to cover the portion of the at least one tooth being restored, the mold body being configured to combine with the at least one tooth to define a mold cavity encompassing at least a portion of desired tooth structure of the at least one tooth to be restored.

Clause 132: A tool for forming a dental restoration, the tool comprising a mold body configured to combine with a tooth of a patient to define a mold cavity encompassing at least a portion of desired tooth structure of the tooth, the portion of desired tooth structure defining an interproximal surface of the tooth, the mold body comprising a base member configured to provide a customized fit with at least one tooth of the patient to attach the mold body to the at least one tooth, and an interproximal member extending from the base member and configured to be disposed between adjacent teeth of the patient when the base member is fit over the at least one tooth, the interproximal member defining a surface of the mold cavity.

Clause 133: The tool of clause 132, wherein the base member is configured to provide a customized fit with a lingual surface of adjacent teeth of the patient and the interproximal member is configured to be disposed between the adjacent teeth when the mold body is positioned over the at least one tooth.

Clause 134: The tool of clause 132 or clause 133, wherein the base member comprises a first base member and a second base member, and the tooth is a first tooth, the first base member being configured to provide a customized fit with an incisal or occlusal surface of the first tooth, and the second base member being configured to provide a customized fit with an incisal or occlusal surface of a second tooth.

Clause 135: The tool of clause 134, wherein the first and second teeth are directly adjacent to each other and the interproximal surface of the first tooth is between the first and second teeth.

Clause 136: The tool of clause 134, wherein the first and second teeth are not directly adjacent to each other and the interproximal surface of the first tooth is between the first tooth and a third tooth.

Clause 137: The tool of any of clauses 132-136, wherein the interproximal member extends around one or more of a lingual surface, a facial surface, an incisal surface, or an occlusal surface of the tooth.

Clause 138: The tool of any of clauses 132-137, where the mold body comprises a first mold body and the mold cavity comprises a first mold cavity, the tool further comprising a second mold body defining an aperture configured to align with a portion of another surface of the tooth to be restored, the second mold body being configured to combine with at least one tooth of the patient to define a second mold cavity encompassing at least the portion of the tooth to be restored, wherein the aperture is larger than a tip of a restorative dental material introduction device and configured to allow placement and flow of a restorative material into the second mold cavity to cover the portion of the tooth to be restored.

Clause 139: The tool of clause 138, wherein a ratio of an area of the aperture to a cross-sectional area of the tip is greater than or equal to about 2:1.

Clause 140: The tool of clause 138, wherein the aperture is configured to align with a majority of the portion of the other surface of the tooth.

Clause 141: The tool of any of clauses 138-140, further comprising a door body corresponding to the portion of the other surface of the tooth to be restored, at least a portion of the door body being configured to mate with the aperture, wherein the second mold body and the door body are configured to combine with the at least one tooth to define the second mold cavity.

Clause 142: A method of designing a tool for forming a dental restoration of a tooth, the method comprising receiving, by one or more processors, a three dimensional scan data of a tooth structure of a patient, and designing, by the one or more processors, a tool for forming the dental restoration of the tooth based on the three dimensional scan data of the mouth of the patient, wherein the tool comprises a mold body configured to combine with a tooth of a patient to define a mold cavity encompassing at least a portion of desired tooth structure of the tooth, the portion of desired tooth structure defining an interproximal surface of the tooth, the mold body comprising a base member configured to provide a customized fit with at least one tooth of the patient to attach the mold body to the at least one tooth, and an interproximal member extending from the base member and configured to be disposed between adjacent teeth of the patient when the base member, the interproximal member defining a surface of the mold cavity.

Clause 143: The method of clause 142, further comprising at least one of controlling, by the one or more processors, a three-dimensional printer to define the tool or manufacturing the tool by a CAD/CAM milling processes.

Clause 144: A method for forming a dental restoration, the method comprising: attaching a mold body to at least one tooth of a patient, the mold body configured to combine with a tooth of the patient to define a mold cavity encompassing at least a portion of desired tooth structure of the tooth, the portion of desired tooth structure defining an interproximal surface of the tooth, the mold body comprising a base member configured to provide a customized fit with at least one tooth of the patient to attach the mold body to the at least one tooth, and an interproximal member extending from the base member and configured to be disposed between adjacent teeth of the patient when the base member, the interproximal member defining a surface of the mold cavity, filling the mold cavity with a restorative material, curing the restorative material, and removing the mold body from the at least one tooth.

Clause 145: The method of clause 144, wherein the mold body comprises a first mold body, and the mold cavity comprises a first mold cavity, the method further comprising after removing the first mold body from the at least one tooth, attaching a second mold body to the at least one tooth, the second mold body defining an aperture configured to align with a portion of another surface of the tooth to be restored, the second mold body being configured to combine with at least one tooth of the patient to define a second mold cavity encompassing at least the portion of the tooth to be restored, wherein the aperture is larger than a tip of a restorative dental material introduction device and configured to allow placement and flow of a restorative material into the second mold cavity to cover the portion of the tooth to be restored, filling the second mold cavity with restorative material, curing the restorative material in the second mold cavity, and removing the second mold body from the at least one tooth.

Clause 146: The method of clause 145, wherein filling the first mold cavity or the second mold cavity comprises at least one of introducing the restorative material into the respective mold cavity after attaching the respective mold body to the at least one tooth, introducing the restorative material into the respective mold body before attaching the respective mold body to the at least one tooth, or applying the restorative material to the tooth before attaching the respective mold body to the at least one tooth.

These and other examples are within the scope of the following claims.

What is claimed is:

1. A tool for forming a dental restoration, the tool comprising:
   a mold body including one or more mold body parts configured to provide a customized fit with at least one tooth of a patient, a single body part of the one or more the mold body parts defining a seamless aperture configured to align with a portion of a surface of a tooth to be restored of the at least one tooth and provide a through-hole from an exterior surface of mold body part to an interior surface thereof, the mold body being configured to combine with the at least one tooth to define a mold cavity encompassing at least a portion of desired tooth structure of the tooth to be restored, wherein the aperture is larger than a tip of a restorative dental material introduction device and configured to allow placement and flow of a restorative material into the mold cavity to cover the portion of the surface of the tooth to be restored,
   at least one door corresponding to the portion of the surface of the tooth to be restored, at least a portion of the door being configured to mate with the aperture,
   wherein the mold body and the door are configured to combine with the at least one tooth to define the mold cavity.

2. The tool of claim 1, wherein a ratio of an area of the aperture to a cross-sectional area of the tip is greater than or equal to about 2:1.

3. The tool of claim 1, wherein the aperture is configured to align with a majority of the portion of the surface of the tooth to be restored.

4. The tool of claim 1, wherein the one or more mold body parts comprises a first mold body part, a second mold body part, wherein the second mold body part is separable from and engageable with the first mold body part, and wherein the first and second mold body parts are configured to combine with the at least one tooth of the patient to define the mold cavity.

5. The tool of claim 4, wherein, when the first and second mold body parts combine with the at least one tooth of the patient to define the mold cavity, at least a portion of the first mold body part is configured to abut a portion of the second mold body part, wherein at least one of the portion of the first mold body part or the portion of the second mold body part comprises an overbuilt portion such that, when the portion of the first mold body part abuts the portion of the second mold body part, the overbuilt portion is configured to provide intimate contact between the portion of the first mold body part and the portion of the second mold body part.

6. The tool of claim 1, wherein the aperture has a perimeter defined by a single body part of the one or more mold body parts.

7. The tool of claim 1, wherein the door is attached to the mold body via a hinge.

8. The tool of claim 1, wherein a side of the door configured to mate with the mold body defines a chamfered edge.

9. The tool of claim 1, wherein the at least one door comprises a first door configured for one or more of final shaping or final layering of at least a portion of the dental restoration, the tool further comprising one or more of:
   a second door, at least a portion of the second door being configured to mate with the aperture, the second door being configured for shaping an underlying shade layer of at least the portion of the dental restoration;
   a third door, at least a portion of the third door being configured to mate with the aperture, the third door being configured to form one or more of:
   one or more mamelons,
   one or more grooves, or
   one or more pits;
   a fourth door, at least a portion of the fourth door being configured to mate with the aperture, the fourth door being configured for near net shaping of at least the portion of the dental restoration; or
   a fifth door, at least a portion of the fifth door being configured to mate with the aperture, the fifth door being configured for applying an intermediate layer of restorative material, the intermediate layer of restorative material comprising a first restorative material that is different than a material applied during final layering by the first door.

10. A method of forming a dental restoration, the method comprising:
    attaching a mold body to at least one tooth of a patient, the mold body including one or more mold body parts configured to provide a customized fit with at least one tooth of a patient, a single body part of the one or more the mold body parts defining a seamless aperture configured to align with a portion of a surface of a tooth to be restored of the at least one tooth and provide a through-hole from an exterior surface of mold body part to an interior surface thereof, the mold body being configured to combine with the at least one tooth to define a mold cavity encompassing at least a portion of desired tooth structure of the tooth to be restored, wherein the aperture is larger than a tip of a restorative dental material introduction device and configured to allow placement and flow of a restorative material into the mold cavity to cover the portion of the surface of the tooth to be restored,
    filling the mold cavity with restorative material by at least one of: placing the restorative material through the aperture and into the mold cavity, prefilling the mold cavity with the restorative material before attaching the mold body to the at least one tooth, or placing the restorative material on the tooth to be restored before attaching the mold body to the at least one tooth;
    after filling the mold cavity with restorative material, placing at least a portion of a door body within the aperture, the door body corresponding to the portion of the surface of the at least one tooth to be restored, at least the portion of the door body being configured to mate with the aperture,
    curing the restorative material; and
    removing the mold body from the at least one tooth.

11. The method of claim 10, wherein filling the mold cavity with restorative material comprises aligning a tip of a restorative dental material introduction device with the aperture and introducing the restorative material into the mold cavity via the restorative dental material introduction device, wherein a ratio of an area of the aperture to a cross-sectional area of the tip is greater than or equal to about 2:1.

12. The method of claim 10, wherein the one or more mold body parts comprises a first mold body part and a second mold body part, the method further comprising:

attaching a second mold body part to the at least one tooth, the second mold body part being configured to provide a customized fit with the at least one tooth, the first and second mold body parts being configured to combine with the at least one tooth of the patient to form the mold cavity encompassing at least the portion of desired dental structure of the tooth to be restored.

13. The method of claim 12, wherein when the first and second mold body part combine with the at least one tooth of the patient to form the mold cavity, at least a portion of the first mold body part abuts a portion of the second mold body part, wherein at least one of the portion of the first mold body part or the portion of the second mold body part comprises an overbuilt portion such that, when the portion of the first mold body part abuts the portion of the second mold body part, the overbuilt portion provides intimate contact between the portion of the first mold body part and the portion of the second mold body part.

14. The method of claim 12, wherein the first and second mold body parts are configured to form a door hinge when the first and second mold body parts are engaged together, wherein, when the first and second mold body parts combine with the at least one tooth of the patient to form the mold cavity, the door hinge is configured to be at least proximate an incisal edge of the tooth to be restored.

15. The method of claim 10, wherein the first mold body part defines a first structure configured to mate with at least a first portion of a clamp, and the second mold body part defines a second structure configured to mate with at least a second portion of the clamp, the clamp being configured to secure the first and second mold body part to one another when the first portion of the clamp mates with the first structure and the second portion of the clamp mates with the second structure, the method further comprising:
   mating the first portion of the clamp with the first structure; and
   mating the second portion of the clamp with the second structure.

16. The method of claim 10, further comprising:
   placing a coating on at least a portion of a surface of the door body before placing the at least a portion of the door body within the aperture;
   placing the at least a portion of the door body within the aperture; and
   removing the at least a portion of the door body from the aperture.

17. A tool for forming a dental restoration, the tool comprising:
   a mold body part configured to provide a customized fit with at least one tooth of a patient, the mold body part entirely defining an aperture configured to align with a portion of a lingual or facial surface of one tooth to be restored of the at least one tooth and provide a through-hole from an exterior surface of mold body part to an interior surface thereof; and
   a door body corresponding to the portion of the lingual or facial surface of the tooth to be restored, at least a portion of the door body being configured to mate with the aperture,
   wherein the mold body and the door body are configured to combine with the at least one tooth of the patient to form the mold cavity encompassing the at least the portion of desired tooth structure of the tooth to be restored.

18. The tool of claim 17, wherein the mold body part comprises a first mold body part, the tool further comprising:
   a second mold body part configured to provide a customized fit with the at least one tooth of the patient,
   wherein the first and second mold body parts are the door body are configured to combine with the at least one tooth of the patient to form the mold cavity encompassing the at least the portion of desired tooth structure of the tooth to be restored.

19. The tool of claim 18 wherein, when the first and second mold body parts combine with the at least one tooth of the patient to form the mold cavity, at least a portion of the first mold body part is configured to abut a portion of the second mold body part, wherein at least one of the portion of the first mold body part or the portion of the second mold body part comprises an overbuilt portion such that, when the portion of the first mold body part abuts the portion of the second mold body part, the overbuilt portion is configured to provide intimate contact between the portion of the first mold body part and the portion of the second mold body part.

20. The tool of claim 18, wherein the first mold body part defines a first structure configured to mate with at least a first portion of a clamp, and the second mold body part defines a second structure configured to mate with at least a second portion of the clamp, the clamp being configured to secure the first and second mold body parts to one another when the first portion of the clamp mates with the first structure and the second portion of the clamp mates with the second structure.

\* \* \* \* \*